United States Patent
Smith et al.

(10) Patent No.: US 12,153,764 B1
(45) Date of Patent: Nov. 26, 2024

(54) STYLUS WITH RECEIVE ARCHITECTURE FOR POSITION DETERMINATION

(71) Applicant: Apple Inc., Cupertino, CA (US)

(72) Inventors: John Stephen Smith, San Jose, CA (US); Cody A. Tapscott, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 17/448,803

(22) Filed: Sep. 24, 2021

Related U.S. Application Data

(60) Provisional application No. 63/117,983, filed on Nov. 24, 2020, provisional application No. 63/083,634, filed on Sep. 25, 2020.

(51) Int. Cl.
*G06F 3/044* (2006.01)
*G06F 3/0354* (2013.01)
*G06F 3/041* (2006.01)

(52) U.S. Cl.
CPC ........ *G06F 3/0441* (2019.05); *G06F 3/03545* (2013.01); *G06F 3/04162* (2019.05); *G06F 3/0442* (2019.05)

(58) Field of Classification Search
CPC ....... G06F 3/03545; G06F 3/038–0383; G06F 3/0416–04186; G06F 3/044–0448
See application file for complete search history.

(56) References Cited

U.S. PATENT DOCUMENTS

| | | |
|---|---|---|
| 3,462,692 A | 8/1969 | Bartlett |
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Pauelus et al. |

(Continued)

FOREIGN PATENT DOCUMENTS

| | | |
|---|---|---|
| CN | 1243282 A | 2/2000 |
| CN | 1278348 A | 12/2000 |

(Continued)

OTHER PUBLICATIONS

Extended European Search Report received for European Patent Application No. 15196245.3, mailed on May 2, 2016, 12 pages.

(Continued)

*Primary Examiner* — Patrick F Marinelli
(74) *Attorney, Agent, or Firm* — Kubota & Basol LLP

(57) ABSTRACT

Systems, methods, and computer-readable media for enabling position determination of a stylus with receive architecture are provided. The stylus can comprise: a plurality of electrodes; a plurality of sensing circuits coupled to the plurality of electrodes, the plurality of sensing circuits configured to sense receive signals on the plurality of electrodes in response to stimulation signals from a touch sensor panel of an electronic device in communication with the stylus; and a processor coupled to the plurality of sensing circuits, the processor configured to: correlate the receive signals sensed by the plurality of electrodes with a first set of codes to generate correlation data; and transmit data including the correlation data or generated using the correlation data to the electronic device in communication with the stylus.

20 Claims, 12 Drawing Sheets

(56) References Cited

U.S. PATENT DOCUMENTS

| | | | |
|---|---|---|---|
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday et al. |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,577,057 A | 3/1986 | Blesser |
| 4,602,321 A | 7/1986 | Bornhorst |
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Berkel et al. |
| 5,360,426 A | 11/1994 | Mueller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,392,058 A | 2/1995 | Tagawa |
| 5,414,227 A | 5/1995 | Schubert et al. |
| 5,414,283 A | 5/1995 | Den et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | Mccartney et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Mu et al. |
| 5,905,489 A | 5/1999 | Takahama et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |

(56) References Cited

U.S. PATENT DOCUMENTS

| | | |
|---|---|---|
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,117 A | 5/2000 | Horie et al. |
| 6,061,177 A | 5/2000 | Fujimoto |
| 6,064,374 A | 5/2000 | Fukuzaki |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward et al. |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter et al. |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,754,472 B1 | 6/2004 | Williams et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | Den |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | Den et al. |
| 6,956,564 B1 | 10/2005 | Williams |
| 6,972,753 B1 | 12/2005 | Kimura et al. |
| 6,995,743 B2 | 2/2006 | Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | Den |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth et al. |
| 7,372,455 B2 | 5/2008 | Perski et al. |
| 7,408,598 B2 | 8/2008 | Den et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |

(56) References Cited

U.S. PATENT DOCUMENTS

| | | |
|---|---|---|
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Kalmanovich et al. |
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,638,320 B2 * | 1/2014 | Harley .............. G06F 3/0442 345/173 |
| 8,659,556 B2 | 2/2014 | Wilson |
| 8,698,769 B2 | 4/2014 | Coulson et al. |
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 * | 1/2015 | Harley .............. G06F 3/0446 345/173 |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,310,923 B2 | 4/2016 | Krah et al. |
| 9,329,703 B2 | 5/2016 | Falkenburg et al. |
| 9,519,361 B2 | 12/2016 | Harley et al. |
| 9,557,845 B2 | 1/2017 | Shahparnia |
| 10,719,171 B2 * | 7/2020 | Narikawa ............ G06F 3/0425 |
| 11,036,326 B2 * | 6/2021 | Autio .................. G06F 3/016 |
| 11,262,858 B2 * | 3/2022 | Bakken .............. G06F 3/0441 |
| 11,467,679 B2 * | 10/2022 | Ju ...................... G06F 3/04162 |
| 11,537,221 B2 * | 12/2022 | Bakken .............. G06F 3/0442 |
| 11,600,169 B2 * | 3/2023 | Yamamoto ......... G06F 3/03545 |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | Boer et al. |
| 2003/0156100 A1 | 8/2003 | Gettemy |
| 2003/0156230 A1 | 8/2003 | Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | Boer |
| 2003/0218116 A1 | 11/2003 | Boer |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | Boer et al. |
| 2004/0081205 A1 | 4/2004 | Coulson |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0007125 A1 | 1/2005 | Heger |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | Den et al. |
| 2005/0270590 A1 | 12/2005 | Izumi et al. |
| 2005/0275616 A1 | 12/2005 | Park et al. |
| 2005/0285985 A1 | 12/2005 | Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley et al. |
| 2006/0012580 A1 | 1/2006 | Perski et al. |
| 2006/0026521 A1 | 2/2006 | Hotelling et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0159478 A1 | 7/2006 | Kikuchi |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0217064 A1 | 9/2006 | Glass et al. |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | Den et al. |
| 2007/0109286 A1 | 5/2007 | Nakamura et al. |
| 2007/0131991 A1 | 6/2007 | Sugawa |
| 2007/0146349 A1 | 6/2007 | Errico et al. |
| 2007/0216905 A1 | 9/2007 | Han et al. |
| 2007/0279346 A1 | 12/2007 | Den et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0030461 A1 | 2/2008 | Matsui et al. |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | Abileah et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | Den et al. |
| 2008/0055507 A1 | 3/2008 | Den et al. |
| 2008/0062156 A1 | 3/2008 | Abileah et al. |
| 2008/0062157 A1 | 3/2008 | Abileah et al. |
| 2008/0062343 A1 | 3/2008 | Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | Den et al. |
| 2008/0129913 A1 | 6/2008 | Den et al. |
| 2008/0129914 A1 | 6/2008 | De et al. |

(56) References Cited

U.S. PATENT DOCUMENTS

| | | |
|---|---|---|
| 2008/0142280 A1 | 6/2008 | Yamamoto et al. |
| 2008/0158165 A1 | 7/2008 | Geaghan et al. |
| 2008/0158167 A1 | 7/2008 | Hotelling et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0242346 A1 | 10/2008 | Rofougaran et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0140986 A1 | 6/2009 | Karkkainen et al. |
| 2009/0153152 A1 | 6/2009 | Maharyta et al. |
| 2009/0153525 A1 | 6/2009 | Chang |
| 2009/0167702 A1 | 7/2009 | Nurmi |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu et al. |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-smith et al. |
| 2010/0118237 A1 | 5/2010 | Katoh et al. |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | Den et al. |
| 2010/0309171 A1 | 12/2010 | Mo et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-david |
| 2011/0043489 A1 | 2/2011 | Yoshimoto et al. |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0118030 A1 | 5/2011 | Walley et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0216016 A1 | 9/2011 | Rosener |
| 2011/0216032 A1 | 9/2011 | Oda et al. |
| 2011/0234508 A1* | 9/2011 | Oda ................... G06F 3/0442 345/173 |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304583 A1 | 12/2011 | Kruglick |
| 2011/0304592 A1 | 12/2011 | Booth et al. |
| 2012/0013555 A1 | 1/2012 | Maeda et al. |
| 2012/0019488 A1 | 1/2012 | Mccarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0139865 A1 | 6/2012 | Krah et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon et al. |
| 2012/0327041 A1* | 12/2012 | Harley ................ G06F 3/0441 345/179 |
| 2012/0327042 A1* | 12/2012 | Harley ................ G06F 3/0442 345/179 |
| 2012/0331546 A1 | 12/2012 | Falkenburg et al. |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028577 A1 | 1/2014 | Krah et al. |
| 2014/0028607 A1 | 1/2014 | Tan et al. |
| 2014/0077827 A1 | 3/2014 | Seguine |
| 2014/0132556 A1 | 5/2014 | Huang et al. |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0267075 A1 | 9/2014 | Shahparnia et al. |
| 2014/0354555 A1* | 12/2014 | Shahparnia ......... G06F 3/04162 345/173 |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |
| 2015/0338950 A1 | 11/2015 | Ningrat et al. |
| 2016/0162011 A1 | 6/2016 | Verma et al. |
| 2016/0162101 A1 | 6/2016 | Pant et al. |
| 2016/0162102 A1 | 6/2016 | Shahparnia et al. |
| 2016/0179281 A1 | 6/2016 | Krah et al. |
| 2016/0320895 A1* | 11/2016 | Ribeiro ............... G06F 3/04162 |

(56) References Cited

U.S. PATENT DOCUMENTS

| | | | |
|---|---|---|---|
| 2016/0357343 A1 | 12/2016 | Falkenburg et al. | |
| 2017/0068337 A1* | 3/2017 | Bhandari | H01G 5/12 |
| 2018/0314364 A1* | 11/2018 | Yeh | G06F 3/0383 |
| 2019/0079603 A1* | 3/2019 | Sundara-Rajan | G06F 3/03545 |
| 2019/0187817 A1* | 6/2019 | Zimmerman | G06F 3/0383 |
| 2020/0371610 A1* | 11/2020 | Bakken | G06F 3/044 |
| 2022/0179507 A1* | 6/2022 | Bakken | G06F 3/044 |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| CN | 201837984 U | 5/2011 |
| DE | 3602796 A1 | 8/1987 |
| DE | 19720925 A1 | 12/1997 |
| EP | 0306596 A2 | 3/1989 |
| EP | 0426362 A2 | 5/1991 |
| EP | 0426469 A2 | 5/1991 |
| EP | 0572009 A1 | 12/1993 |
| EP | 0572182 B1 | 12/1993 |
| EP | 0491436 B1 | 9/1995 |
| EP | 0366913 B1 | 11/1995 |
| EP | 0464908 B1 | 9/1996 |
| EP | 0490683 B1 | 12/1996 |
| EP | 0509589 B1 | 1/1997 |
| EP | 0488455 B1 | 2/1997 |
| EP | 0762319 A2 | 3/1997 |
| EP | 0384509 B1 | 5/1997 |
| EP | 0770971 A2 | 5/1997 |
| EP | 0762319 A3 | 6/1997 |
| EP | 0545709 B1 | 11/1997 |
| EP | 0601837 B1 | 10/1998 |
| EP | 0587236 B1 | 4/1999 |
| EP | 0618527 B1 | 9/1999 |
| EP | 0962881 A2 | 12/1999 |
| EP | 1022675 A2 | 7/2000 |
| EP | 1128170 A1 | 8/2001 |
| EP | 0633542 B1 | 10/2001 |
| EP | 1884863 A1 | 2/2008 |
| EP | 2040149 A2 | 3/2009 |
| EP | 2172834 A2 | 4/2010 |
| EP | 2221659 A1 | 8/2010 |
| EP | 2660689 A1 | 11/2013 |
| JP | S55-74635 A | 6/1980 |
| JP | S57-203129 A | 12/1982 |
| JP | S60-179823 A | 9/1985 |
| JP | S64-6927 U | 1/1989 |
| JP | S64-40004 A | 2/1989 |
| JP | H1-196620 A | 8/1989 |
| JP | H2-182581 A | 7/1990 |
| JP | H2-211421 A | 8/1990 |
| JP | H5-19233 A | 1/1993 |
| JP | H5-173707 A | 7/1993 |
| JP | H5-243547 A | 9/1993 |
| JP | H8-166849 A | 6/1996 |
| JP | H9-1279 A | 1/1997 |
| JP | H9-185457 A | 7/1997 |
| JP | H9-231002 A | 9/1997 |
| JP | H9-274537 A | 10/1997 |
| JP | H10-27068 A | 1/1998 |
| JP | H10-40004 A | 2/1998 |
| JP | H10-133817 A | 5/1998 |
| JP | H10-133819 A | 5/1998 |
| JP | H10-186136 A | 7/1998 |
| JP | H10-198515 A | 7/1998 |
| JP | H11-110110 A | 4/1999 |
| JP | H11-242562 A | 9/1999 |
| JP | 2000-20241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| JP | 2009-54141 A | 3/2009 |
| KR | 10-2013-0109207 A | 10/2013 |
| TW | 200743986 A | 12/2007 |
| TW | 200925944 A | 6/2009 |
| TW | 201115414 A | 5/2011 |
| TW | 201118682 A | 6/2011 |
| TW | 201324242 A | 6/2013 |
| TW | 201419103 A | 5/2014 |
| TW | 201504874 A | 2/2015 |
| WO | 1997/040488 A1 | 10/1997 |
| WO | 1999/021160 A1 | 4/1999 |
| WO | 1999/022338 A1 | 5/1999 |
| WO | 2001/045283 A1 | 6/2001 |
| WO | 2006/104214 A1 | 10/2006 |
| WO | 2007/145346 A1 | 12/2007 |
| WO | 2007/145347 A1 | 12/2007 |
| WO | 2008/018201 A1 | 2/2008 |
| WO | 2008/044368 A1 | 4/2008 |
| WO | 2008/044369 A1 | 4/2008 |
| WO | 2008/044370 A1 | 4/2008 |
| WO | 2008/044371 A1 | 4/2008 |
| WO | 2008/047677 A1 | 4/2008 |
| WO | 2009/081810 A1 | 7/2009 |
| WO | 2009/105115 A2 | 8/2009 |
| WO | 2011/008533 A2 | 1/2011 |
| WO | 2012/177567 A1 | 12/2012 |
| WO | 2012/177569 A2 | 12/2012 |
| WO | 2012/177571 A1 | 12/2012 |
| WO | 2012/177573 A2 | 12/2012 |
| WO | 2012/177569 A3 | 3/2013 |
| WO | 2014/018233 A1 | 1/2014 |
| WO | 2014/143430 A1 | 9/2014 |
| WO | 2015/017196 A1 | 2/2015 |

OTHER PUBLICATIONS

Final Office Action received for U.S. Appl. No. 10/217,798, mailed on Aug. 23, 2005, 10 pages.
Final Office Action received for U.S. Appl. No. 10/217,798, mailed on Mar. 4, 2004, 17 pages.
Final Office Action received for U.S. Appl. No. 10/217,798, mailed on Oct. 31, 2007, 10 pages.
Final Office Action received for U.S. Appl. No. 10/329,217, mailed on Jan. 21, 2005, 13 pages.
Final Office Action received for U.S. Appl. No. 10/371,413, mailed on Dec. 13, 2005, 7 pages.
Final Office Action received for U.S. Appl. No. 10/442,433, mailed on Aug. 9, 2005, 6 pages.
Final Office Action received for U.S. Appl. No. 11/137,753, mailed on May 23, 2007, 12 pages.
Final Office Action received for U.S. Appl. No. 11/351,098, mailed on Mar. 24, 2009, 11 pages.
Final Office Action received for U.S. Appl. No. 11/351,098, mailed on Oct. 18, 2007, 6 pages.
Final Office Action received for U.S. Appl. No. 11/595,071, mailed on Jun. 15, 2011, 9 pages.
Final Office Action received for U.S. Appl. No. 11/901,649, mailed on Feb. 10, 2011, 20 pages.
Final Office Action received for U.S. Appl. No. 11/977,279, mailed on Jul. 5, 2011, 12 pages.
Final Office Action received for U.S. Appl. No. 11/977,339, mailed on Nov. 17, 2011, 9 pages.
Final Office Action received for U.S. Appl. No. 11/977,911, mailed on Sep. 29, 2011, 23 pages.
Final Office Action received for U.S. Appl. No. 11/978,006, mailed on Jun. 24, 2011, 12 pages.
Final Office Action received for U.S. Appl. No. 11/978,031, mailed on May 18, 2011, 17 pages.
Final Office Action received for U.S. Appl. No. 12/566,455, mailed on Oct. 11, 2012, 8 pages.
Final Office Action received for U.S. Appl. No. 12/568,302, mailed on Oct. 25, 2012, 14 pages.
Final Office Action received for U.S. Appl. No. 12/568,316, mailed on Jan. 13, 2014, 15 pages.
Final Office Action received for U.S. Appl. No. 12/568,316, mailed on Oct. 25, 2012, 16 pages.

(56) References Cited

OTHER PUBLICATIONS

Final Office Action received for U.S. Appl. No. 13/166,699, mailed on Feb. 3, 2016, 15 pages.
Final Office Action received for U.S. Appl. No. 13/166,699, mailed on May 4, 2015, 20 pages.
Final Office Action received for U.S. Appl. No. 13/166,699, mailed on Oct. 31, 2013, 13 pages.
Final Office Action received for U.S. Appl. No. 13/166,711, mailed on Aug. 20, 2015, 6 pages.
Final Office Action received for U.S. Appl. No. 13/166,711, mailed on Jul. 14, 2014, 12 pages.
Final Office Action received for U.S. Appl. No. 13/166,726, mailed on Jul. 26, 2013, 11 pages.
Final Office Action received for U.S. Appl. No. 13/560,958, mailed on Dec. 16, 2014, 12 pages.
Final Office Action received for U.S. Appl. No. 13/560,963, mailed on Dec. 2, 2014, 11 pages.
Final Office Action received for U.S. Appl. No. 13/560,963, mailed on Feb. 1, 2016, 12 pages.
Final Office Action received for U.S. Appl. No. 13/560,973, mailed on Jan. 12, 2015, 6 pages.
Final Office Action received for U.S. Appl. No. 13/652,007, mailed on Apr. 28, 2014, 16 pages.
Final Office Action received for U.S. Appl. No. 13/831,318, mailed on Mar. 9, 2016, 9 pages.
Final Office Action received for U.S. Appl. No. 14/333,461, mailed on Jun. 3, 2016, 9 pages.
International Search Report received for PCT Patent Application No. PCT/US2002/025573, mailed on Apr. 14, 2003, 2 pages.
International Search Report received for PCT Patent Application No. PCT/US2003/03277, mailed on Nov. 11, 2003, 3 pages.
International Search Report received for PCT Patent Application No. PCT/US2003/05300, mailed on Jun. 16, 2003, 2 pages.
International Search Report received for PCT Patent Application No. PCT/US2006/043741, mailed on Sep. 21, 2007, 1 page.
International Search Report received for PCT Patent Application No. PCT/US2012/043019, mailed on Oct. 17, 2012, 4 pages.
International Search Report received for PCT Patent Application No. PCT/US2012/043021, mailed on Jan. 16, 2013, 6 pages.
International Search Report received for PCT Patent Application No. PCT/US2012/043023, mailed on Oct. 17, 2012, 5 pages.
International Search Report received for PCT Patent Application No. PCT/US2012/043025 mailed on Feb. 18, 2013, 6 pages.
International Search Report received for PCT Patent Application No. PCT/US2013/048977, mailed on Sep. 12, 2013, 3 pages.
International Search Report received for PCT Patent Application No. PCT/US2014/013927, mailed on Apr. 23, 2014, 4 pages.
International Search Report received for PCT Patent Application No. PCT/US2014/047658, mailed on Oct. 30, 2014, 4 pages.
Non-Final Office Action received for U.S. Appl. No. 10/217,798, mailed on Dec. 10, 2004, 10 pages.
Non-Final Office Action received for U.S. Appl. No. 10/217,798, mailed on Jan. 13, 2006, 9 pages.
Non-Final Office Action received for U.S. Appl. No. 10/217,798, mailed on Jun. 4, 2003, 17 pages.
Non-Final Office Action received for U.S. Appl. No. 10/217,798, mailed on Jun. 29, 2007, 11 pages.
Non-Final Office Action received for U.S. Appl. No. 10/217,798, mailed on May 12, 2006, 8 pages.
Non-Final Office Action received for U.S. Appl. No. 10/307,106, mailed on Nov. 26, 2004, 9 pages.
Non-Final Office Action received for U.S. Appl. No. 10/329,217, mailed on May 21, 2004, 14 pages.
Non-Final Office Action received for U.S. Appl. No. 10/347,149, mailed on Jan. 21, 2005, 10 pages.
Non-Final Office Action received for U.S. Appl. No. 10/347,149, mailed on Jul. 12, 2005, 4 pages.
Non-Final Office Action received for U.S. Appl. No. 10/371,413, mailed on Apr. 15, 2005, 5 pages.
Non-Final Office Action received for U.S. Appl. No. 10/371,413, mailed on Aug. 28, 2006, 7 pages.
Non-Final Office Action received for U.S. Appl. No. 10/442,433, mailed on Sep. 21, 2004, 7 pages.
Non-Final Office Action received for U.S. Appl. No. 10/739,455, mailed on Jun. 22, 2005, 11 pages.
Non-Final Office Action received for U.S. Appl. No. 11/137,753, mailed on Feb. 25, 2008, 16 pages.
Non-Final Office Action received for U.S. Appl. No. 11/351,098, mailed on Jun. 24, 2008, 12 pages.
Non-Final Office Action received for U.S. Appl. No. 11/351,098, mailed on Jun. 28, 2007, 13 pages.
Non-Final Office Action received for U.S. Appl. No. 11/407,545, mailed on Nov. 23, 2009, 6 pages.
Non-Final Office Action received for U.S. Appl. No. 11/595,071, mailed on Jun. 5, 2012, 15 pages.
Non-Final Office Action received for U.S. Appl. No. 11/595,071, mailed on Oct. 14, 2010, 8 pages.
Non-Final Office Action received for U.S. Appl. No. 11/901,649, mailed on Jul. 29, 2010, 22 pages.
Non-Final Office Action received for U.S. Appl. No. 11/977,279, mailed on Feb. 27, 2014, 11 pages.
Non-Final Office Action received for U.S. Appl. No. 11/977,279, mailed on Nov. 26, 2010, 10 pages.
Non-Final Office Action received for U.S. Appl. No. 11/977,339, mailed on Dec. 13, 2010, 9 pages.
Non-Final Office Action received for U.S. Appl. No. 11/977,339, mailed on Jun. 21, 2011, 11 pages.
Non-Final Office Action received for U.S. Appl. No. 11/977,339, mailed on Mar. 14, 2014, 10 pages.
Non-Final Office Action received for U.S. Appl. No. 11/977,830, mailed on Nov. 26, 2010, 8 pages.
Non-Final Office Action received for U.S. Appl. No. 11/977,864, mailed on Jan. 10, 2012, 6 pages.
Non-Final Office Action received for U.S. Appl. No. 11/977,864, mailed on Jun. 19, 2012, 8 pages.
Non-Final Office Action received for U.S. Appl. No. 11/977,911, mailed on Apr. 29, 2011, 20 pages.
Non-Final Office Action received for U.S. Appl. No. 11/978,006, mailed on Oct. 13, 2010, 9 pages.
Non-Final Office Action received for U.S. Appl. No. 11/978,031, mailed on Feb. 1, 2011, 20 pages.
Non-Final Office Action received for U.S. Appl. No. 11/978,031, mailed on Feb. 29, 2012, 20 pages.
Non-Final Office Action received for U.S. Appl. No. 11/980,029, mailed on Jun. 25, 2009, 10 pages.
Non-Final Office Action received for U.S. Appl. No. 12/566,455, mailed on Apr. 20, 2012, 9 pages.
Non-Final Office Action received for U.S. Appl. No. 12/566,477, mailed on Jan. 31, 2012, 11 pages.
Non-Final Office Action received for U.S. Appl. No. 12/566,477, mailed on Nov. 15, 2012, 12 pages.
Non-Final Office Action received for U.S. Appl. No. 12/568,302, mailed on Nov. 4, 2011, 30 pages.
Non-Final Office Action received for U.S. Appl. No. 12/568,316, mailed on Nov. 2, 2011, 32 pages.
Non-Final Office Action received for U.S. Appl. No. 12/852,883, mailed on Jun. 28, 2011, 16 pages.
Non-Final Office Action received for U.S. Appl. No. 13/166,699, mailed on Jun. 27, 2014, 13 pages.
Non-Final Office Action received for U.S. Appl. No. 13/166,699, mailed on Mar. 29, 2013, 13 pages.
Non-Final Office Action received for U.S. Appl. No. 13/166,699, mailed on Oct. 20, 2016, 19 pages.
Non-Final Office Action received for U.S. Appl. No. 13/166,699, mailed on Sep. 24, 2015, 17 pages.
Non-Final Office Action received for U.S. Appl. No. 13/166,711, mailed on Dec. 16, 2013, 13 pages.
Non-Final Office Action received for U.S. Appl. No. 13/166,711, mailed on Jan. 30, 2015, 13 pages.
Non-Final Office Action received for U.S. Appl. No. 13/166,711, mailed on Jun. 17, 2013, 9 pages.

(56) References Cited

OTHER PUBLICATIONS

Non-Final Office Action received for U.S. Appl. No. 13/166,726, mailed on Mar. 5, 2013, 16 pages.
Non-Final Office Action received for U.S. Appl. No. 13/166,743, mailed on Mar. 14, 2013, 17 pages.
Non-Final Office Action received for U.S. Appl. No. 13/560,958, mailed on Apr. 24, 2014, 11 pages.
Non-Final Office Action received for U.S. Appl. No. 13/560,958, mailed on Aug. 28, 2015, 11 pages.
Non-Final Office Action received for U.S. Appl. No. 13/560,963, mailed on Jul. 28, 2016, 13 pages.
Non-Final Office Action received for U.S. Appl. No. 13/560,963, mailed on Jun. 4, 2014, 10 pages.
Non-Final Office Action received for U.S. Appl. No. 13/560,963, mailed on May 14, 2015, 13 pages.
Non-Final Office Action received for U.S. Appl. No. 13/560,973, mailed on May 8, 2014, 6 pages.
Non-Final Office Action received for U.S. Appl. No. 13/652,007, mailed on Sep. 18, 2013, 18 pages.
Non-Final Office Action received for U.S. Appl. No. 13/831,318, mailed on May 22, 2015, 9 pages.
Non-Final Office Action received for U.S. Appl. No. 13/831,318, mailed on Nov. 25, 2016, 9 pages.
Non-Final Office Action received for U.S. Appl. No. 14/333,382, mailed on Jan. 23, 2017, 17 pages.
Non-Final Office Action received for U.S. Appl. No. 14/333,382, mailed on May 17, 2016, 17 pages.
Non-Final Office Action received for U.S. Appl. No. 14/333,457, mailed on Jul. 1, 2016, 28 pages.
Non-Final Office Action received for U.S. Appl. No. 14/333,461, mailed on Dec. 4, 2015, 16 pages.
Non-Final Office Action received for U.S. Appl. No. 14/578,051, mailed on Feb. 11, 2016, 9 pages.
Non-Final Office Action received for U.S. Appl. No. 14/869,980, mailed on Jan. 12, 2017, 11 pages.
Non-Final Office Action received for U.S. Appl. No. 14/869,982, mailed on Jan. 11, 2017, 10 pages.
Non-Final Office Action received for U.S. Appl. No. 15/057,035, mailed on May 13, 2016, 6 pages.
Non-Final Office Action received for U.S. Appl. No. 15/144,615, mailed on Sep. 27, 2016, 6 pages.
Non-Final Office Action received for U.S. Appl. No. 12/960,068 mailed Feb. 7, 2013, 25 pages.
Notice of Allowance received for U.S. Appl. No. 13/166,711, mailed on Jan. 14, 2016, 5 pages.
Notice of Allowance received for U.S. Appl. No. 13/166,726, mailed on Feb. 3, 2014, 9 pages.
Notice of Allowance received for U.S. Appl. No. 13/166,726, mailed on May 12, 2014, 9 pages.
Notice of Allowance received for U.S. Appl. No. 13/166,726, mailed on Sep. 4, 2014, 10 pages.
Notice of Allowance received for U.S. Appl. No. 13/166,743, mailed on Sep. 17, 2013, 7 pages.
Notice of Allowance received for U.S. Appl. No. 13/560,958, mailed on May 24, 2016, 10 pages.
Notice of Allowance received for U.S. Appl. No. 13/560,958, mailed on Sep. 9, 2016, 8 pages.
Notice of Allowance received for U.S. Appl. No. 13/560,963, mailed on Feb. 14, 2017, 11 pages.
Notice of Allowance received for U.S. Appl. No. 13/560,973, mailed on Dec. 15, 2015, 9 pages.
Notice of allowance received for U.S. Appl. No. 14/578,051, mailed on Aug. 10, 2016, 7 pages.
Notice of Allowance received for U.S. Appl. No. 15/057,035, mailed on Oct. 31, 2016, 10 pages.
Search Report received for Chinese Patent Application No. 201280030349.9, mailed on Sep. 6, 2015, 3 pages (English Translation only).
Search Report received for Chinese Patent Application No. 201280030351.6, mailed on Oct. 23, 2015, 1 pages (English Translation only).
Search Report received for Taiwanese Patent Application No. 101122107, mailed on Jul. 8, 2014, 1 page (English Translation only).
Search Report received for Taiwanese Patent Application No. 101122109, mailed on Jul. 7, 2014, 1 page (English Translation only).
Search Report received for Taiwanese Patent Application No. 101122110, mailed on Jun. 12, 2014, 1 page (English Translation only).
Search Report received for Taiwanese Patent Application No. 104135140, mailed on Jun. 23, 2016, 2 pages (English Translation only).
Supplemental Notice of Allowance received for U.S. Appl. No. 13/166,743, mailed on Dec. 20, 2013, 4 pages.
Abileah et al., "59.3: Integrated Optical Touch Panel in a 14.1' AMLCD", SID '04 Digest (Seattle), 2004, pp. 1544-1547.
Abileah et al., "Optical Sensors Embedded within AMLCD Panel: Design and Applications", ADEAC '06, SID (Atlanta), 2006, 5 pages.
Abileah et al., "Optical Sensors Embedded within AMLCD Panel: Design and Applications", Siggraph—07, San Diego, 2007, 5 pages.
Anonymous, "Biometric Smart Pen Project", Available online at: <http://www.biometricsmartpen.de/ . . . >, 2002, 7 page.
Bobrov et al., "The Manufacture of a Thin-Film LCD", Optiva, Inc., San Francisco, CA, 2002, pp. 317-321.
Boer et al., "56.3: Active Matrix LCD with Integrated Optical Touch Screen", SID '03 Digest (Baltimore), 2003, pp. 1494-1497.
Brown et al., "7.2: A 2.6 inch VGA LCD With Optical Input Function Using a 1-Transistor Active-Pixel Sensor", ISSCC, 2007, 3 pages.
Echtler et al., "An LED-based Multitouch Sensor for LCD Screens", Cambridge, Massachusetts: ACM, Jan. 2010, pp. 227-230.
Haines Lester, "Japanese Enable Human Area Network", Available online at: <http:/www.theregister.co.uk/2005/03/23/human_area_network/print.html>, Mar. 23, 2005, 2 pages.
Hong et al., "Smart LCD Using a-Si Photo Sensor", IMID'05 Digest, 2005, pp. 280-283.
Kim et al., "24.1: Fingerprint Scanner Using a-Si: H TFT-Array", SID '00 Digest, May 14, 2000, pp. 353-355.
Kis Attila, "Tactile Sensing and Analogic Algorithms", Ph.D. Dissertation, Peter Pazmany Catholic University, Budapest, Hungary, 2006, 122 pages.
Lee et al., "A Multi-Touch Three Dimensional Touch-Sensitive Tablet", CHI'85 Proceedings, Apr. 1985, pp. 21-25.
Pye Andy, "Top Touch-Screen Options", Available online at: <http://www.web.archive.org/web/20010627162135.http://www.industrialtechnology.co.uk/2001/mar/touch.html>, [Retrieved on: Apr. 29, 2004], Oct. 29, 2001, pp. 1-2.
Rossiter et al., "A Novel Tactile Sensor Using a Matrix of LEDs Operating in Both Photoemitter and Photodetector Modes", IEEE, 2005, pp. 994-997.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Sachs et al., "3-Draw: A Tool for Designing 3D Shapes", IEEE Computer Graphics & Applications, Nov. 1991, pp. 18-26.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Yamaguchi et al., "Two-Dimensional Contact-Type Image Sensor Using Amorphous Silicon Photo-Transistor", The Japan Society of Applied Physics, vol. 32, No. 1S, Jan. 1993, pp. 58-60.

* cited by examiner

ID_DETERMINATION

CROSS REFERENCE TO RELATED APPLICATIONS

This application claims the benefit under 35 U.S.C. § 119(e), of U.S. Provisional Application No. 63/083,634, filed Sep. 25, 2020, and U.S. Provisional Application No. 63/117,983, filed Nov. 24, 2020, the contents of which are incorporated by reference herein in their entirety for all purposes.

FIELD OF THE DISCLOSURE

This generally relates to a stylus and, more particularly, to a stylus for an electronic device, and, more particularly, to such a stylus with receive architecture for position determination, as well as to systems, methods, and computer-readable media for use thereof.

BACKGROUND OF THE DISCLOSURE

Some systems may include an electronic device with a sensor assembly to facilitate a user's interaction with the device, as well as a stylus for providing a user with a more precise instrument than the user's fingers for interacting with the sensor assembly, such as for generating a graphical object on a display of the electronic device. However, existing systems often require that the stylus induce voltage changes on the device to determine the position of the stylus, which can be obscured by the presence of high noise at the device.

SUMMARY OF THE DISCLOSURE

Systems, methods, and computer-readable media for enabling position determination of a stylus with receive architecture are provided.

As an example, a method for determining a physical relationship of a stylus, including stylus capacitive receive architecture, with respect to an input component of an electronic device is provided that may include executing a relationship scan using a capacitive coupling interface between the stylus and the electronic device, wherein the capacitive coupling interface includes the stylus capacitive receive architecture, and wherein the executing includes sensing device stimulation signals from the electronic device with the stylus capacitive receive architecture, the method may further include communicating data from the stylus to the electronic device using a wireless communication interface between the stylus and the electronic device, wherein the data is based on the device stimulation signals as sensed by the stylus capacitive receive architecture, and the method may further include estimating, at the electronic device, the physical relationship of the stylus with respect to the input component using the communicated data.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION

Figure 1:
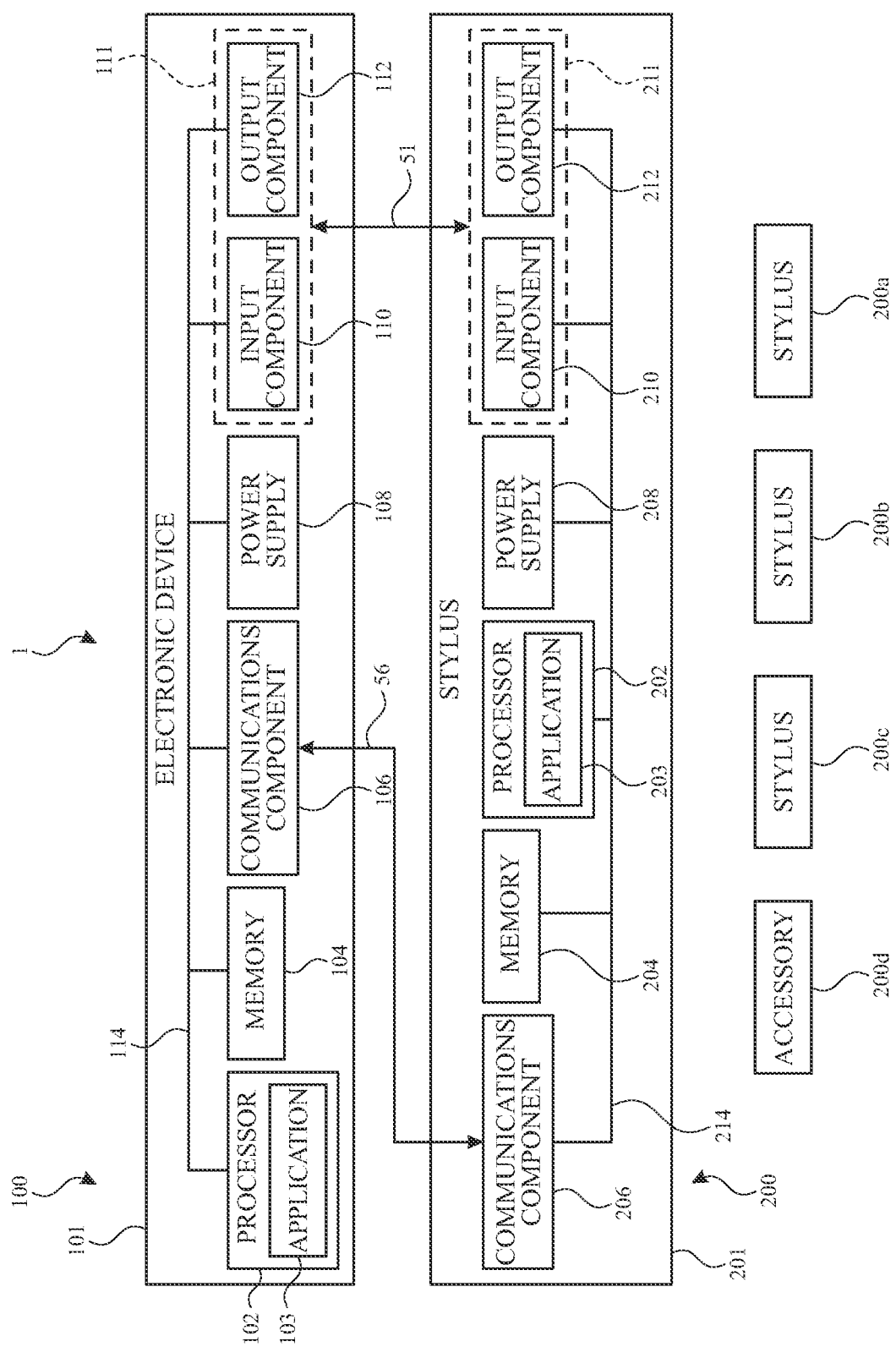
FIG. 1 is a schematic view of an illustrative user input system including an electronic device and a stylus with receive architecture.

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to one or more styli for interacting with a sensor assembly of an electronic device, such as for generating a graphical object on a display of the electronic device. Rather than generating an electric field at an electrode of a stylus such that the electric field may be detected by an array of electrodes of an electronic device touch sensor assembly in order to determine a location of the stylus along an input surface of the electronic device, the electronic device may instead generate and transmit device stimulation signals on various electrodes of the touch sensor assembly array (e.g., on row and/or column electrodes) such that the device stimulation signals may be detected or sensed or otherwise received by the electrode of the stylus when the stylus is placed on or near the input surface of the electronic device, whereby the stylus may then communicate the raw or optionally processed device stimulation signals as received by the stylus back to the electronic device over a dedicated communication pathway (e.g., a wireless communication pathway using Bluetooth or ultra-wideband technology), and whereby such communicated data (e.g., digital data) may be received and used by the electronic device in order to determine a location of the stylus along the input surface of the electronic device. This approach may utilize receive electrode(s) on the stylus rather than receive electrodes along the electronic device touch sensor assembly, which may provide better performance due to the stylus providing an environment with lower noise than the touch sensor assembly (e.g., a touch sensor assembly that may utilize on-cell touch technology, which often results in significant signal noise). Multiple receive electrodes on the stylus, such as a tip electrode, a ring electrode, and two or more segmented or split electrodes, may each be used to receive device stimulation signals presented by the touch sensor assembly of the electronic device, and the device stimulation signals received at various combinations of the stylus electrodes may be processed (e.g., on the stylus and/or on the electronic device or otherwise) to estimate the location, hover distance, polar angle (e.g., tilt or pitch), azimuthal angle, and/or stylus barrel roll rotation orientation of the stylus with respect to the input surface of the electronic device. The device stimulation signals, which may be generated and transmitted by the touch sensor electrode array of the electronic device for receipt by the stylus electrode(s), may utilize any suitable type of stimulation signal scheme, including, but not limited to, a multi-stimulation ("multistim") scan in which a spread code that may include an orthogonal matrix (e.g., a Hadamard matrix or any other suitable unique digital code) may be used for defining the device stimulation signals (e.g., different device electrodes may be stimulated simultaneously with respective different stimulation signals according to the spread code) and then may be utilized with a correlation calculation spread code (e.g., at the stylus and/or at the device) to detect a location of a stylus electrode with respect to the touch sensor electrode array based on the device stimulation signals as sensed by the stylus, quadrature scan in which quadrature modulation (e.g., quadrature frequency modulation) may be used for defining the device stimulation signals with alternating frequency and phase at successive device electrodes and a ratio of the amplitude and phase of the device stimulation signals received by a stylus electrode and/or the in-phase and quadrature ("I&Q") components and phase angle may enable an estimation for the spatial position of the stylus electrode with respect to the touch sensor electrode array, and/or the like. Generally, the device's touch sensor electrode array may transmit a spatial and temporal pattern of frequencies, amplitudes, and phases that are unique over an input surface of the device, and receive electrode(s) of the stylus may receive these patterns at its spatial location, whereby the data (or a subset of the data) received may be processed by the stylus and/or by the device to estimate the spatial position of the stylus accurately with respect to the device input surface. In some embodiments, in which the stylus transmits a subset of the data to the device, the subset of the data optionally includes data corresponding to receive signals from stimulation signals applied to touch electrodes within a threshold distance from the stylus tip (e.g., from 1-5 touch electrodes proximate to the tip). In some embodiments, the proximity of the touch electrodes to the stylus tip can be determined based on signal intensity. For example, maximum intensity signals (e.g., after correlation with the stimulation signals) may indicate the relative proximity to the stylus tip. In some embodiments, different amounts of data can be provided for different stylus electrodes. For example, in some embodiments, the data can include 3-5 largest intensity signals measured along the x and y axes based on stimulation signals received by the tip electrode of the stylus can be provided for location detection, but the data may only include a single maximum intensity signal measured based on stimulation signals received by the ring electrode of the stylus. In some embodiments, the device optionally uses the measurement of the system user's coupling to the touch electrodes of the device to estimate the electrostatic grounding reference of the stylus for improving the accuracy of the stylus location and/or orientation estimation. In some embodiments, the remainder of the data is optionally sent to the device over one or more subsequent transmissions. In some embodiments, some or all aspects of the physical relationship (e.g., the location, hover distance, polar angle, azimuthal angle, and/or barrel roll) of the stylus with respect to the device is optionally calculated at the device based on the subset of the data transmitted. In some embodiments, some or all aspects of the physical relationship of the stylus with respect to the device is optionally calculated at the stylus device (e.g., using processing circuitry of the stylus) and aspects of the physical relationship are transmitted to the device (instead of the raw data).

Systems, methods, and computer-readable media for enabling position determination of a stylus with receive architecture are provided and described with reference to FIGS. 1-5.

FIG. 1 is a schematic view of an illustrative system 1 with an electronic device 100 and a stylus 200. Stylus 200 (e.g., a marking tool, smart pen, smart brush, wand, chisel, user-manipulated electronic input device, hand-held input device, and the like, or any other suitable accessory, such as a glove) may be configured to provide input to electronic device 100 (e.g., a tablet computer, laptop computer, desktop computer, and the like). A system user may manipulate the orientation and position of stylus 200 relative to an input surface of electronic device 100 to convey information to electronic device 100, such as, but not limited to, writing, sketching, scrolling, gaming, selecting user interface elements, moving user interface elements, and so on. In many embodiments, the input surface of electronic device 100 may be a multi-touch display screen. However, in other embodiments, the input surface of electronic device 100 may be a non-display input surface, such as, but not limited to, a trackpad or drawing tablet. The input surface may be a foldable or flexible surface or display. System 1 may be used to capture free-form user input from stylus 200. For example, the user can slide, move, draw, or drag a tip of stylus 200 across the input surface of electronic device 100, which, in response, may render a graphical object (e.g., a line) using a display positioned below the input surface. In such an example, the rendered graphical object may follow or otherwise correspond to the path of stylus 200 across the input surface of electronic device 100. The thickness and/or shape and/or intensity and/or any other suitable rendered characteristic of the rendered graphical object may vary based, at least in part, on one, some, or each of various characteristics, including, but not limited to, a force or speed with which the user moves stylus 200 across the input surface, an angle and/or orientation of stylus 200 relative to the input surface (e.g., the inclination of stylus 200 relative to a plane of the input surface, a writing angle of stylus 200 relative to a horizontal writing line traversing the input surface, a rotation of stylus 200 about an axis relative to the input surface (e.g., barrel roll rotation orientation), etc.), a variable setting of a variable input component of stylus 200, which one of multiple tips of stylus 200 is interacting with the input surface, a variable setting of an application running on electronic device 100 (e.g., a virtual drawing space application), and/or a combination thereof. Collectively, stylus 200 and electronic device 100 may be referred to herein as a "user input" system 1.

Broadly and generally, system 1 may be operative to determine and/or estimate one or more outputs of stylus 200 (and/or changes therein over time as a scalar or vector quantity), to interpret the user's manipulation thereof as input to electronic device 100. For example, system 1 may be operative to estimate: the magnitude of force applied by a user's grip to stylus 200 (e.g., non-binary estimate of magnitude as a scalar or vector quantity); a magnitude (e.g., non-binary estimate of magnitude as a scalar or vector quantity) of force applied (e.g., . . . , force applied Fa) by stylus 200 to the input surface of electronic device 100; the location at which or the area over which stylus 200 may touch or nearly touch the input surface of electronic device 100; a polar angle of stylus 200 relative to a plane of the input surface (e.g., inclination of stylus 200 (e.g., a polar angle 118 (θ) (e.g., as may be defined between a vector normal to the plane of input surface 110*a* and a longitudinal axis 120 of stylus 200, such as a zenith))); an azimuthal angle of stylus 200 relative to an axis of the input surface (e.g., an azimuthal angle 122 (P) (e.g., as may be defined between the polar angle 118 (θ) and a reference vector within the plane of input surface 110*a*, such as an axis)); a vector or scalar representation of the angular position of stylus 200 relative to a plane of the input surface; three-dimensional coordinates (e.g., spherical, Cartesian, and so on) of one or more points along the length of stylus 200 relative to the input surface; stylus or barrel roll rotation orientation about a longitudinal axis of the stylus; and so on. In many embodiments, system 1 may be operative to monitor such variables over time to estimate rates of change therein as either scalar or vector quantities (e.g., velocity, acceleration, and so on). The operation of estimating or determining two-dimensional position coordinates of stylus 200 as a point (or area) within or parallel to a plane of the input surface, whether such operation is performed by electronic device 100, performed by stylus 200, and/or performed, at least in part, as a result of cooperation therebetween (or with one or more other electronic devices), is generally referred to herein as "locating" the stylus.

Electronic device 100 and/or stylus 200 can be configured to estimate and/or monitor the location of stylus 200 over time and compute differential or integral quantities such as, but not limited to, acceleration, velocity, total force applied, path length, and so on. For example, the operation of estimating the velocity and/or acceleration of stylus 200 relative to the input surface as stylus 200 is moved across that surface, whether such operation is performed by electronic device 100, performed by stylus 200, and/or performed, at least in part, as a result of cooperation therebetween (or with one or more other electronic devices), is generally referred to herein as estimating the "planar motion" of the stylus. The operation of estimating the angular velocity and/or acceleration of stylus 200 relative to a plane of the input surface as it is moved thereacross, whether performed by electronic device 100, performed by stylus 200, and/or performed, at least in part, as a result of cooperation therebetween (or with one or more other electronic devices), is generally referred to herein as estimating the "angular motion" of the stylus. Additionally or alternatively, electronic device 100 and/or stylus 200 can be configured to estimate the distance (e.g., Z-height) of a portion of stylus 200 (e.g., the tip of the stylus) from the input surface of device 100, and such an estimated distance may be used to determine a "make or break" event between the stylus and device, such as for making a determination when a drawn graphical line should start or stop or a stylus lift off event should occur. Additionally or alternatively, such an estimated distance may be used to enter or exit a hover mode in which the stylus is tracked by electronic device 100, and actions such as the display of stylus-related user interfaces may occur on the electronic device 100. For example, the stylus related user interfaces can include providing a user with information (e.g., a hint or tip to improve user experience) or for changing a characteristic of the stylus input (e.g., user interfaces for tool selection, color palette, etc. may be presented in a content creation application) on the electronic device 100.

Electronic device 100 may be any portable, mobile, or hand-held electronic device configured to interact with stylus 200 for changing any suitable characteristic(s) of device 100 (e.g., any suitable graphical object input tool characteristics that may be utilized to render a graphical object) in response to manipulation of stylus 200 across an input surface of electronic device 100. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., virtual drawing space applications, stylus detection applications, etc.)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., stylus 200) using any suitable communications protocol(s). For example, communications component 106 may support Wi-Fi (e.g., an 802.11 protocol), Ethernet, Bluetooth™, ultra-wideband ("UWB") or ultra wideband or ultra-wide band or ultraband, near field communication ("NFC"), radio-frequency identification ("RFID"), high frequency systems (e.g., 900 MHz, 2.4 GHZ, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. In some embodiments, the communication protocol(s) may be configured for low latency between the stylus 200 and the display of the electronic device 100 (e.g., less than 10 ms, less than 5 ms, less than 3 ms, etc.). Reducing the latency can allow for the device to receive and process data from the stylus without the functionality of the stylus lagging (e.g., lagging of inking in response to stylus position/orientation and/or changes in stylus position/orientation relative to the device). Communications component 106 may also include circuitry that can enable device 100 to be electrically coupled to another device or server or subsystem (e.g., stylus 200 or another user electronic device or server) and communicate with that other device, either wirelessly or via a wired connection.

Power supply ("power supply," "energy source") 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, ultrasonic line sensor, ultrasonic imaging array, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), thermal sensor, acoustic sensor, sonic or sonar sensor, radar sensor, image sensor, video sensor, global positioning system ("GPS") detector, radio frequency ("RF") detector, RF or acoustic Doppler detector, RF and/or UWB triangulation detector, electrical charge sensor, peripheral device detector, event counter, and any combinations thereof. Each input component 110 can be configured to provide one or more dedicated control functions for making selections or issuing commands associated with operating device 100. In some embodiments, sensor data may be combined to improve device performance. For example, information collected by an inertial sensor may be combined with position data collected by the electrostatic receivers to improve the responsiveness or smoothness of the measured position output at the device.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic outputs (e.g., rumblers, vibrators, etc.), taptic components (e.g., components that are operative to provide tactile sensations in the form of vibrations), and any combinations thereof.

For example, electronic device 100 may include a display as output component 112. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, an organic electroluminescence display, electronic ink, or another type of display technology or combination of display technology types. Alternatively, display 112 can include a flexible display, a foldable display, a movable display, and/or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera. In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen, that may receive input information through a user's and/or stylus' touch of a display screen and that may also provide visual information to a user via that same display screen. Input component 110 of electronic device 100 may provide an input surface relative to which a system user may manipulate the orientation and position of stylus 200 to convey information to electronic device 100. In many embodiments, such an input surface of input component 110 of electronic device 100 may be provided as a portion of a multi-touch display screen assembly (e.g., as a portion of I/O interface 111 with a display output component 112). However, in other embodiments, such an input surface of input component 110 of electronic device 100 may be a non-display input surface, such as, but not limited to, a trackpad or drawing tablet, whether or not device 100 may also include a display output component. The input surface of input component 110 may be a foldable or flexible surface or display.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, virtual drawing space applications, stylus or other suitable accessory detection applications, media playback applications, media editing applications, pass applications, calendar applications, state determination applications (e.g., device state determination applications, stylus state determination applications, accessory state determination applications, etc.), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 (e.g., due to interaction with a tip of stylus 200) and/or any other component of device 100 (e.g., stylus data from stylus 200 via communications component 106, etc.) may manipulate the one or more ways in which information may be stored on device 100 (e.g., in memory 104) and/or provided to a user via an output component 112 and/or as signals via sensing circuitry of a sensing screen of an input component 110 and/or to a remote subsystem (e.g., to stylus 200 and/or to any other electronic device or server via communications component 106). Application 103 may be accessed by processor 102 from any suitable source, such as from memory 104 (e.g., via bus 114) or from another device or server (e.g., from stylus 200 via communications component 106, and/or from any other suitable remote source via communications component 106). Electronic device 100 (e.g., processor 102, memory 104, or any other components available to device 100) may be configured to process graphical data at various resolutions, frequencies, intensities, and various other characteristics as may be appropriate for the capabilities and resources of device 100. Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, processor 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Stylus 200 may be any suitable accessory, digital input tool, marking tool, smart pen, smart brush, wand, chisel, user-manipulated electronic input device, hand-held input device, and/or the like that may be configured to interact with (e.g., receive or detect signals from and/or provide input to) electronic device 100. Stylus 200 may include any suitable control circuitry or processor 202, which may be similar to any suitable processor 102 of device 100, application 203, which may be similar to any suitable application 103 of device 100, memory 204, which may be similar to any suitable memory 104 of device 100, communications component 206, which may be similar to any suitable communications component 106 of device 100, power supply 208, which may be similar to any suitable power supply 108 of device 100, input component 210, which may be similar to any suitable input component 110 of device 100, output component 212, which may be similar to any suitable output component 112 of device 100, I/O interface 211, which may be similar to any suitable I/O interface 111 of device 100, bus 214, which may be similar to any suitable bus 114 of device 100, and/or housing 201, which may be similar to any suitable housing 101 of device 100. Although not shown in FIG. 1, power supply 208 can include a coil for electromagnetic charging of an energy storage device (e.g., a battery). In some embodiments, one or more components of stylus 200 may be combined or omitted. Moreover, stylus 200 may include other components not combined or included in FIG. 1. For example, stylus 200 may include any other suitable components or several instances of the components shown in FIG. 1 or only some but not all of the components shown in FIG. 1. For the sake of simplicity, only one of each of the components is shown in FIG. 1.

Moreover, as shown, system 1 may include one or more additional styli, such as one or more of styli 200a, 200b, and 200c, and/or one or more other types of accessory, such as accessory 200d, each of which may include any suitable components, such as a processor, application, memory, communications component, power supply, input component, output component, I/O interface, bus, housing, and/or the like, and may be similar to stylus 200. While each stylus of system 1 may be operative to be used with respect to an input surface of device 100 (e.g., one at a time (e.g., by a user) or two or more at a time simultaneously (e.g., by different users)), each stylus of system 1 may differ from one another with respect to one or more physical characteristics (e.g., color, weight, size, shape, material, circuitry, etc.) and/or with respect to one or more device input tool characteristics (e.g., graphical object input tool characteristics) associated with the stylus as may be determined by device 100 for defining any suitable device characteristic(s) (e.g., rendered characteristic(s) (e.g., color, thickness, shape, intensity, and/or the like) of a graphical object rendered by device 100) in response to manipulation of the stylus with respect to an input surface of device 100.

Generally and broadly, FIGS. 1A-1D reference user input system 1 including electronic device 100 and stylus 200. A user U (e.g., a user's hand with one or more fingers (e.g., user finger UF)) may manipulate the orientation and position of stylus 200 relative to input surface input component 110a (e.g., a particular input component 110) of electronic device 100 in order to detect and process and convey information to electronic device 100. User input system 1 may be configured to perform or coordinate multiple operations such as, but not limited to, locating stylus 200, estimating the angular position of stylus 200, estimating the magnitude of force by stylus 200 to input surface 110a, determining a variable setting of a variable input component 210 of stylus 200, determining a variable setting of an application 103 running on electronic device 100 (e.g., a virtual drawing space application), and/or a combination thereof. User input system 1 can perform these and other operations at the same time or at different times. In one non-limiting example, the operation of determining the location of stylus 200 can be performed simultaneously with the operation of determining the angular position of stylus 200, while the operation of estimating the magnitude of force by stylus 200 to input surface 110a may be performed only periodically and/or based on whether electronic device 100 is configured to accept force input from stylus 200 given a particular operational mode of electronic device 100 (or of stylus 200) at a particular time.

Figure 1A:
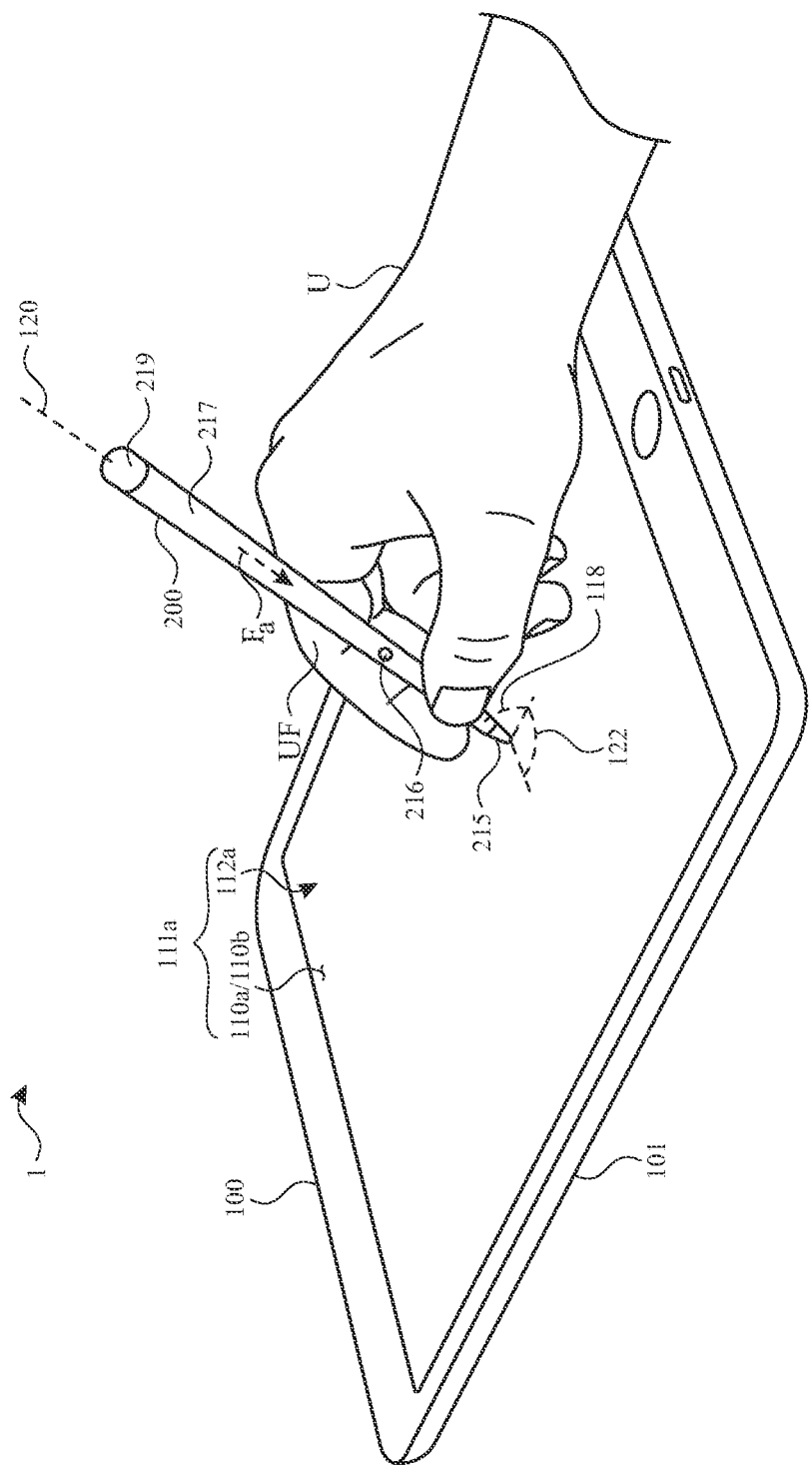
FIG. 1A is a perspective view of an example stylus interacting with an input surface of an example electronic device of the user input system of FIG. 1.

FIG. 1A depicts user U gripping a barrel or handle or body portion 217 of stylus 200 extending between a front tip portion 215 of stylus 200 and a rear tip portion 219 of stylus 200. User U may slide a tip portion, such as tip portion 215, of stylus 200 across input surface 110a of electronic device 100 to interact with a user interface presented or rendered on display output component 112a of electronic device 100, which may be positioned below at least a portion of input surface 110a or integrated with at least a portion of input surface 110a to provide I/O interface 111a of device 100. Although, in other embodiments, it is to be understood that device 100 may not include a display output component or may not include a display output component co-located with input surface 110a. Input surface 110a may be a foldable or flexible surface or display. As shown in FIGS. 1A-1D, device 100 may be presented as a tablet computing device as an example only, while many other electronic devices (with or without displays positioned below a stylus input surface) are envisioned. For example, the electronic device of user input system 1 can be implemented as a peripheral input device, a trackpad, a drawing tablet, and the like.

Stylus 200 may take various forms to facilitate use and manipulation by user U. In the illustrated example of FIGS. 1A-1D, stylus 200 may have a general form of a writing instrument, such as a pen or a pencil with a cylindrical body 217 with two ends, such as a first end terminated at front portion 215 and a second end terminated at rear portion 219. Either one or both of portions 215 and 219 can be removable and/or replaceable (e.g., by a user), affixed to body 217, or an integral part of body 217. User U may slide front portion 215 of stylus 200 across input surface 110a to convey information to electronic device 100. Electronic device 100 can interpret the user's manipulation of stylus 200 in any implementation-specific and suitable manner.

Body 217 of stylus 200 can be formed from any number of suitable materials, such as from plastics, metals, ceramics, laminates, glass, sapphire, wood, leather, synthetic materials, dielectric material, or any other material or combination of materials. Body 217 can form an outer surface (or partial outer surface) and protective case for one or more internal components of stylus 200 (e.g., as a portion of housing 201). Body 217 can be formed of one or more components operably connected together, such as a front piece and a back piece or a top clamshell and a bottom clamshell. Alternatively, body 217 can be formed of a single piece (e.g., uniform body or unibody). In some embodiments, body 217 may be configured, partially or entirely, as an optical signal diffuser to diffuse an infrared signal or another optical signal such as the light emitted from a multi-color light-emitting diode. In other cases, body 217 may be configured, entirely or partially, as an antenna window, allowing for wireless communications and/or electric fields to pass therethrough. Body 217 can be formed from a material doped with an agent configured to provide body 217 with a selected color, hardness, elasticity, stiffness, reflectivity, refractive pattern, texture, and so on. In other examples, the doping agent can confer other properties to body 217 including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, antistatic properties, liquid exposure reactivity properties, and so on.

Body 217 can exhibit a constant or a variable diameter cross-section. As illustrated, for example, the cylindrical cross-section view of body 217 may maintain a substantially constant diameter from tip portion 215 to rear portion 219. In other embodiments, body 217 can include a variable cross-section (e.g., a "profile" of body 217 can change across the length of body 217). In one example, the diameter of body 217 may be smaller near tip portion 215 than at rear portion 219. In some examples, the diameter of body 217 may bulge outward in the middle of body 217 between portions 215 and 219. In some cases, the profile of body 217 can follow a mathematical function such as a bump function, a Gaussian function, or a step function. Body 217 may include one or more grip features (not shown) such as embossments or impressions, closely-spaced channels, protrusions, projections, and/or the like. In some cases, a grip feature can be formed from a different material than body 217 (e.g., grip feature(s) may be formed from a polymer material exhibiting high friction).

Although illustrated as a cylinder, body 217 need not take a cylindrical shape in all embodiments. Accordingly, as used herein, the term "diameter" may refer to the linear distance that can connect two points of a two-dimensional shape, whether the shape is circular or otherwise. For example, stylus 200 can include a body 217 with an n-sided polygonal cross-section (e.g., a vesica piscis cross-section, a triangular cross-section, a square cross-section, a pentagonal cross-section, and so on) that either varies in diameter or is constant in diameter. In some examples, a cross-section of body 217 may be axially symmetric, although this is not required, as certain styli (styluses) in accordance with embodiments described herein may include body 217 with a cross-section that is reflectionally symmetric along one axis while being reflectionally asymmetric along another. In still further examples, body 217 can be formed into an ergonomic shape, including grooves, indents, and/or protrusions configured to enhance the comfort of user U. In some cases, body 217 may include a tapered section that decreases in diameter, linearly or non-linearly, toward tip portion 215. The diameter of body 217 at the interface of body 217 and tip portion 215 may be substantially similar to the diameter of tip portion 215 at that location. In this manner, the external surfaces of portions 215 and 217 may form a substantially continuous external surface of housing 201 of stylus 200. Additionally or alternatively, the diameter of body 217 at the interface of body 217 and rear portion 219 may be substantially similar to the diameter of rear portion 219 at that location. In this manner, the external surfaces of portions 217 and 219 may form a substantially continuous external surface of housing 201 of stylus 200.

One or more of portions 215, 217, and 219 of stylus 200 can define one or more apertures 216 in which one or more input components 210 and/or one or more output components 412 of stylus 200, such as a button, a dial, a slide, a force pad, a touch pad, audio component, haptic component, and the like, may at least partially reside and/or through which such component(s) may be at least partially exposed. The apertures (and, correspondingly, the input/output components associated therewith) can be defined at a lower end of body 217 nearby tip portion 215, such that the input/output components may be conveniently located near where user U may rest the user's forefinger (e.g., finger UF) when grasping stylus 200. As one example, an aperture 216 may expose at least a portion of a simple mechanical switch or button input component 210 that may be manipulated by user U for adjusting a variable setting of stylus 200 (e.g., stylus 200 may be configured to operate in a first mode when such an input component is manipulated in a first manner and in a second mode when such an input component is manipulated in a second manner). In some embodiments, the body 217 of stylus 200 may comprise a magnetic attachment component (not shown) for magnetically coupling the stylus 200 to a surface (e.g., to a side of electronic device 100). For example, the stylus and/or the device may include a magnet (e.g., a permanent magnet or electromagnet) or a ferromagnetic material to attach the stylus to the device using magnetic attraction.

Rear portion 219 of stylus 200, or more generally a "cap" of stylus 200, may be configured to provide a cosmetic end to body 217. In some cases, rear portion 219 may be formed integrally with body 217. In some cases, rear portion 219 may be formed similarly to front portion 215 for providing another tip feature for interacting with an input surface of device 100 (e.g., stylus 200 may be flipped over by user U to drag portion 219 across input surface input component 110a of electronic device 100 rather than to drag portion 215 across input surface input component 110a of electronic device 100, which may enable different user-selectable interactions with device 100). Any portion or the entirety of rear portion 219 may expose or provide at least a portion of a simple mechanical switch or button or any other suitable input component 210 (e.g., light sensor, color picker, etc.) that may be manipulated by user U for adjusting a variable setting of stylus 200 (e.g., stylus 200 may be configured to operate in a first mode when such an input component is manipulated in a first manner and in a second mode when such an input component is manipulated in a second manner).

Tip portion 215 of stylus 200, or more generally a "tip" of stylus 200, may be configured to contact or nearly contact input surface 110a of device 100 in order to facilitate interaction between user U and device 100. Tip 215 may taper to a point, similar to a pen, so that user U may control stylus 200 with precision in a familiar form factor. In some examples, tip 215 may be blunt or rounded, as opposed to pointed, or may take the form of a rotatable or fixed ball. Tip 215 may be formed from a softer material than input surface 110a. For example, tip 215 can be formed from a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In this manner, drawing of tip 215 across input surface 110a may not cause damage to input surface 110a or layers applied to input surface 110a, such as, but not limited to, anti-reflective coatings, oleophobic coatings, hydrophobic coatings, cosmetic coatings, ink layers, and the like. In some embodiments, tip 215 may include conductive or dielectric bristles in any suitable shape, such as in a pointed fine shape or a wedge shape and/or the like (e.g., to emulate an artist's brush). Tip 215 can be configured to be removably attached to body 217, such as via threadings/screws, detents and/or recesses, interference-fit or snap-fit, and/or magnetic attraction, and/or the like, and electrically coupled conductively or capacitively, such as through a pogo-pin, spring, and/or the like.

Electronic device 100 may locate and/or estimate the angular position of stylus 200 substantially in real time. Device 100 can perform these operations with and/or without communications from stylus 200. As shown in FIGS. 1A-1D, device 100 may be depicted as a tablet computing device, although this form-factor is not required of all embodiments (as noted above). For example, device 100 can be any suitable device, such as a desktop computer, laptop computer, cellular phone, an industrial or commercial computing terminal, a medical device, a peripheral or integrated input device, a hand-held or battery powered portable electronic device, a navigation device, a wearable device, and so on. Display output component 112a may be positioned below input surface 110a or may be integrated with input surface 110a.

The communication interfaces, whether between electronic device 100 and stylus 200 or between device 100 and another device or server, or otherwise, can be implemented as capacitive coupling interfaces (e.g., via I/O interfaces 111 and 211 (e.g., as capacitive coupling interface data 51 (e.g., signal(s) received by or adjusted by or made available by one of the interfaces to the other interface (e.g., a capacitive sensing or capacitance sensing communication interface between one or more stylus electrodes and one or more touch sensor device electrodes)))), inductive interfaces, resonant interfaces, optical interfaces, acoustic interfaces, magnetic interfaces, wireless interfaces or Bluetooth interfaces or ultra-wideband interfaces (e.g., via communication components 106 and 206 rather than between stylus and touch device electrodes (e.g., as wired/wireless (e.g., radio wave) communication interface data 56)), universal serial bus interfaces, Wi-Fi interfaces, TCP/IP interfaces, network communications interfaces, or any other suitable communication interfaces. In some embodiments, the communication interfaces can include, or otherwise be enabled by, wired or wireless communication circuitry. Electronic device 100 may provide information related to externally connected or communicating devices and/or software executing on such devices, messages, video, operating commands, and so forth (and may receive any of the foregoing from an external device), in addition to communications. Input surface 110a may cooperate with housing 101 of device 100 to form an external surface thereof. In some cases, a front surface of input surface 110a can be flush with an external surface of housing 101, although this is not required of all embodiments. In some examples, input surface 110a may stand proud of at least a portion of housing 101. Input surface 110a may be formed from glass or another suitable material, such as plastic, sapphire, metal, ceramic, ion-implanted glass, and so on. In some cases, input surface 110a may be a solid material, whereas in other cases, input surface 110a may be formed by laminating or adhering several materials together. Display component 112a may be positioned below, or integrated with, input surface 110a, where device 100 may utilize display 112a to render images to convey information to the user. Display 112a can be configured to show text, colors, line drawings, photographs, animations, video, three-dimensional content, and the like. Input surface 110a and/or display 112a may provide a foldable or flexible surface or display.

I/O interface 111a of device 100 can also include a sensor layer subassembly 110b positioned below, or integrated with, input surface 110a and/or display 112a, where device 100 may utilize the sensor layer to, among other purposes, detect the presence and/or location of stylus 200 or any other suitable accessory on input surface 110a. Additionally or alternatively, device 100 may utilize sensor layer subassembly 110b to detect the presence of another object on input surface 110a, such as a finger of the user. In still further examples, device 100 may utilize sensor layer subassembly 110b to detect the force with which an object, such as stylus 200, presses on input surface 110a. Such a sensor layer subassembly 110b (e.g., of I/O interface 111a) can be optically transparent or opaque. If sensor layer subassembly 110b of a particular embodiment is disposed within display 112a, a sensor layer of sensor layer subassembly 110b may be optically transparent so as to not impact the clarity of the display. In another example, sensor layer subassembly 110b may be disposed around the perimeter of the display, positioned below a bezel surrounding the display, and/or the like. In this embodiment, a sensor layer of sensor layer subassembly 110b need not be optically transparent. Input surface 110a and/or sensor layer subassembly 110b may provide at least a portion of a foldable or flexible surface or display. Sensor layer subassembly 110b may include a metallic grid that may be positioned between and not blocking one or more light-emissive elements of I/O interface 111a (e.g., for providing on-cell or in-cell electrodes). Additionally or alternatively, electrodes of sensor layer subassembly 110b could be shared with display electronics of I/O interface 111a (e.g., for providing in-cell electrodes).

Next, reference is made to the operation of locating stylus 200 on the input surface 110a of electronic device 100, using, for example, sensor layer subassembly 110b. Device 100 can locate tip 215 of stylus 200, and estimate the Cartesian coordinates thereof, in a number of suitable ways.

In some typical embodiments, stylus 200 is located as a result of cooperation between stylus 200 and electronic device 100. In some embodiments, generally and broadly, stylus 200 may generate an electric field having a small effective diameter (e.g., at one or more stylus electrodes (e.g., stylus electrode(s) acting as stylus transmit electrode (s)). This field may intersect input surface 110a of device 100 when stylus 200 is placed on or near input surface 110a, such that electronic device 100 may detect (e.g., as data 51) the field (e.g., with device electrodes of sensor layer subassembly 110b (e.g., device electrode(s) acting as device receive electrode(s))) and estimate the location of stylus 200 based on the location (and/or area) at which the field is detected.

More specifically, as noted above, electronic device 100 can include sensor layer subassembly 110b that may be configured to detect electric fields generated by stylus 200. In one embodiment, sensor layer subassembly 110b may include a number of capacitance sensing nodes (e.g., device electrodes) that can be located on or between any suitable layer on or within display 112a and/or on or within input surface 110a. In some embodiments, one or more measurements of sensor layer subassembly 110b operated in multiple modes can be algorithmically combined with measurements from the stylus to improve the coordinate estimation of the stylus. For example, the ground reference of the stylus may not be at the same dynamic potential as the device ground. For example, if a user holding the stylus is not in contact with the body of the device, but is touching or in proximity to one or more of the driving electrodes by having a portion of the user's hand touching the sensor surface, the body of the user and therefore the ground reference of the stylus can be modulated to some extent via charge injection from those electrodes. Such modulation can induce errors in the estimation of the stylus coordinates if the modulation coincides with the codes sampled by the stylus. In some embodiments, a different scan mode, such as a mutual-capacitance or self-capacitance scan estimating the contact of the user's fingers, can be used to estimate the relative coupling of the user to the touch nodes. This estimate can be then used to dynamically predict the modulation in reference potential between the device and the stylus held by the user when the device is configured to detect the stylus. Such modulation can be then compensated for in the codes received by the stylus, including codes emitted by electrodes of the device sampled by the tip of the stylus. The compensation may correct the measurement of the charge induced at the tip of the stylus to correlate with capacitive coupling between the device electrodes and the stylus tip. In some embodiments, the capacitive coupling uniquely identifies the three-dimensional coordinates of the stylus tip with respect to the device electrodes.

In some examples, the capacitive sensing nodes may be formed, at least in part, from an optically transparent conductor such as, but not limited to: metal oxides such as indium-tin oxide and antimony-tin oxide; nanowire patterns formed from silver nanowire, carbon nanotubes, platinum nanowire, gold nanowire, and so on; thin deposits of metal; and the like. The capacitive sensing nodes may be configured to operate in a self, mutual, or other capacitance mode, capacitively coupling to stylus 200 and detecting signals and fields generated thereby.

In some embodiments, in which the stylus includes a transmitting tip electrode, stylus 200 may create a substantially radial electric field to be generated from its tip. This field may affect the charge on each capacitive sensing node of the device nearby the tip. Electronic device 100 may locate stylus 200 on input surface 110a by monitoring each capacitive sensing node for these capacitive changes and estimating the location at which such changes (if any) have occurred. In some embodiments, in which a mutual capacitance sensing mechanism is utilized by a device, stylus 200 may comprise a substantially grounded conductor at its tip (e.g., grounded to a user holding the stylus and/or grounded to the device ground). The grounded conductor may affect the mutual capacitance between capacitive sensing nodes of the device near the tip. Electronic device 100 may locate stylus 200 on input surface 110a by monitoring each capacitive sensing node for these capacitive changes and estimating the location at which such changes (if any) have occurred. In some embodiments, the device can measure a current into a grounded electrode that corresponds to the changes in charge (e.g., proportional to electrical field strength, rather than power or energy). This current can be due to the change in capacitive coupling between a transmitter and a receiving electrode (e.g., a transmitter of the stylus and a receiver of the device or a transmitter of the device and a receiver of the stylus), or can be a capacitive change due to, for example, a grounded finger capturing come of the coupled charge from a transmitting electrode of the device that would have gone into the receiving electrode of the device (but for the presence of the grounded finger or grounded stylus tip electrode).

As used herein, the term "tip signal" may generally refer to an electrical signal applied by stylus 200 to tip 215. As used herein, the term "tip field" may generally refer to the electric field generated by tip 215 of stylus 200 (e.g., by a stylus tip electrode at or near tip 215 (e.g., electrode 242)) in response to the tip signal. The tip field may take any suitable shape, but in many embodiments, the tip field may take a substantially radial shape and may be modeled as a point source monopole electric field. The area of input surface 110a (or a plane parallel to input surface 110a) intersected by the tip field may generally be referred to herein as the "tip field intersection area."

The perimeter of the tip field intersection area may be defined as the boundary after which the power density (e.g., magnitude) of the tip field received by electronic device 100 is below a selected threshold. In one example, the circumference of the tip field intersection area may be defined at the half-power point of the tip field (e.g., 3 dB point). In other words, in this example, the tip field intersection area may be defined as a portion of input surface 110a intersected by the tip field with a magnitude at least greater than the half of the power at which that field was generated.

Because the tip field may be generated from the tip of the stylus, the tip field intersection area may shift substantially only based on the location of the stylus; the tip field intersection area may not, in typical embodiments, shift in a substantial manner based on the angular position of the stylus. Thus, in order to determine the location of the stylus, the electronic device may determine the geometric center of the tip field intersection area. However, as may be appreciated, the sensor layer of the electronic device may be disposed a distance below the outermost surface of the input surface. In these examples, the tip field intersection area may depend upon the angular position of the stylus (e.g., foreshortening/parallax effects).

In other embodiments, the location of the stylus can be determined by the electronic device, the stylus, or a combination thereof, in another manner. For example, electronic device 100 can determine a tip field perimeter shape, a location of a maximum of the tip field, and/or a location of a minimum of the tip field, and so on. In other words, it may be appreciated that although certain techniques are described herein, other suitable techniques may be employed by electronic device 100 or stylus 200 to determine the location of the stylus. For example, a centroiding technique can be used to find a weighted center of the alternating charge footprint (e.g., proportional to field strength) from a number of touch nodes (e.g., a touch node with a maximum tip field and one or more adjacent touch nodes in two dimensions).

In many cases, the same sensor layer can also be used to detect one or more fingers of the user while simultaneously detecting the tip field. In these cases, the electronic device can accept both touch input and stylus input. In particular, the capacitive sensing nodes may be operated in a touch input mode to detect a finger touch and operated in a tool input mode to detect a stylus input. The two modes may be switched at a rate that enables simultaneous or near simultaneous detection of both finger touches (multi-touch or single touch) and stylus input.

Figure 1B:
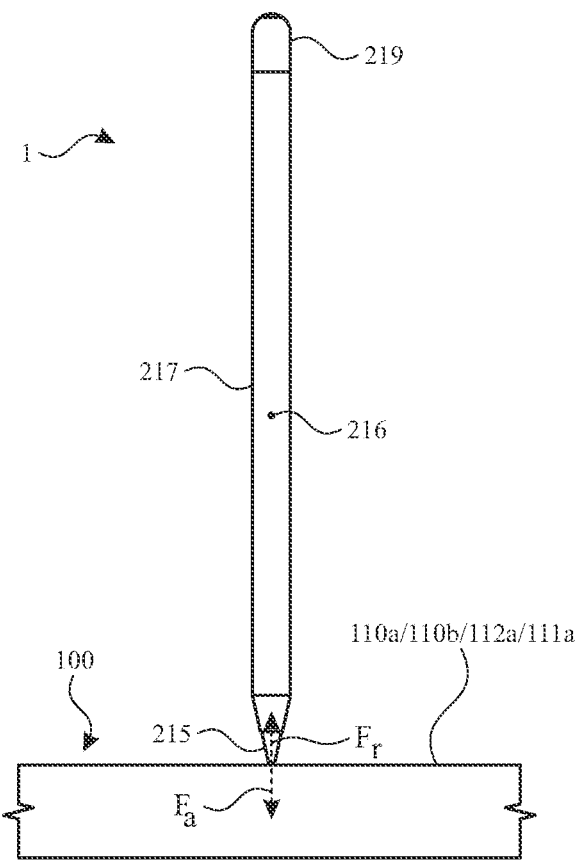
FIG. 1B is a side view of a portion of the user input system of FIGS. 1 and 1A with the stylus oriented normal to the input surface of the electronic device.
Figure 1C:
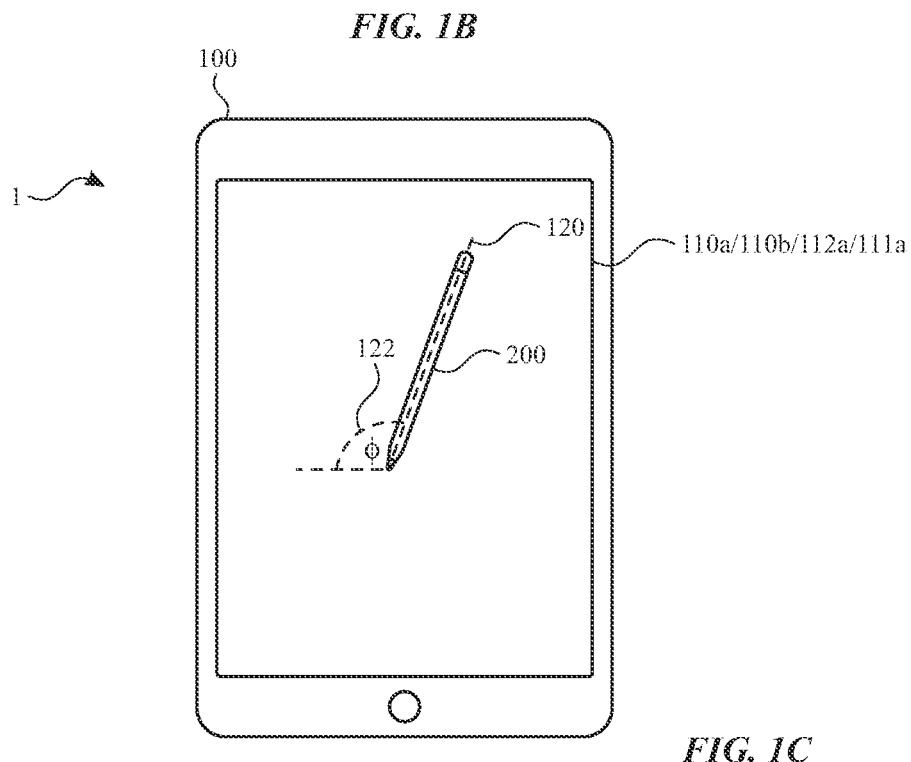
FIG. 1C is a front view of the user input system of FIGS. 1-1B showing the stylus oriented at an azimuthal angle of the stylus relative to a horizontal axis of the plane of the input surface of the electronic device.
Figure 1D:
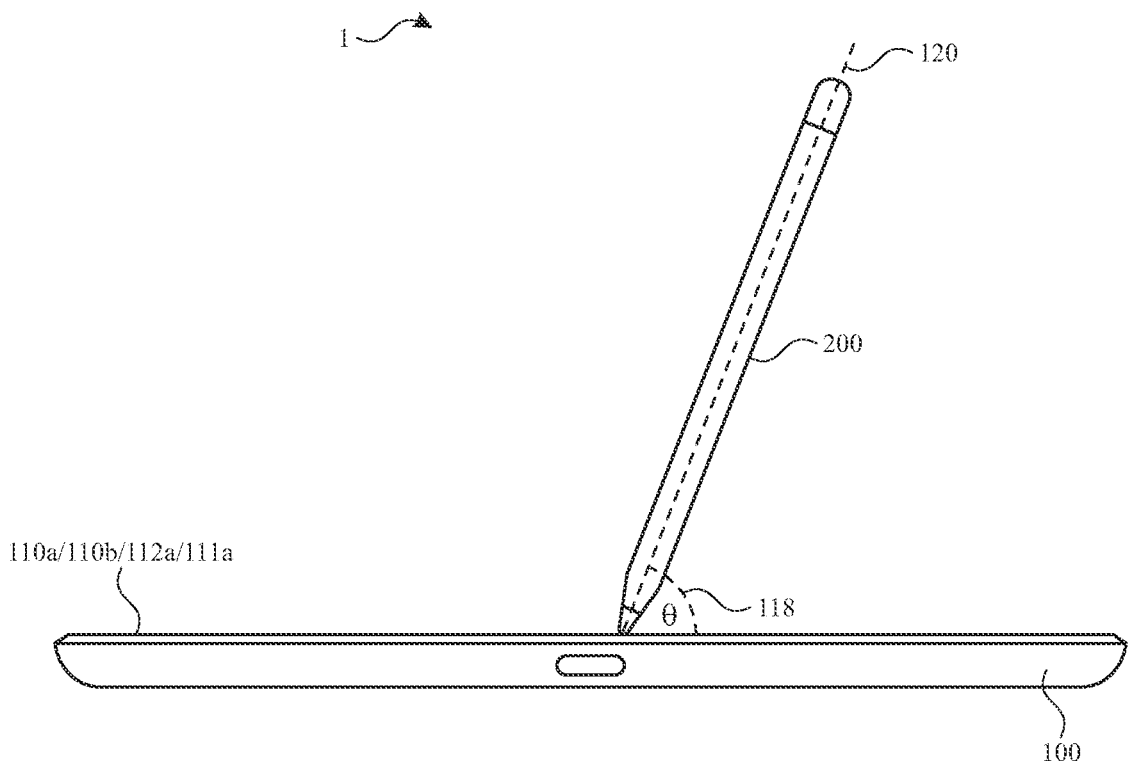
FIG. 1D is a side view of the user input system of FIGS. 1-1C showing the stylus oriented at a polar angle of the stylus relative to the plane of the input surface of the electronic device.

Referring next to FIGS. 1B-1D, reference is made to the operation of estimating the angular position of stylus 200 with respect to input surface 200. In these embodiments, stylus 200 may generate a second electric field that is separate and offset from the tip field. The second electric field may be coaxially aligned with the tip field, and both fields may be axially symmetric along the longitudinal axis of stylus 200, thereby allowing stylus 200 to be grip-agnostic.

In order to ensure that the tip field and the second electric field are axially symmetric, many embodiments may generate the second electric field with an electrically-conductive ring or tube (e.g., with a stylus ring electrode (e.g., electrode 248)) that may have a small diameter (e.g., segmented or continuous). In some embodiments, the diameter of the electrically-conductive ring (e.g., ring electrode(s)) may be approximately equal to the width of the electrical conductor that may generate the tip field (e.g. Tip electrode) (e.g., within one millimeter). A signal line that may be responsible for conveying the tip signal to tip 215 may pass through the electrically-conductive ring. In this manner, the field generated by the electrically-conductive ring can be axially symmetric; and the field may not be affected by the presence of signal lines that may be responsible for conveying the tip signal to the tip.

As used herein, the term "ring signal" may generally refer to the electrical signal that may be applied by stylus 200 to generate the second electric field. In many embodiments, the second electric field may also be a substantially radial electric field due to the small diameter of the ring-shaped electrical conductor. In other words, although the source of the field may be a ring-shaped conductor and not a point source, the radius of the conductor may be small enough in comparison to the distance separating the conductor from the tip (and thus the input surface 110a of device 100) that the ring field may appear to electronic device 100 as having originated from a point-source monopole.

In some embodiments, the ring-shaped electrical conductor may be a tube or cylinder. In these embodiments, the electric field generated may take a capsule shape (e.g., a cylinder capped with hemi-spherical ends). In these embodiments, the ring-shaped conductor may have a longitudinal axis that may be aligned along the longitudinal axis 120 of stylus 200. In this manner, one hemi-spherical end of the capsule-shaped electric field that may be generated from the tube-shaped electrical conductor may be oriented toward tip 215 of stylus 200.

As with the tip field, as used herein, the term "ring field" may generally refer to an electric field that may be generated by the stylus (e.g., by a stylus ring electrode (e.g., electrode 248)) in response to the ring signal. The area of input surface 110a (or a plane parallel to the input surface) that may be intersected by the ring field may be generally referred to herein as the "ring field intersection area."

In other embodiments, the angular position of stylus 200 can be determined by electronic device 100, stylus 200, or a combination thereof, in another manner. For example, the electronic device can determine a ring field perimeter shape, a location of a maximum of the ring field, a location of a minimum of the ring field, and so on. In other words, it may be appreciated that although certain techniques are described herein, other suitable techniques may be employed by an electronic device or stylus to determine the angular position of the stylus.

Thus, generally and broadly, a stylus may generate two different electric fields, the origins of which may be offset from one another by a certain distance. The electric fields may be aligned with one another along the longitudinal axis of the stylus so that the fields may be axially symmetric. The first field may originate proximate to the tip of the stylus and may be referred to as the tip field. The second field may originate a small distance offset from the tip field and may be referred to as the ring field. Both the tip field and the ring field may be substantially radial (or hemiradial) in the direction of the tip of the stylus. When in use, the tip field and the ring field respectively may intersect an input surface (e.g., input surface 110a) of an electronic device (e.g., electronic device 100) over a tip field intersection area and a ring field intersection area. In many cases, the intersection areas may be substantially circular.

As with the tip field intersection area, the perimeter of the ring field intersection area may be defined as the boundary after which the power density (e.g., magnitude) of the ring signal received by the electronic device may be below a selected threshold. In one example, the circumference of the ring field intersection area may be defined at the half-power point of the ring field (e.g., 3 dB point). In other words, in this example the ring field intersection area may be defined as a portion of the input surface that may be intersected by the ring field with a magnitude at least greater than half of the power at which that field was generated.

The tip signal and the ring signal can each have at least one alternating current component that, via capacitive coupling or another suitable sensing technique, may be received by the sensor layer of the electronic device. In many embodiments, the frequency of the tip signal may be different from the frequency or modulation pattern of the ring signal (e.g., frequency multiplexing). In other cases, the tip signal and the ring signal can be time-multiplexed.

However, unlike the tip field, the ring field intersection area may shift based on the angular position of the stylus, specifically because the origin of the ring field (e.g., the ring-shaped electrical conductor) may be separated from the tip. Thus, tilting the stylus in one direction or another may cause the ring field intersection area to change in area and/or location, while the tip field intersection area may remain substantially fixed.

In these embodiments, the relative positions of the tip field intersection area and the ring field intersection area can be used to estimate the polar angle and the azimuthal angle of the stylus. More particularly, the farther apart the geometric centers of the tip field intersection area and the ring field intersection are from one another, the smaller the polar angle (e.g., the closer the stylus may be to parallel with the input surface) of the stylus relative to the input surface of the electronic device. Similarly, the angle of the vector defined between the geometric centers of the tip field intersection area and the ring field intersection area can be used to estimate the azimuthal angle of the stylus relative to the input surface.

In another non-limiting phrasing, in many embodiments, the electronic device may use the known spherical diameter of the tip and ring field, diameter of the ring field intersection area, and/or the distance between the tip and the ring in order to estimate a polar angle 118 (e.g., defined between a vector normal to the plane of input surface 110a and longitudinal axis 120 of stylus 200, such as a zenith) and an azimuthal angle 122 (e.g., defined between polar angle 118 and a reference vector within the plane of input surface 110a, such as an axis). Various suitable detection and processing operations and modeled equations may be carried out and/or developed and/or utilized by system 1 to determine such angles using such known quantities, including those described by U.S. Patent Application Publication No. 2017/0068339, which is hereby incorporated by reference herein in its entirety.

Many embodiments are described herein with reference to sensor layer subassembly 110b of electronic device 100 that may be configured to detect a tip signal and a ring signal by monitoring mutual capacitance (e.g., measuring a change in charge on electrodes of the device in proximity to a changing voltage of transmitted by the stylus on the tip electrode(s) and/or ring electrode(s)). However, it may be appreciated that electronic device 100 can be appropriately configured in any implementation-specific manner to detect both a ring field and/or a tip field. For example, electronic devices can include a sensor layer configured to monitor for changes in the self-capacitance of one or more capacitive sensor nodes (e.g., measuring a change in charge at the electrodes of the device which are stimulate with a voltage) or in another capacitive sensing mode (e.g., measuring changes in charge on the electrodes of the device held at a constant voltage that may be induced by an external source, such as the tip or ring electrodes being driven with a changing voltage). In other examples, an electronic device can be configurable to operate in a self-capacitance mode, a mutual capacitance mode, and/or a capacitive sensing mode. In other embodiments, other sensing techniques can be used to determine the location and relative position of a tip electrode and a ring electrode of a stylus with respect to an electronic device input surface.

As mentioned, in other embodiments, generally and broadly, rather than device 100 detecting electric fields transmitted by stylus electrodes of a stylus, device 100 may generate and transmit device stimulation signals on various device electrodes (e.g., on row and/or column electrodes of sensor layer 110b (e.g., device electrode(s) acting as device transmit electrode(s))). These device stimulation signals may be detected or sensed or otherwise received in some manner (e.g., as data 51) by stylus 200 (e.g., at one or more stylus electrodes (e.g., stylus electrode(s) acting as stylus receive electrode(s))) when stylus 200 is placed on or near input surface 110a of device 100, such that stylus 200 may then communicate (e.g., as data 56) the raw or optionally processed device stimulation signals as received by the stylus back to device 100 (also referred to as raw or processed receive signals) or a subset thereof, where such communicated data may be received and used by device 100 to estimate the location of stylus 200. As described in more detail with respect to FIGS. 2E-5, the device stimulation signals that may be generated and transmitted by the touch sensor electrode array of the electronic device for receipt by the stylus electrode(s) may utilize any suitable type of stimulation signal scheme, including, but not limited to, a multi-stimulation ("multi-stim") scan in which a spread code that may include an orthogonal matrix (e.g., a Hadamard matrix or any other suitable unique digital code) may be used for defining the device stimulation signals (e.g., different device electrodes may be stimulated simultaneously with respective different stimulation signals according to the spread code) and then may be utilized with a correlation calculation spread code (e.g., at the stylus and/or at the device) to detect a location of a stylus electrode with respect to the touch sensor electrode array based on the device stimulation signals as sensed by the stylus, quadrature scan in which quadrature modulation (e.g., quadrature frequency modulation) may be used for defining the device stimulation signals with alternating frequency and phase at successive device electrodes and a ratio of the amplitude and phase of the device stimulation signals received by a stylus electrode and/or the in-phase and quadrature ("I&Q") components and phase angle may enable an estimation for the spatial position of the stylus electrode with respect to the touch sensor electrode array, and/or the like. Generally, the device's touch sensor electrode array may transmit a spatial and temporal pattern of frequencies, amplitudes, and phases that are unique over an input surface of the device, and receive electrode(s) of the stylus may receive these patterns at its spatial location, whereby the data (or a subset of the data) received may be processed by the stylus and/or by the device to estimate the spatial position of the stylus accurately with respect to the device input surface. In some embodiments, the electrode array elements can emit pseudorandom sequence voltages (e.g., either baseband or modulated). In some embodiments, the pseudorandom sequences are time shifted versions of a base pseudorandom sequence. In some embodiments, processing circuitry of the stylus 200 may correlate the received currents from the tip with a pseudorandom sequence, and transmit the correlation value to the device. In some embodiments, processing circuitry of the stylus 200 may perform a running correlation of the received currents from the tip with a pseudorandom sequence, and transmit the maximum correlation value, and the time of the maximum correlation value, to the device. In some embodiments, the time and magnitude of correlations measured by the stylus are compared in a physical model of the pen signals, and the position of the stylus in x, y, z coordinates and azimuthal angle (and/or other orientation angles) are estimated by the highest correlation with the physical model.

Returning to FIG. 1B, reference is made to the operation of estimating the force applied Fa by stylus 200 to input surface 110a. As with other embodiments described herein, the force applied by stylus 200 can be estimated, measured, approximated, or otherwise obtained in a number of ways.

In some examples, the force may be estimated by electronic device 100. In other examples, the force may be estimated by stylus 200, after which stylus 200 may communicate the estimated force to electronic device 100 (e.g., as data 56 (e.g., via a wireless communication interface)) as a vector or scalar quantity using any suitable encoded or not-encoded format. In still further embodiments, a force estimate obtained by electronic device 100 and a force estimate obtained by stylus 200 can be combined, averaged, or otherwise used together to estimate the magnitude of force applied by stylus 200.

Initially, reference is made to embodiments in which electronic device 100 may estimate the force applied Fa by stylus 200. In these embodiments, electronic device 100 can include one or more components configured to estimate and/or approximate force applied to input surface 110a. Upon estimating that the tip of the stylus is contacting the input surface, the electronic device may estimate the force applied thereby. In these embodiments, the force estimated by the electronic device can be obtained as a force vector normal to the input surface. In these cases, the electronic device may resolve the force vector (e.g., using the law of cosines) into a vector component parallel to the longitudinal axis of the stylus and a component parallel to the input surface using the polar angle and the azimuthal angle (e.g., as computed in accordance with techniques described herein or by U.S. Patent Application Publication No. 2017/0068339, which is hereby incorporated by reference herein in its entirety). The electronic device can interpret the magnitudes or directions of either or both of the component parallel to the input surface and the component parallel to the angular position of the stylus as a user input.

Next, reference is made to embodiments in which stylus 200 may estimate the force applied Fa to input surface 100a. In these examples, the stylus may estimate the reaction force Fr experienced by the stylus itself; the reaction force Fr, being equal in magnitude and opposite in sign of the force applied Fa by the stylus to the input surface. As described by U.S. Patent Application Publication No. 2017/0068339, various embodiments are possible in which stylus 200 may estimate the force applied Fa to input surface 100a. In one embodiment, the tip of the stylus may be formed, at least partially, from a force-sensitive material, such as piezoelectric material, and a circuit within the stylus may estimate an electrical property of the force-sensitive material in order to estimate whether the tip of the stylus is experiencing a reaction force Fr, and, after obtaining an estimate of the reaction force, the stylus can communicate the force applied by the tip to the electronic device (e.g., as data 56). In another embodiment, a force-sensitive structure can be integrated between the tip and the barrel of the stylus, and the force-sensitive structure can include a number of independent force sensors, disposed within a gasket seal positioned between the tip and the barrel, and a circuit within the stylus may estimate an electrical property of the gasket seal in order to estimate whether the tip is experiencing a reaction force, and, thereafter, the stylus can communicate the force applied by the tip to the electronic device (e.g., as data 56). There are many other potential embodiments, varying in electrical and/or mechanical structures of the stylus and/or of the electronic device in order to determine the force applied and/or the reaction force.

The foregoing description of the embodiments depicted in FIGS. 1A-ID, and various alternatives and variations, are presented, generally, for purposes of explanation, and to facilitate a thorough understanding of the embodiments presented below. However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the user input system depicted in FIGS. 1-1D including an electronic device and a stylus can be implemented in a number of suitable and implementation-specific ways.

However, broadly and generally, the electronic device may determine and/or estimate characteristics of the stylus and/or changes therein over time, to interpret the user's manipulation thereof as input. The electronic device obtains, through its own estimate or by communication with data received and transmitted by the stylus, the location of the stylus, the angular position of the stylus, the force applied by the stylus to the electronic device, the velocity of the stylus, the acceleration of the stylus, the polar angular velocity or acceleration of the stylus, the azimuthal angular velocity or acceleration of the stylus, the barrel roll rotation orientation of the stylus, and so on. Any of these operations, or portions of these operations, may be performed by the electronic device, by the stylus, and/or performed, at least in part, as a result of cooperation and communication therebetween.

Figure 2:
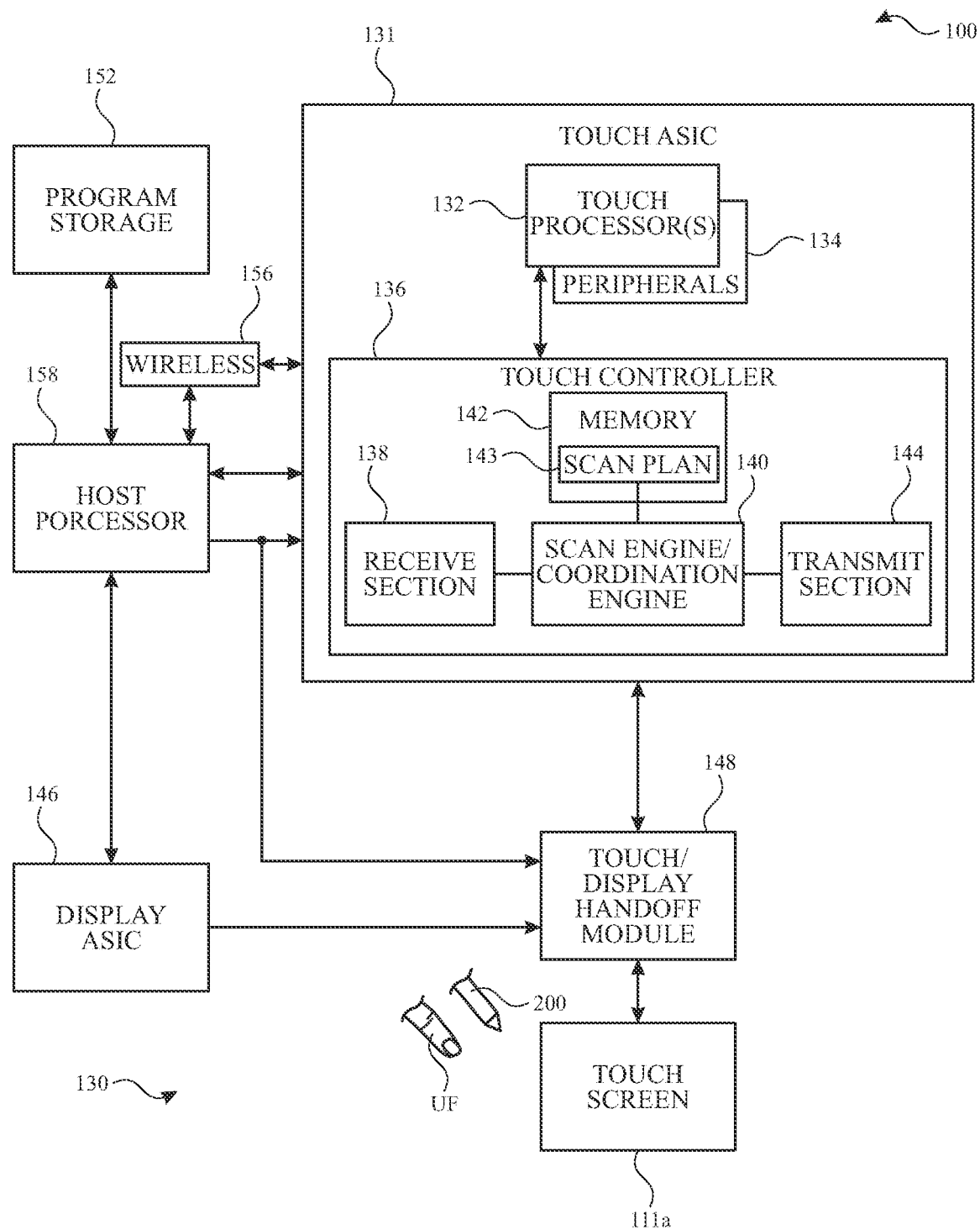
FIG. 2 is a block diagram of an example computing subsystem of the electronic device of the user input system of FIGS. 1-1D that may be configured to receive input from the stylus of the user input system of FIGS. 1-1D.
Figure 2A:
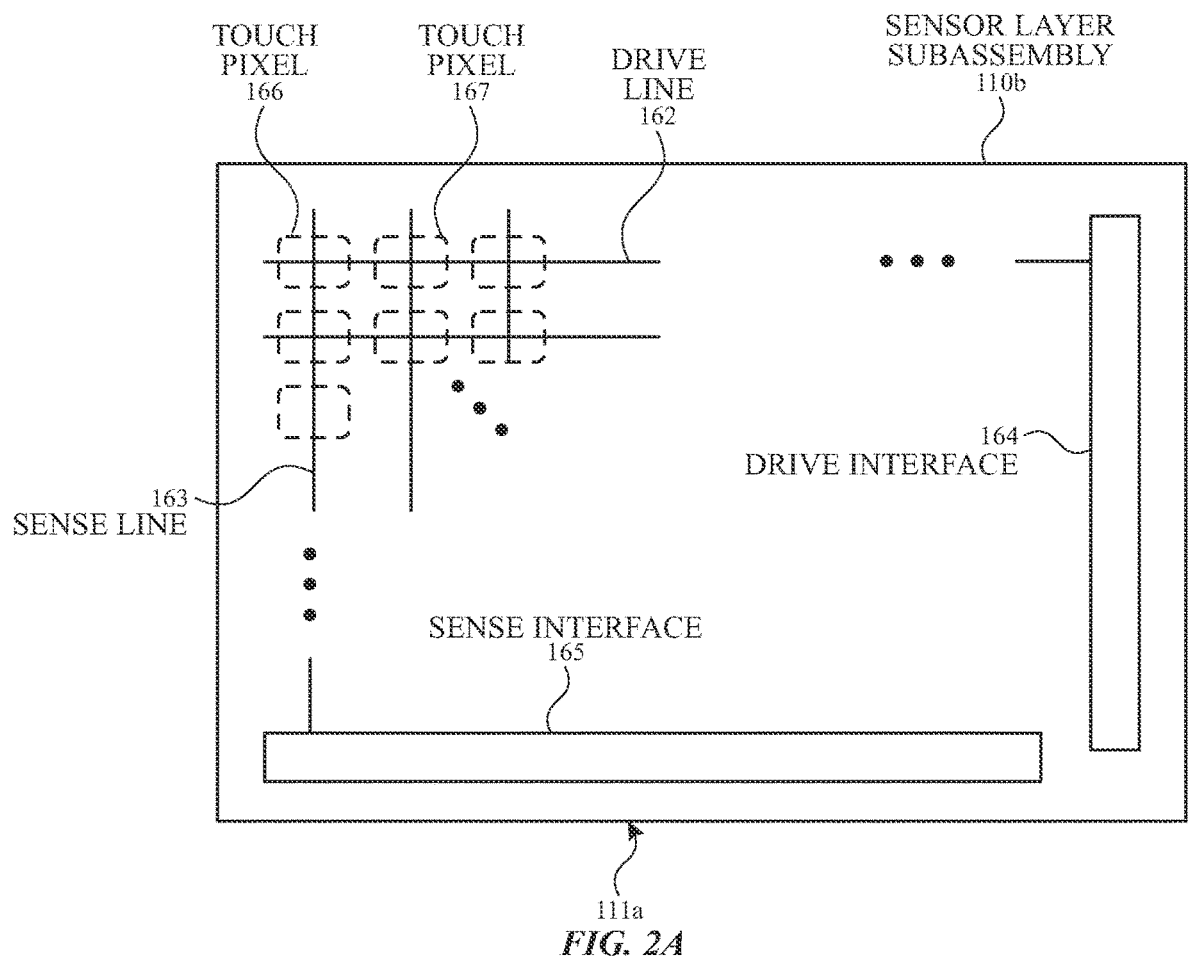
FIG. 2A is an example touch screen I/O interface with a sensor layer subassembly of the computing subsystem of FIG. 2.
Figure 2B:
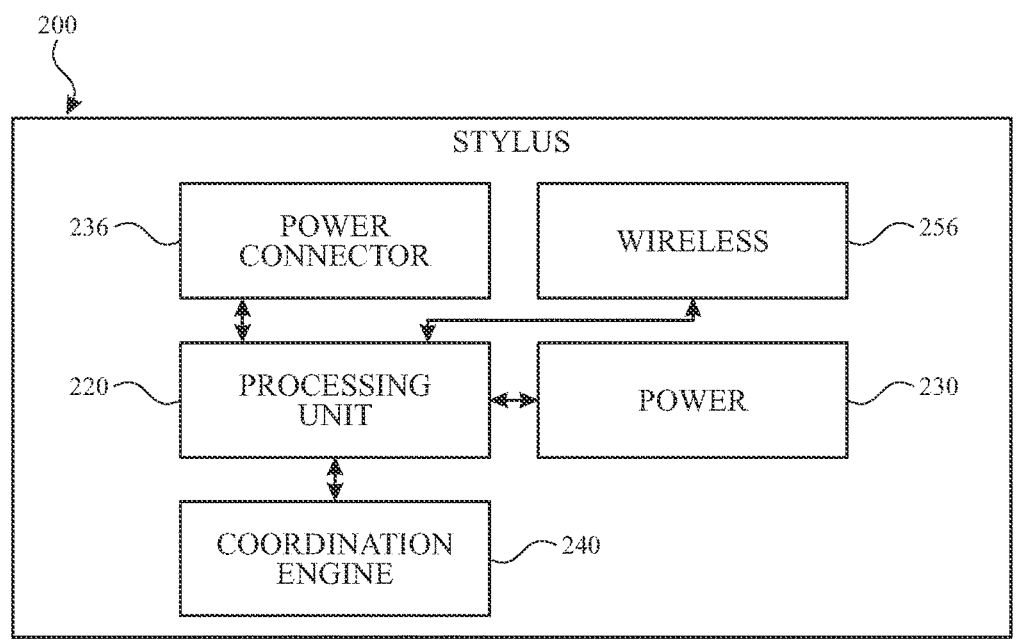
FIG. 2B is a block diagram of the stylus of the user input system of FIGS. 1-2A.
Figure 2C:
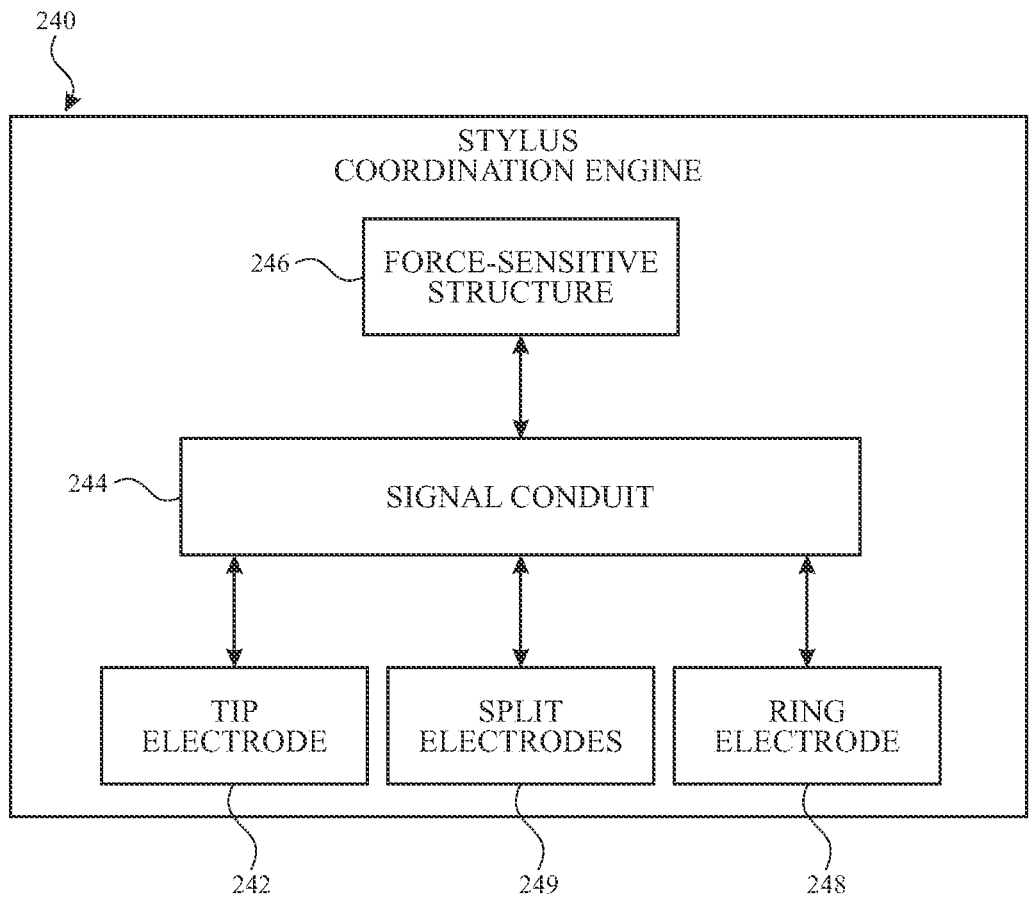
FIG. 2C is a block diagram of a coordination engine of the stylus of FIGS. 1-1D and 2B.
Figure 2D:
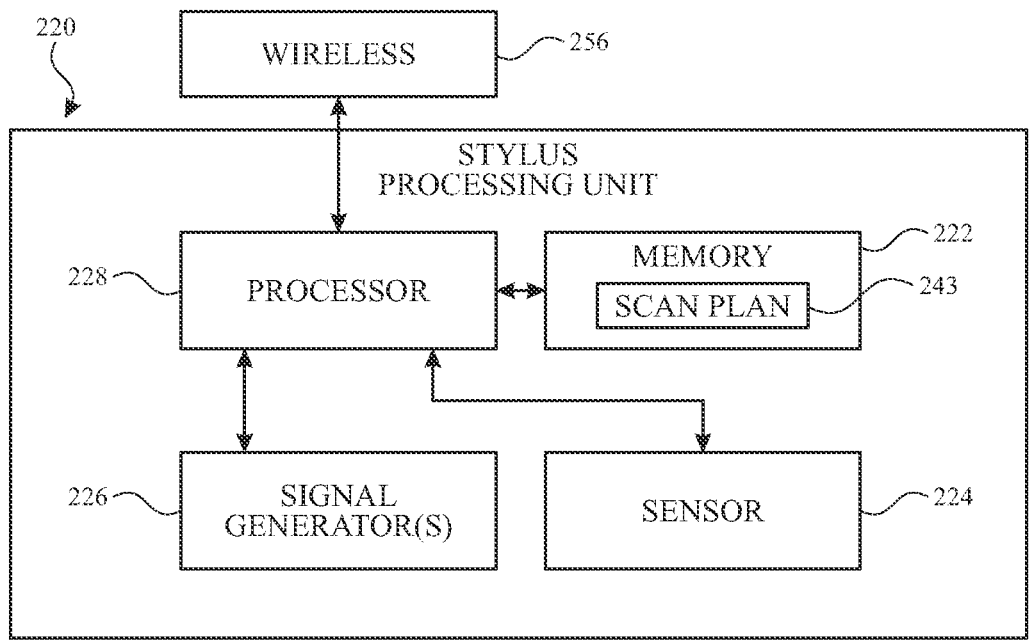
FIG. 2D is a block diagram of a processing unit and a wireless interface of the stylus of FIGS. 1-1D, 2B, and 2C.
Figure 2E:
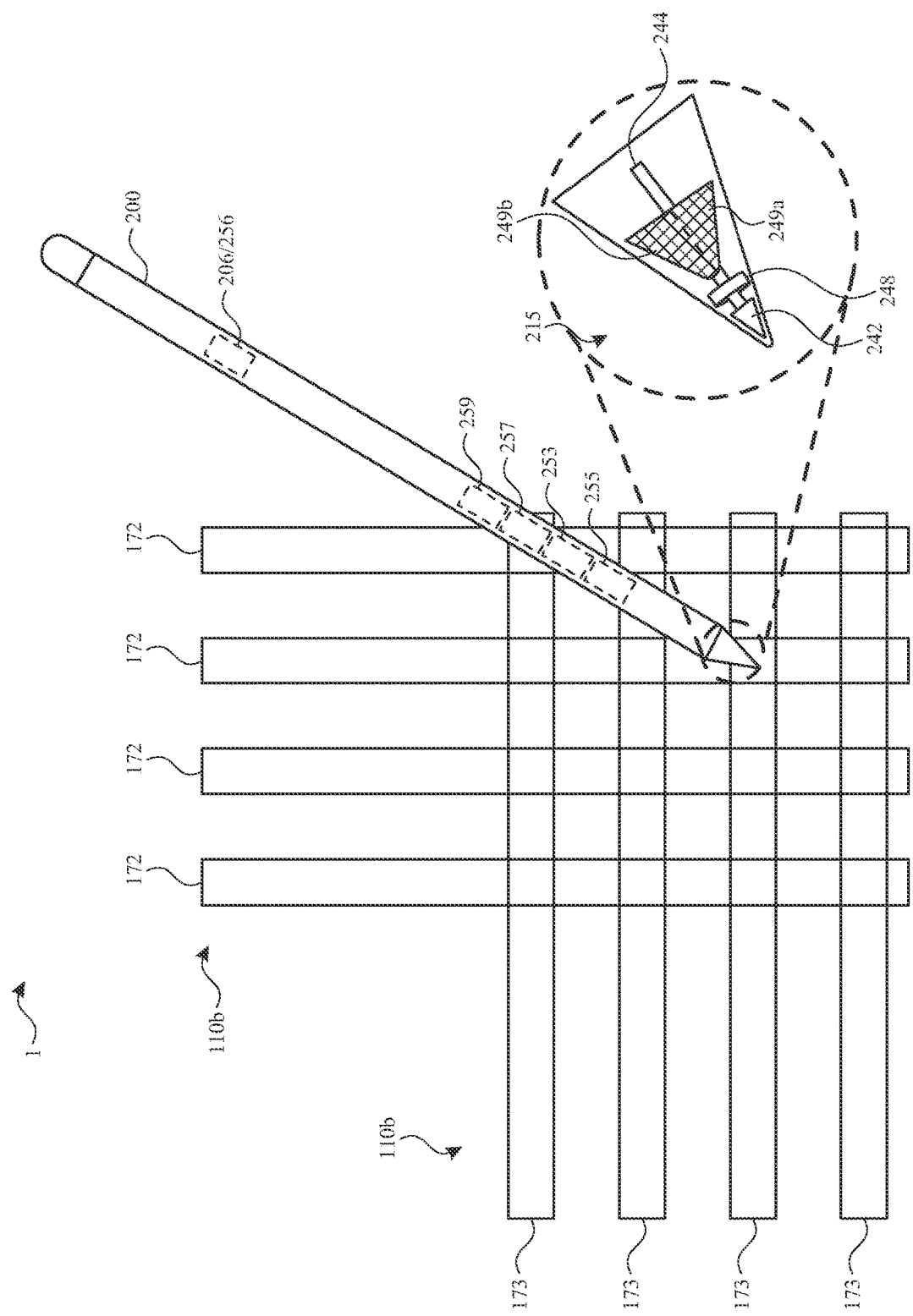
FIG. 2E is a perspective view of the stylus of FIGS. 1-1D and 2B-2D interacting with the electronic device of FIGS. 1-2A.

FIGS. 2-2E generally depict simplified system diagrams of a user input system 1 including electronic device 100 and stylus 200, and various sub-portions thereof. For simplicity of illustration, many of these simplified system diagrams may be presented without signal and/or interconnection paths between system elements that may be required or desirable for a particular embodiment. Accordingly, it may be understood that one or more of the various system elements depicted in FIGS. 2-2E may be electrically or communicably configured, in an implementation-specific and appropriate manner, to be in communication with any other appropriate system element. Particularly, one or more of the various system elements can be configured to exchange data, power, analog or digital signals, or the like, via one or more circuit traces, jumpers, cables, wired or wireless communication interfaces, data buses, and so on with any other appropriate system element. Similarly, it may be understood that one or more of the various system elements depicted in FIGS. 2-2E may be mechanically configured, in an implementation-specific and appropriate manner, to be coupled to (or to be mechanically isolated from) any other appropriate system element.

Accordingly, the absence or presence of a signal path and/or an interconnection path between various system elements of FIGS. 2-2E is not to be construed as a preference or requirement for the presence or absence of any particular electrical or mechanical relationship between the various system elements.

As mentioned, electronic device 100 can be implemented as any suitable electronic device including, but not limited to: a desktop computer, laptop computer, cellular phone, an industrial or commercial computing terminal, a medical device, a peripheral or integrated input device, a hand-held or battery powered portable electronic device, a navigation device, a wearable device, and so on, while stylus 200 can be formed to take substantially any shape that can be manipulated by a user (e.g., with one hand of a user). For example, in many embodiments, stylus 200 may take the shape of a stylus, a pen, a smart brush, a wand, a chisel, and so on. A user may manipulate the orientation and position of stylus 200 relative to input surface 110a of electronic device 100 to convey information to electronic device 100. In many embodiments, the input surface of the electronic device may be a display screen, but this is not required; in other embodiments, the input surface can be a non-display input surface, such as a touchpad or trackpad or drawing tablet. Therefore, I/O interface 111a may be referred to herein, generally, as a touch screen I/O interface, with or without an accompanying display, where touch may be in reference to a user's direct touch or via a stylus or other suitable accessory or object.

Touch screen I/O interface 111a can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (e.g., orthogonal). Touch pixels (touch nodes) can be formed at the intersections or adjacencies (e.g., in single layer configurations) of the rows and columns. During operation, the rows can be stimulated with an alternating current ("AC") waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

FIG. 2 illustrates a block diagram of an example device computing subsystem 130 that can receive input from a stylus according to examples of the disclosure. Computing subsystem 130 could be included in, for example, any suitable electronic device 100 that includes a touch screen I/O interface. Computing subsystem 130 can include touch screen I/O interface 111a to detect (e.g., with sensor layer input component or sensor layer subassembly 110b) touch and/or proximity (e.g., hover) events from an object (e.g., any suitable portion of user U (e.g., user finger UF) or any suitable stylus (e.g., stylus 200)) at or proximate to a surface of the touch screen I/O interface (e.g., surface 110a) and/or to display images to the user (e.g., with display 112a). Computing subsystem 130 can also include an application specific integrated circuit ("ASIC") illustrated as touch ASIC 131 to perform touch and/or stylus sensing operations. Touch ASIC 131 can include one or more touch processors 132, peripherals 134, and touch controller 136. Touch ASIC 131 can be coupled to touch sensing circuitry of touch screen I/O interface 111a (e.g., sensor layer subassembly 110b) to perform touch and/or stylus sensing operations. Peripherals 134 can include, but are not limited to, RAM or other types of memory or storage, watchdog timers, and the like. Touch controller 136 can include, but is not limited to, one or more sense channels in a receive circuitry 138, a panel scan engine or device coordination engine 140, which can include channel scan logic, and a transmit circuitry 144, which can include analog or digital driver logic. In some examples, transmit circuitry 144 and receive circuitry 138 can be reconfigurable by device coordination engine 140 based on the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, multi-stim scan, quadrature scan, etc.). Device coordination engine 140 can access memory (e.g., RAM) 142, autonomously read data from the sense channels and provide control for the sense channels. Touch controller 136 can also include a scan plan 143 (e.g., stored in or otherwise accessible by memory 142) that can define a sequence of scan events to be performed by user input system 1 (e.g., frequency(ies), phase(s), timing(s) (e.g., beginning and end time(s)), and/or the like of transmits and/or receipts to be performed by computing subsystem 130 and a stylus, and/or clock synchronization information of device 100 and/or the stylus). Scan plan 143 can include information for configuring or reconfiguring the transmit circuitry and receive circuitry for the specific scan event to be performed. Results (e.g., touch signals or touch data) from the various scans can also be stored in memory 142. In addition, device coordination engine 140 can provide control for transmit circuitry 144 to generate device stimulation signals at various frequencies and/or phases and/or amplitudes that can be selectively applied to drive regions (e.g., device transmit electrodes) of the touch sensing circuitry of touch screen I/O interface 111a (e.g., sensor layer subassembly 110b) according to any suitable stimulation signal technique (e.g., multi-stim scan, quadrature scan, etc.). Touch controller 136 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of touch ASIC 131 can be implemented with multiple circuits, elements, chips, and/or discrete components.

Device coordination engine 140, in many embodiments, can include or can be communicably coupled to circuitry and/or logic components, such as a processor and a memory. The circuitry of device coordination engine 140 can perform, coordinate, and/or monitor one or more of the functions or operations of device coordination engine 140 including, but not limited to: communicating with and/or transacting data with other subsystems of electronic device 100; communicating with and/or transacting data with stylus 200; measuring and/or obtaining the output of one or more analog or digital sensors such as a touch sensor; measuring and/or obtaining the output of one or more sensor nodes of an array of sensor nodes, such as an array of capacitive sensing nodes; receiving and locating a tip signal and ring signal from stylus 200; locating stylus 200 based on the location of the tip signal intersection area and the ring signal intersection area; generating and coordinating device stimulation signal(s) that may be transmitted by any suitable transmit or drive electrodes of sensor layer subassembly 110b of touch screen I/O interface 111a; and so on.

Device coordination engine 140 of electronic device 100 may include or is otherwise communicably coupled to sensor layer subassembly 110b and may utilizes sensor layer subassembly 110b to locate stylus 200 on input surface 110a and/or to estimate the angular position of stylus 200 relative to the plane of input surface 110a using techniques described herein.

Sensor layer subassembly 110b may be a grid of capacitive sensing nodes arranged as columns and rows. More specifically, an array of column traces may be disposed to be perpendicular to an array of row traces. A dielectric material, such as a substrate, may separate the column traces from the row traces such that at least one capacitive sensing node may be formed at each "overlap" point where one column trace crosses over or below one row trace. Some embodiments may dispose column traces and row traces on opposite sides of a substrate, whereas others may dispose column traces and row traces on the same side of a substrate. Some embodiments may only include row traces, whereas others may only include column traces. Sensor layer subassembly 110b may provide a sensor layer that can be separate from other layers of the electronic device, or a sensor layer of sensor layer subassembly 110b can be disposed directly on another layer such as, but not limited to: a display stack layer; a force sensor layer; a digitizer layer; a polarizer layer; a battery layer; a structural or cosmetic housing layer; and so on.

A sensor layer of sensor layer subassembly 110b can be operated in a number of modes. If operated in a mutual capacitance mode, a column trace and a row trace may form a single capacitive sensing node at each overlap point (e.g., "vertical" mutual capacitance). If operated in a self-capacitance mode, a column trace and a row trace may form two (vertically aligned) capacitive sensing nodes at each overlap point. In another embodiment, if operated in a mutual capacitance mode, adjacent column traces and/or adjacent row traces can each form single capacitive sensing nodes (e.g., "horizontal" mutual capacitance).

In many embodiments, a sensor layer of sensor layer subassembly 110b can operate in multiple modes simultaneously. In other embodiments, a sensor layer of sensor layer subassembly 110b may rapidly shift from one mode to another. In still further embodiments, a sensor layer of sensor layer subassembly 110b can use a first mode to detect the presence or proximity of an object (e.g., a stylus, a user's finger, and so on) and then use a second mode to obtain an estimation of that object. For example, a sensor layer of sensor layer subassembly 110b may operate in a self-capacitance mode until an object is detected nearby the input surface, after which the sensor layer may transition into a mutual capacitance mode (either or both vertical or horizontal). In other cases, capacitive sensing nodes can be disposed in another implementation-specific and suitable manner. In some embodiments, sensing modalities may be overlapped. For example, a mutual capacitance scan may use an array of transmitters that may emit a Hadamard phase inversion code, and, for example, at the same time, stylus 200 may receive those spatially differentiated transmissions, thereby contributing to the spatially varying signal that may be used to calculate a position of stylus 200 relative to device 100. In some embodiments, the receivers may be used to simultaneously sense the signal from an array of transmitters in a mutual capacitance scan and to sense the tip and ring signal emitted by a stylus.

In some embodiments, measurements from one mode is algorithmically combined with measurements from a different mode to improve an estimate of position and/or orientation of the stylus. For example, in some embodiments, the ground reference of the stylus is not at the same dynamic potential as the device ground. For example, if a user holding a stylus is not in contact with the body of the device (e.g., not touching a conductive housing of the device, such as when the device rests on a non-conductive surface), but the user is touching one or more of the driving electrodes (e.g., by having a portion of a hand touching the sensor surface), the body of the user can be modulated by charge injection from those electrodes (e.g., capacitive coupling). A mutual capacitance scan estimating the contact (or proximity) of the user's fingers can be used to estimate the coupling of the user to the touch nodes of the touch sensor panel, and thus estimate the difference in dynamic potential between the device ground and the stylus ground for the stylus that is held by the user. The estimated difference in dynamic potential can be used to correct the measurements correlating the charge induced at the tip of the stylus to the capacitive coupling between the device electrodes and the stylus tip. Independent of the configuration of a sensor layer of sensor layer subassembly 110b, the capacitive sensing nodes included therein may be configured to detect the presence and absence of the tip field, the ring field, any other stylus electrode fields, and/or the touch of a user's finger.

The sensor layer can be optically transparent, although this may not be required for all embodiments.

As noted above, a sensor layer of sensor layer subassembly 110b can detect the presence of the tip field, the presence of the ring field, the presence of any other stylus electrode fields, and/or the touch of a user's finger by monitoring for changes in capacitance (e.g., mutual capacitance or self-capacitance) exhibited at each of the capacitive sensing nodes. In many cases, device coordination engine 140 may be configured to detect stylus electrode field signal(s) received through a sensor layer of sensor layer subassembly 110b from stylus 200 via capacitive coupling.

In some cases, device coordination engine 140 may be configured to demodulate, decode, or otherwise filter one or more raw signals received from a sensor layer of sensor layer subassembly 110b in order to obtain the tip signal, the ring signal, any other stylus electrode signal(s) and/or data that may be modulated therewith. The operation of obtaining such signal(s), as performed by device coordination engine 140 (or another component communicably coupled to the sensor layer or to device coordination engine 140), can be accomplished in a number of implementation-specific ways, suitable for any number of embodiments described herein or reasonable equivalents thereof.

In other embodiments, a sensor layer of sensor layer subassembly 110b can be configured to operate in both a self-capacitance mode and a mutual capacitance mode. In these cases, device coordination engine 140 can monitor for changes in self-capacitance of one or more portions of each capacitive sensing node in order to detect the stylus electrode field(s) (and, correspondingly, obtain the stylus electrode signal(s)), while monitoring for changes in mutual capacitance to detect the touch (or more than one touch) of a user. In still further examples, the sensor layer can be configured to operate in a self-capacitance mode exclusively.

Device coordination engine 140 may perform (or assist with the performance of) the operation of locating and/or estimating the angular position of stylus 200 on input surface 110a employing techniques described herein once the stylus electrode signal(s) may be obtained by device coordination engine 140, and the tip field intersection area and the ring field intersection area may be determined. Device coordination engine 140 can forward such information to touch processor(s) 132 for further processing and interpretation once the location of stylus 200 and the angular position of stylus 200 are estimated.

Device coordination engine 140 may perform (or assist with the performance of) the operation of locating and/or estimating the location, angle, and/or the like of stylus 200 on input surface 110a by employing techniques described herein once device coordination engine 140 has enabled generation and transmission of device stimulation signals by the device transmit electrodes of sensor layer subassembly 110b and once device coordination engine 140 has received any raw or optionally processed device stimulation signals as sensed by stylus 200 and communicated back to electronic device 100 (e.g., over a dedicated communication pathway (e.g., a wireless communication pathway using Bluetooth or ultra-wideband technology or a digital modulation of a capacitively coupled signal received by receiving electrodes on device 100)). Device coordination engine 140 can forward such information to touch processor(s) 132 for further processing and interpretation once the location of stylus 200 and the angular position of stylus 200 and/or the like.

Thus, generally and broadly, device coordination engine 140 may facilitate distinction between many types of input that can all be used, separately or cooperatively, by electronic device 100 in many different implementation-specific ways. For example, electronic device 100 can use any of the following as input: location of one or more styli; polar angle of one or more styli; azimuthal angle of one or more styli; angular or planar velocity or acceleration of one or more styli; gesture paths of one or more styli; relative location and/or angular position of one or more styli; touch input provided by a user; multi-touch input provided by a user; gestures paths of touch input; simultaneous touch and stylus input; and so on.

Computing subsystem 130 can also include an application specific integrated circuit illustrated as a display ASIC 146 to perform display operations. Display ASIC 146 can include hardware to process one or more still images and/or one or more video sequences for display on touch screen I/O interface 111a (e.g., on display output component 112a). Display ASIC 146 can be configured to generate read memory operations to read the data representing the frame/video sequence from a memory (not shown in FIG. 2) through a memory controller (not shown in FIG. 2), for example. Display 146 can be configured to perform various processing on the image data (e.g., still images, video sequences, etc.). In some examples, display ASIC 146 can be configured to scale still images and to dither, scale, and/or perform color space conversion on the frames of a video sequence. Display ASIC 146 can be configured to blend the still image frames and the video sequence frames to produce output frames for display. Display ASIC 146 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 146 can be configured to retrieve source frames from one or more source buffers stored in memory, composite frames from the source buffers, and display the resulting frames on touch screen I/O interface 111a (e.g., on display output component 112a). Accordingly, display ASIC 146 can be configured to read one or more source buffers and composite the image data to generate the output frame. Display ASIC 146 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). Display ASIC 146 can control the touch screen in real-time, providing the data indicating the pixels to be displayed as the touch screen is displaying the image indicated by the frame. The interface to such a touch screen can be, for example, a video graphics array ("VGA") interface, a high definition multimedia interface ("HDMI"), a digital video interface ("DVI"), a DisplayPort interface, a USB-C interface, a Thunderbolt interface, a LCD interface, a plasma interface, or any other suitable interface.

A handoff module 148 can also be included in computing subsystem 130. Handoff module 148 can be coupled to touch ASIC 131, display ASIC 146, and touch screen I/O interface 111a, and can be configured to interface touch ASIC 131 and display ASIC 146 with touch screen I/O interface 111a. Handoff module 148 can appropriately operate touch screen I/O interface 111a according to the scanning/sensing and display instructions from touch ASIC 131 and display ASIC 146. In other examples, display ASIC 146 can be coupled to display circuitry of touch screen I/O interface 111a (e.g., display 112a) without handoff module 148, and touch ASIC 131 can be coupled to touch sensing circuitry of touch screen I/O interface 111a (e.g., sensor layer subassembly 110b) without handoff module 148.

I/O interface 111a (e.g., display 112a) can use liquid crystal display ("LCD") technology, light emitting polymer display ("LPD") technology, organic LED ("OLED") technology, or organic electro luminescence ("OEL") technology, although other display technologies can be used in other examples. In some examples, the touch sensing circuitry and display circuitry of touch screen I/O interface 111a (e.g., sensor layer subassembly 110b and display 112a) can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of I/O interface 111a can be partially or wholly integrated with one another. The integration can be structural and/or functional. For example, some or all of the touch sensing circuitry can be structurally in between substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing subsystem 130 can also include a host processor 158 (e.g., at least a portion of processor 102) that may be coupled to touch ASIC 131, and can receive outputs from touch ASIC 131 (e.g., from touch processor 132 via a communication bus, such as an serial peripheral interface ("SPI") bus, for example) and may perform actions based on the outputs. Host processor 158 can also be connected to program storage 152 and display ASIC 146. Host processor 158 can, for example, communicate with display ASIC 146 to generate an image on touch screen I/O interface 111a, such as an image of a user interface ("UI"), and can use touch ASIC 131 (e.g., including touch processor(s) 132 and touch controller 136) to detect a touch on or near touch at touch screen I/O interface 111a, such as a touch input to the displayed UI. The touch input can be used by computer programs stored in program storage 152 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 158 can also perform additional functions that may not be related to touch processing. For example, host processor 158 can display information corresponding to stylus user tools in a user interface of the device when the stylus is hovering over a portion of the display of the device (e.g., a hint or tip to improve user experience), display a user interface for changing/selecting a tool type (e.g., brush tool, pencil tool, pen tool, eraser tool, etc.) when the stylus is hovering over a portion of the display, and/or display a user interface for changing a color corresponding to the stylus (e.g., displaying a color palette). Additionally or alternatively, host processor 158 can change/select a tool type when the stylus is rotated over the display of the device and/or change a color palette of the stylus tool (e.g., in a drawing application) when the stylus is rotated over a portion of the display (e.g., over a respective icon in a user interface).

Computing subsystem 130 can include one or more processors, which can execute software or firmware implementing various functions. Specifically, for integrated touch screens that may share components between touch and/or stylus sensing and display functions, the touch ASIC and display ASIC can be synchronized so as to properly share the circuitry of the touch sensor panel. The one or more processors can include one or more of the one or more touch processors 132, a processor in display ASIC 146, and/or host processor 158. In some examples, display ASIC 146 and host processor 158 can be integrated into a single ASIC, though in other examples, host processor 158 and display ASIC 146 can be separate circuits coupled together. In some examples, host processor 158 can act as a master circuit and can generate synchronization signals that can be used by one or more of display ASIC 146, touch ASIC 131, and handoff module 148 to properly perform sensing and display functions for an in-cell touch screen. The synchronization signals can be communicated directly from host processor 158 to one or more of display ASIC 146, touch ASIC 131, and handoff module 148. Alternatively, the synchronization signals can be communicated indirectly (e.g., touch ASIC 131 or handoff module 148 can receive the synchronization signals via display ASIC 146).

Computing subsystem 130 can also include a wireless module 156, such as at least a portion of communications component 106, which can implement a wireless communication standard such as Wi-Fi, Bluetooth, ultra-wideband, and/or the like. Wireless module 156 can be coupled to touch ASIC 131 and/or host processor 158. Touch ASIC 131 and/or host processor 158 can, for example, transmit scan plan information, timing information, frequency information, and/or any other suitable information (e.g., scan plan 143) to wireless module 156 to enable wireless module 156 to transmit the information to a stylus (e.g., as data 56), for example (e.g., a stylus capable of generating and injecting a stylus stimulation signal into a touch sensor panel, and/or a stylus capable of receiving one or more device stimulation signals from a touch sensor panel of an electronic device computing subsystem and/or processing such received signals and/or communicating data indicative of such received signals to the electronic device computing subsystem, and/or the like). For example, computing subsystem 130 can transmit (e.g., via wireless module 156) to the stylus any suitable frequency information indicative of one or more low noise frequencies that the stylus can use to generate one or more stylus stimulation signals. Additionally or alternatively, computing subsystem 130 can transmit (e.g., via wireless module 156) to the stylus any suitable timing information that can be used to synchronize the stylus with the computing subsystem, and computing subsystem 130 can transmit (e.g., via wireless module 156) to the stylus any suitable scan plan information can be used to indicate to the stylus when the computing subsystem may perform a stylus scan and/or expect stylus stimulation signals (e.g., to save power by generating a stimulus only during a stylus scan period). Additionally or alternatively, timing information can be used to synchronize the stylus with the computing subsystem, and the scan plan information can be used to indicate to the stylus when and how the computing subsystem may perform a transmission of device stimulation signals (e.g., a transmission by row and/or column drive lines of particular waveforms (e.g., of particular frequency and/or a particular phase at a particular time or continuously)) so the stylus may appropriately receive and process such device stimulation signals from a touch sensor panel. In some examples, wireless module 156 of computing subsystem 130 can also receive information from peripheral devices, such as stylus 200 (e.g., data 56 from communications component 206 of stylus 200, which may be data indicative of device stimulation signals detected by the stylus from the touch screen I/O interface (e.g., device stimulation signals transmitted by computing subsystem 130 and received by (and potentially processed by) stylus 200 (e.g., as data 51 from I/O interface 111*a* of device 100 to I/O interface 211 (e.g., receive architecture) of stylus 200))), which can then be transmitted to touch ASIC 131 and/or host processor 158 (e.g., for determining a location and/or angle and/or barrel roll rotation orientation and/or any other suitable characteristic of the stylus with respect to surface 110*a* of I/O interface 111*a*). For example, stylus 200 can also include a communication component 206 (e.g., wireless communication circuit 256 of FIGS. 2B and 2D), although in some examples the wireless communication functionality can be incorporated into other modules within the stylus, and in other examples the stylus can communicate via a wired connection. Wireless communication circuit 256 can transmit any suitable force information from the stylus to the wireless communication circuitry of computing subsystem 130 (e.g., as data 56). Stylus wireless communication circuit 256 can also receive other information including, but not limited to, information about stylus stimulus frequencies, scan plan information (e.g., the sequence of scans to be performed by the touch-sensitive device), and/or clock synchronization information. As one example, as shown in FIG. 2D, a stylus processor 228 (e.g., of a stylus processing unit 220 (e.g., processor 202)) may receive (e.g., via wireless communication circuit 256 (e.g., as data 56 from stylus 100)) and/or otherwise have access to any suitable coordination data, such as a scan plan 243 (e.g., stored in or otherwise accessible by stylus memory 222) that can define a sequence of scan events to be performed by user input system 1 (e.g., frequency(ies), phase(s), timing(s) (e.g., beginning and end time(s)), and/or the like of transmits and/or receipts to be performed by computing subsystem 130 of device 100, and/or clock synchronization information of device 100 and/or stylus 200). For example, touch-sensitive device 100 can transmit one or more low noise frequencies to stylus 200, and stylus stimulation circuitry (e.g., a stylus coordination engine) can generate one or more stimulation signals on one or more stylus electrodes based on, or at, the one or more low noise frequencies. In some examples, the stylus stimulation circuitry can generate stimulation signals at two or more different frequencies (e.g., at one frequency at a ring electrode and at a second frequency at a tip electrode), though in other examples, stimulation signals may only be generated by the stylus at one frequency. In some examples, information, such as information about stylus stimulation frequencies and scan event plans, can be transmitted from touch ASIC 131 to wireless communication unit 156 of computing subsystem 130 via host processor 158. In other examples, information, such as clock synchronization information, can be communicated directly from touch ASIC 131 to wireless communication unit 156 of computing subsystem 130 for eventual receipt by the stylus. Stylus wireless communication circuit 256 can also transmit information to device 100 (e.g., as data 56 to device wireless communication unit 156 of computing subsystem 130) including, but not limited to, information about device stimulation signals as received by the stylus, information indicative of an applied force or reaction force that may be detected by the stylus, any other suitable information at least partially sensed by any suitable input component(s) 210 of stylus 200, including, but not limited to, ranging information that may be exchanged with other devices for triangulation over UWB and/or RF and/or the like, information from any inertial sensor(s) (e.g., accelerometers, gyroscopes (e.g., along with the gravity vector), etc.), information from any ambient field sensor(s) (e.g., for noise rejection, ungrounded calculations, etc.), information from any ambient light sensors, information from any color picker(s), information from any ultrasonic sensor(s) (e.g., for additional position information), information from any magnetic field sensor(s) (e.g., for position information), information from any grip sensor(s) (e.g., using strain gauges, mutual-cap or self-cap sensors on the stylus itself, etc.), information from any squeeze sensor(s) (e.g., using strain gauges, etc.), authentication information (e.g., information from fingerprint sensor(s) (e.g., on the barrel of the stylus)), information from any temperature sensor(s) (e.g., for ambient temperature, calibration, etc.), and/or the like. In some examples, information, such as information about stylus received device stimulation signals and/or about stylus detected force, can be received by touch ASIC 131 from wireless communication unit 156 of computing subsystem 130 via host processor 158. In other examples, information, such as information about stylus received device stimulation signals and/or about stylus detected force, can be communicated directly to touch ASIC 131 from wireless communication unit 156 of computing subsystem 130. In some examples, information communicated to the stylus 200 may include one or more PN code sequences and timing information enabling correlation of the currents coupled into the stylus electrodes, for example, to enable estimates of signal strength and timing, and to enable estimates of the stylus x, y, z coordinates and spatial angles (e.g., tilt, azimuthal, roll, etc.) In some examples, stylus 200 can operate asynchronously from computing subsystem 130. In an asynchronous example, the stylus can continuously generate stylus stimulation signals, generate stylus stimulation signals at various intervals, or generate stylus stimulation signals when force is detected by a stylus force sensor. In other examples, wireless communication can be used to synchronize the stylus and computing subsystem 130. For example, the stylus can receive clock synchronization information and scan plans from computing subsystem 130, such that the stylus can generate stylus stimulation signals (or receive and potentially process and then communicate data indictive of device stimulation signals) when the computing subsystem may expect such from the stylus. For example, the clock synchronization information can provide an updated value for the stylus clock (e.g., a timer, counter, etc.) or reset the stylus clock so that the stylus clock can be substantially the same as (or otherwise track) a computing subsystem clock for touch-sensitive device 100. The stylus can then use the scan plan, which can define the sequence of scan events or transmission events to be performed by the touch-sensitive device at specific times, and the stylus clock to determine when the touch-sensitive device expects stylus stimulation signals to be generated by the stylus or expects sensed device stimulation signals to be transmitted (e.g., wirelessly as data 56) from the stylus to the device. When computing subsystem 130 is not expecting stylus stimulation signals or other suitable information from the stylus, the stylus can stop generating stimulation signals or stop transmitting data to the computing subsystem. Additionally, in some examples, computing subsystem 130 and the stylus can synchronize their communication to regular time intervals such that both computing subsystem 130 and the stylus can save power. For example, after the stylus and computing subsystem may pair via a wireless communication channel, the communication between the stylus and computing subsystem may occur only at specified times (e.g., based on their respective synchronized clocks). Stylus 200 and/or computing subsystem 130 can include one or more crystals to generate stable and accurate clock signals to improve synchronization and reduce drift between the computing subsystem and stylus clocks. The wireless communication functionality can be incorporated in other components of computing subsystem 130, rather than in a dedicated chip.

Note that one or more of the functions described herein can be performed by firmware stored in memory and executed by a touch processor in touch ASIC 131, or stored in program storage and executed by host processor 158. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that computing subsystem 130 is not limited to the components and configuration of FIG. 2, but can include other or additional components in multiple configurations according to various examples. Additionally, the components of computing subsystem 130 can be included within a single device, or can be distributed between multiple devices.

As discussed above, touch screen I/O interface 111*a* can include touch sensing circuitry, such as sensor layer subassembly 110*b*. FIG. 2A illustrates an example sensor layer subassembly 110*b* that may be configured as drive and sense regions or lines according to examples of the disclosure. Sensor layer subassembly 110*b* can include a capacitive sensing medium having a plurality of drive lines 162 and a plurality of sense lines 163. It should be noted that the term "lines" may sometimes be used herein to mean simply conductive pathways, as one skilled in the art will readily understand, and is not limited to elements that are strictly linear, but includes pathways that change direction, and includes pathways of different size, shape, materials, and/or the like. Additionally, drive lines 162 and sense lines 163 can be formed from smaller electrodes coupled together to form drive lines and sense lines. Drive lines 162 can be driven by device stimulation signals from transmit circuitry 144 through a drive interface 164, and resulting sense signals that may be generated in sense lines 163 can be transmitted through a sense interface 165 to sense channels in receive circuitry 138 (e.g., as may also be referred to as an event detection and demodulation circuit) in touch controller 136. In this way, drive lines and sense lines can be part of the touch sensing circuitry that can interact to form capacitive sensing nodes, which can be thought of as touch picture elements (touch pixels), such as touch pixels 166 and 167. This way of understanding can be particularly useful when touch screen I/O interface 111*a* may be viewed as capturing or otherwise determining an "image" of touch. In other words, after touch controller 136 may have determined whether a touch has been detected at each touch pixel in the touch screen, the pattern of touch pixels in the touch screen at which a touch occurred can be thought of as an "image" of touch (e.g., a pattern of fingers or other objects touching the touch screen). It should be understood that the row/drive and column/sense associations can be exemplary, and in other examples, column electrodes can be drive lines and row electrodes can be sense lines, both column electrodes and row electrodes can be drive lines, and/or both column electrodes and row electrodes can be sense lines. In some examples, row and column electrodes can be perpendicular such that touch nodes can have x- and y-coordinates, though other coordinate systems can also be used, and the coordinates of the touch nodes can be defined differently. It should be understood that touch screen I/O interface 111*a* can include any number of row electrodes and column electrodes to form the desired number and pattern of touch nodes. The electrodes of the touch sensor panel can be configured to perform various scans and/or transmissions including some or all of row-column and/or column-row mutual capacitance scans, self-capacitance row and/or column scans, row-row mutual capacitance scans, column-column mutual capacitance scans, quadrature scans, multi-stim scans, stylus scans, pixelated self-capacitance scans (e.g., each sensor region may include its own electrode, which may be separately wired out to sense electronics, and a receiver stylus may include a pixelated self-capacitance sensor(s), whereby an appropriate stim pattern may be chosen that is locally unique), and/or the like.

Next, reference is made to certain operational components of an example stylus, such as stylus 200 depicted in FIG. 2B, which can include several subsystems that may cooperate to perform, coordinate, and/or monitor one or more operations or functions of the stylus or, more generally, the user input system (e.g., system 1). Particularly, as shown in FIG. 2B, stylus 200 may include a stylus coordination engine 240, a processing unit 220, a power subsystem 230, a wireless interface 256, and a power connector 236.

Generally and broadly, coordination engine 240 of stylus 200 may be tasked with generating any stylus stimulation signals (e.g., electrode field signal(s) (e.g., tip field(s), ring field(s), and/or the like)) at any suitable stylus electrode(s) and/or receiving or otherwise detecting any suitable device stimulation signals (e.g., from touch screen I/O interface 111*a*) at any suitable stylus electrode(s). These generated stylus stimulation signals and/or these received device stimulation signals may facilitate discovery of the coordinates, both Cartesian and spherical, and/or angles and/or rotation orientation of stylus 200 with respect to I/O interface 111*a* of device 100. In some embodiments, coordination engine 240 may also be tasked with measuring the force applied by stylus 200, such as reaction force Fr, as described with respect to FIGS. 1A-1D.

In many embodiments, one or more components of stylus coordination engine 240 may include or may be communicably coupled to circuitry and/or logic components, such as a processor and a memory. The circuitry can control or coordinate some or all of the operations of stylus coordination engine 240 including, but not limited to: communicating with and/or transacting data with other subsystems of stylus 200; receiving parameters used to generate any suitable stylus stimulation signals (e.g., stylus electrode field signals (e.g., any tip field signals, any ring field signals, etc.)); conveying the stylus stimulation signals to stylus electrodes for acting as field generator electrodes (e.g., a stylus tip electrode 242 acting as a tip-field generator electrode, one or more stylus ring electrodes 248 acting as one or more ring-field generator electrodes, one or more segmented or split electrodes acting as one or more segmented or split field generator electrodes, etc.); receiving any electrode signals from another subsystem of stylus 200; measuring and/or obtaining the output of one or more analog or digital sensors, such as a strain sensor or accelerometer; receiving or otherwise detecting any suitable device stimulation signals (e.g., from touch screen I/O interface 111*a*) at any suitable stylus electrode(s) (e.g., stylus tip electrode 242 acting as a tip-field receive electrode, one or more stylus ring electrodes 248 acting as one or more ring-field receive electrodes, one or more segmented or split electrodes acting as one or more segmented or split field receive electrodes, etc.); and so on. Stylus coordination engine 240 is described in detail below with reference to FIG. 2C.

A processor of coordination engine 240 can be implemented as any electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" may refer to a hardware-implemented data processing device or circuit that may be physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Coordination engine 240 may be coupled to processing unit 220 and may be configured to provide any stylus stimulation signals to coordination engine 240. Processing unit 220 may also be configured to facilitate communication with the electronic device 100, for example, via wireless interface 256. Processing unit 220 is described in detail below with reference to FIG. 2D.

Processing unit 220, in many embodiments, can include or can be communicably coupled to circuitry and/or logic components, such as a processor and a memory. Processing unit 220, in some embodiments, includes sensing circuitry (e.g., including a receive architecture configured to receive signals from stimulation of a touch sensor panel and/or process the receive signals) and/or driving circuitry (e.g., a drive architecture configured to generate stimulation signals to be applied to a touch sensor panel). Circuitry of processing unit 220 can perform, coordinate, and/or monitor one or more of the functions or operations of processing unit 220 including, but not limited to: communicating with and/or transacting data with other subsystems of stylus 200; communicating with and/or transacting data with electronic device 100; generating any stylus stimulation signals (e.g., stylus electrode field signals (e.g., a tip signal and/or ring signal(s) and/or split signal(s)); measuring and/or obtaining the output of one or more analog or digital sensors such as a strain sensor or accelerometer; changing a power state of stylus 200 from a normal power state to a standby power state or a low power state; modulating information and/or data onto any stylus stimulation signal(s); obtaining and optionally processing any device stimulation signal(s) that may be received by any of the stylus electrode(s); and so on.

Figure 2F:
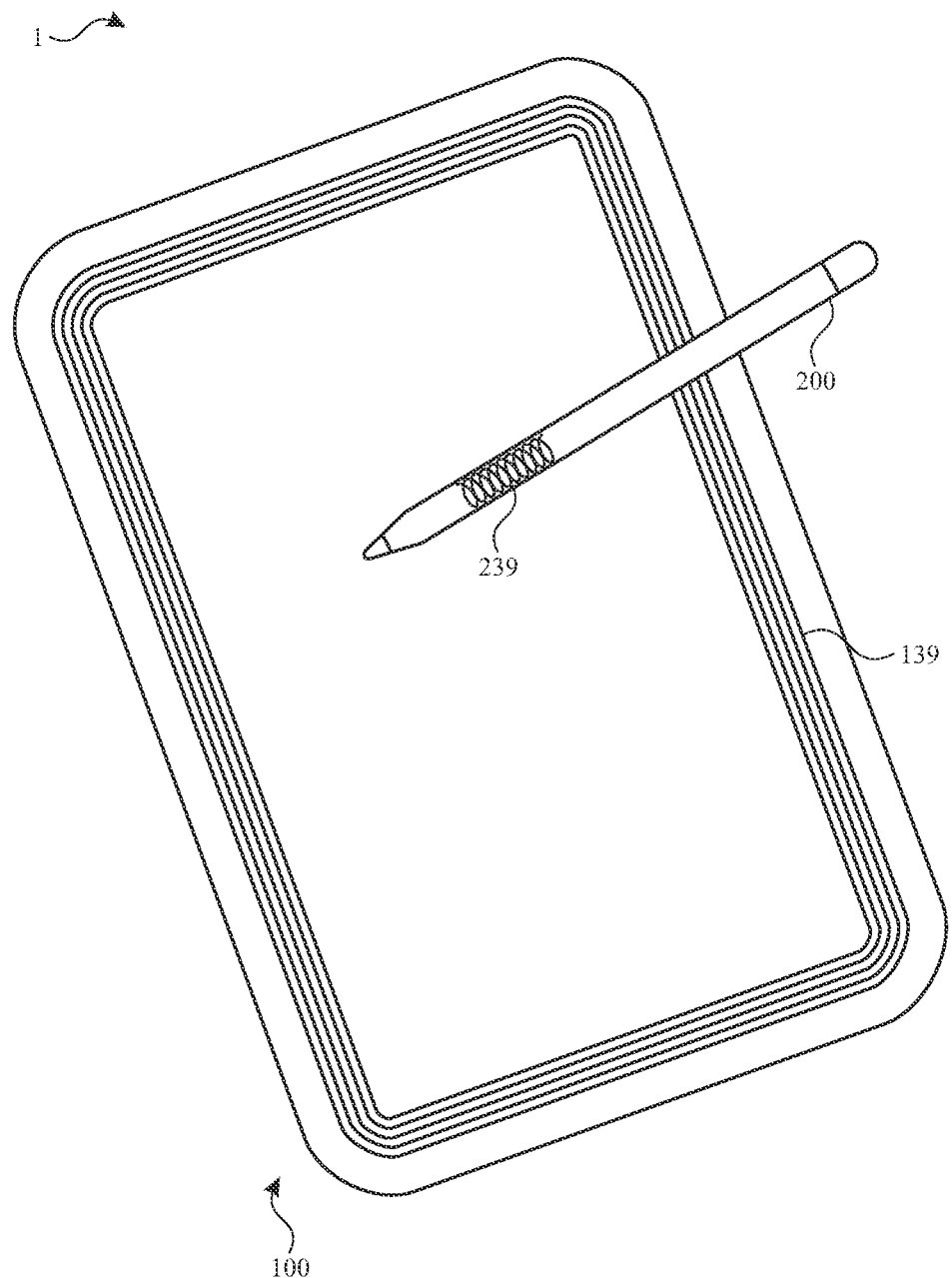
FIG. 2F is a perspective, partially transparent view of the stylus of FIGS. 1-1D and 2B-2E interacting with the electronic device of FIGS. 1-2A.

Stylus 200 may be powered by an internal battery. Power subsystem 230 may include one or more rechargeable batteries and a power controller. The power controller of power subsystem 230 may be configured to facilitate rapid charging of the battery(ies) when power connector 236 is coupled to a power source. In some cases, the power source to which power connector 236 may be configured to connect to may be a data and/or power port of electronic device 100. In other cases, power connector 236 may include one or more magnets that may be configured to attract to a surface or channel of an electronic device. In some embodiments, stylus 200 may be powered by a resonant coil (e.g., stylus receiver coil) that may be tuned to receive power from any suitable electromagnetic field (e.g., a 13.56 Megahertz electromagnetic field). The electromagnetic field may be driven by device 100 using a coil near the perimeter of the device (e.g., device transmitter coil). In some embodiments, stylus 200 may implement an RFID protocol, such as ISO 18000-3, to identify and communicate with device 100. For example, the electromagnetic device coil may be running around near the bezel of the device to couple power to the stylus, which may eliminate the need for a battery or a recharging solution, thereby reducing the cost of the stylus, and/or thereby eliminating the need for the user to do anything to charge styli. The coil electromagnetic coupling may also be used to communicate any suitable data between the device and the stylus. For example, as shown in FIG. 2F, device 100 may include any suitable device coil 139 and stylus 200 may include any suitable stylus coil 239.

The power controller of power subsystem 230, in many embodiments, can include or can be communicably coupled to circuitry and/or logic components, such as a processor and a memory. The circuitry of the power controller can perform, coordinate, and/or monitor one or more of the functions or operations of power subsystem 230 including, but not limited to: communicating with and/or transacting data with electronic device 100; controlling a charging rate of a battery; estimating and reporting a capacity of a battery at a particular time; reporting that a capacity of a battery has dropped below a minimum threshold; reporting that a battery is charged; and so on.

It will be apparent to one skilled in the art that some of the specific details presented above with respect to stylus 200 may not be required in order to practice a particular described embodiment, or an equivalent thereof. Similarly, other styli may include a greater number of subsystems, modules, components, and the like. Some submodules may be implemented as software or firmware when appropriate. Accordingly, it is appreciated that the description presented above is not meant to be exhaustive or to limit the disclosure to the precise forms recited herein. To the contrary, it will be apparent to one of ordinary skill in the art that many modifications and variations are possible in view of the above teachings.

As noted above, user input system 1 may be configured to locate stylus 200 and to estimate the angular position of stylus 200 with respect to input surface 110a of touch screen I/O interface 111a of device 100. These operations may be facilitated by cooperation between stylus coordination engine 240 of stylus 200 and device coordination engine 140 of electronic device 100. The generalized interoperation of these two coordination engines is described above; however, to facilitate a more detailed understanding of coordination engine 240 of stylus 200, FIG. 2C is provided.

FIG. 2C depicts an example system diagram of stylus coordination engine 240 that may be incorporated by a stylus, such as stylus 200. As noted with respect to other embodiments described herein, stylus coordination engine 240 may be used to generate stylus stimulation signals (e.g., any stylus electrode electric fields (e.g., a tip electrode field and/or one or more ring electrode fields and/or one or more split electrode fields)) that may allow electronic device 100 to locate and estimate the angular position of stylus 200. Alternatively or additionally, stylus coordination engine 240 may be used to sense or detect or otherwise receive device stimulation signals provided by sensor layer subassembly 110b (e.g., as data 51) via one or more stylus electrodes (e.g., a tip electrode, one or more ring electrodes, one or more split electrodes, and/or any other suitable electrodes of the stylus), and then those received device stimulation signals as sensed by the stylus receive electrodes may be communicated back to electronic device 100 (e.g., as data 56) for enabling the device to locate and estimate the angular position and/or barrel rotation orientation of stylus 200, where the received device stimulation signals may be processed in any suitable manner by the stylus before communication back to the device.

Additionally, stylus coordination engine 240 may be configured to estimate force applied by stylus 200 to input surface 110a. More specifically, stylus coordination engine 240 may be configured to generate a tip field (not shown), generate and/or emit the ring field (not shown), and to detect the force applied by the tip of stylus 200 to input surface 110a. While this is provided as one example, the field generation and force sensing may, in some embodiments, be performed by separate aspects of stylus 200.

In many embodiments, stylus coordination engine 240 may receive a tip signal from processing unit 220 (see, e.g., FIG. 2B) and convey the tip signal to stylus tip electrode 242 that may be acting as a tip-field generator electrode. Similarly, stylus coordination engine 240 may receive one or more ring signals from processing unit 220, and convey the ring signal(s) to one or more stylus ring electrodes 248 that may be acting as one or more ring-field generator electrodes. In still further embodiments, additional electric fields can be generated by additional field electrodes that may be acting as one or more additional field generator electrodes in response to receiving additional field signals.

One or more field signals can be modulated with other information or data related to the user, the stylus, and/or to the electronic device. For example, the tip signal and/or the ring signal can include stylus identity information, user identity information, stylus setting information, force information, or any other information suitable for a particular embodiment.

Stylus coordination engine 240 may include stylus tip electrode 242 (e.g., which may be configured to act as a tip-field generator stylus electrode or a tip-field stylus receive electrode) that can be formed from any number of suitable electrically conductive materials. Stylus tip electrode 242 may be coupled to a signal conduit 244 (e.g., a rigid signal conduit) that can include a portion (e.g., a rigid portion) that may be configured to provide a mechanical coupling between components coupled to signal conduit 244. Additionally, signal conduit 244 can include a core member through which one or more shielded signal lines may pass. Example stylus tip electrode 242 and signal conduits are described in detail in reference to FIG. 2E.

Signal conduit 244 may electrically couple stylus tip electrode 242 to a processor, circuit, or electrical trace within stylus coordination engine 240. In this manner, stylus coordination engine 240 may convey a tip stylus stimulation signal to or receive a device stimulation signal from stylus tip electrode 242 via signal conduit 244. Additionally, signal conduit 244 may mechanically couple stylus tip electrode 242 to a force-sensitive structure 246.

A shape of signal conduit 244 can be selected so as to provide electromagnetic shielding to stylus tip electrode 242. More particularly, a length of signal conduit 244 can be selected so as to separate stylus tip electrode 242 by a particular minimum distance from other electronic components of stylus 200. As a result, a tip signal generated by stylus tip electrode 242 and/or a device stimulation signal received by stylus tip electrode 242 may be affected as little as possible by the operation of various subsystems of stylus 200, such as processing unit 220, power subsystem 230, wireless interface 256, and/or power connector 236, or any other system or subsystem of stylus 200.

Stylus tip electrode 242 and signal conduit 244 can be enclosed entirely within the housing(s) or enclosure(s) of stylus 200. In these embodiments, stylus tip electrode 242 can be insert-molded within housing material so that stylus tip electrode 242 may be positioned as close to the external surface of stylus 200 as possible (e.g., at tip 215). The relative position of stylus tip electrode 242 and a housing of stylus 200 may be described in more detail below and in U.S. Patent Application Publication No. 2017/0068339, which is hereby incorporated by reference herein in its entirety.

In many embodiments, stylus tip electrode 242 may be formed with a rounded shape oriented toward the end of tip 215 of stylus 200 that may be configured to engage or almost engage input surface 110a. As a result of this shape, stylus tip electrode 242, when configured to act as a tip-field generator electrode may generate an electric field (e.g., the tip field) that may be substantially radial in nature, at least in the direction along which the rounded shape of stylus tip electrode 242 may be oriented. In other words, stylus tip electrode 242 may function, substantially, as an electric field point source; the electric field may approach radial uniformity. The tip field generated by stylus tip electrode 242 may be axially symmetric.

In some cases, the center of stylus tip electrode 242 may be treated as the origin of the radial tip field, and input surface 110a may be mathematically modeled as a plane that intersects the radial tip field. The tip field intersection area, therefore, may take the shape of the intersection of a plane and a sphere, which, regardless of orientation, may be a circle. However, although the tip field, the input surface, and the tip field intersection area can be mathematically modeled as a sphere, a plane, and a circle respectively, it may be appreciated that the actual geometric shapes generated in a particular implementation may only approximate a sphere, a plane, and/or a circle.

When the tip field is substantially radial, the tip field intersection area may be a circular area (or section) within the plane of input surface 110a, the center of which may be nearly or precisely equal to the location of stylus tip electrode 242. The radius of the circular area may be influenced by the amplitude of the tip signal applied to stylus tip electrode 242.

As with the stylus tip electrode 242, a stylus ring electrode 248 may be coupled, at least partially, to signal conduit 244. In many examples, stylus ring electrode 248 may be formed within or around signal conduit 244. For example, stylus ring electrode 248 can be formed on an external surface of signal conduit 244.

Stylus ring electrode 248 may be coaxially aligned with stylus tip electrode 242 so that the tip field and the ring field may also be coaxially aligned. In many cases, stylus ring electrode 248 may be separated from stylus tip electrode 242 by a certain distance. The relative position of stylus tip electrode 242 and stylus ring electrode 248 may be shown in FIG. 2E.

As with stylus tip electrode 242, signal conduit 244 may electrically couple stylus ring electrode 248 to a processor, circuit, or electrical trace within coordination engine 240. In this manner, stylus coordination engine 240 may convey a ring stylus stimulation signal to or receive a device stimulation signal from stylus ring electrode 248 via signal conduit 244. Signal conduit 244 also may mechanically couple stylus ring electrode 248 to force-sensitive structure 246.

Stylus ring electrode 248 may, in some embodiments, be implemented as an electrically-conductive ring disposed around an external surface of rigid signal conduit 244. Stylus ring electrode 248 may be separated from stylus tip electrode 242 and may have generally greater surface area than stylus tip electrode 242, although this is not required of all embodiments. Stylus ring electrode 248 may be shaped like a ring so as to permit signal conduit 244 to convey the tip signal to stylus tip electrode 242 in a manner that does not impact the axial symmetry of the ring field. In these embodiments, the ring field generated by stylus ring electrode 248 may be axially symmetric. Stylus ring electrode 248 may be shaped like a ring so as to permit signal conduit 244 to convey any device stimulation signal from stylus tip electrode 242 in a manner that does not impact the axial symmetry of a ring field or any device stimulation signal received by stylus ring electrode 248.

Signal conduit 244 may include at least one via that may define an electrical connection therethrough. In some cases, the via may be formed prior to forming stylus ring electrode 248. The electrical connection of signal conduit 244 may electrically couple a trace disposed within signal conduit 244 to stylus ring electrode 248. In many cases, the trace may be shielded. As a result of the shielding, signal conduit 244 can convey a shielded ring signal to stylus ring electrode 248 or a shielded device stimulation signal from stylus ring electrode 248. In some embodiments, stylus ring electrode 248 may be divided electrically into multiple segments (e.g., two, three or more segments). For example, each of these segments can be provided with an analog front end circuit which is configured to maintain the segment at a reference voltage, while measuring the current into that segment or charge deposited onto that segment from the time varying local fields (e.g., from the device). In some embodiments, the time varying currents or charge changes on these segments can be correlated with voltage patterns on the surface transmitters of the device, and similar data from a tip and ring segment correlations are used to estimate the position (e.g., x, y, and z coordinates) of the stylus, and/or its spatial angle. In some embodiments, the device transmits one or more pseudo noise sequences, and the correlations of the received charges with the pseudo noise sequences from the analog front end are used to estimate the position and angle of the stylus. In some embodiments, data from the tip and ring segment correlations are used in combination with an inertial sensor to form the final (e.g., output) estimate of position. For example, a device can estimate position and angle of the stylus corrected for drift of the tip sensor signals (e.g., using the tip and ring segment correlations and using the inertial sensor data), or alternatively an estimate for the stylus position can be estimated by the tip and ring segment correlations, and then the multidimensional path in position and angle can be compensated (e.g., smoothed) by data from the inertial sensor.

Stylus ring electrode 248 can be formed from any number of suitable electrically conductive materials. In some examples, stylus ring electrode 248 may be formed from metal. In other cases, stylus ring electrode 248 may be formed from a deposited electrically conductive material, such as a metal-oxide or a metal powder.

Because stylus ring electrode 248 may be separated from the tip of stylus 200, the angular position of stylus 200 (e.g., rotated from the tip) may affect the distance between input surface 110a and stylus ring electrode 248. For example, if stylus 200 touches input surface 110a at a very acute angle (e.g., the stylus lying substantially flat on the input surface), stylus ring electrode 248 may be a small distance from the input surface. Conversely, if stylus 200 is normal to input surface 110a (e.g., ninety degree angle), stylus ring electrode 248 is positioned a large distance from input surface 110a. In this manner, stylus ring electrode 248 traverses an arc above input surface 110a when the polar angle of stylus 200 changes; the apex of the arc occurs when stylus 200 is normal to input surface 110a.

As with the stylus tip electrode 242 and stylus ring electrode 248, two or more segmented or split electrodes 249 may be coupled, at least partially, to signal conduit 244. In many examples, stylus split electrodes 249 may be formed within or around signal conduit 244. For example, stylus split electrodes 249 can be formed on an external surface of signal conduit 244.

Stylus split electrodes 249 may be coaxially aligned with stylus tip electrode 242 and stylus ring electrode 248 so that the tip field and the ring field may also be coaxially aligned with the split electrode fields. In many cases, stylus split electrodes 249 may be separated from stylus tip electrode 242 by a certain distance and from stylus ring electrode 248. The relative position of stylus tip electrode 242 and stylus ring electrode 248 and stylus split electrodes 249 (e.g., may be shown in FIG. 2E).

Signal conduit 244 may electrically couple stylus split electrodes 249 to a processor, circuit, or electrical trace within coordination engine 240. In this manner, stylus coordination engine 240 may convey split stylus stimulation signals to or receive device stimulation signals from stylus split electrodes 249 via signal conduit 244. Signal conduit 244 also may mechanically couple stylus split electrodes 249 to force-sensitive structure 246.

Stylus split electrodes 249 may, in some embodiments, be implemented as an electrically-conductive segmented hollow cone disposed around an external surface of rigid signal conduit 244. Stylus split electrodes 249 may be separated from one another about the longitudinal axis of the stylus and separated from stylus tip electrode 242 along the longitudinal axis of the stylus and may have generally greater surface area than stylus tip electrode 242, although this is not required of all embodiments. In some embodiments, as shown in FIG. 2E, stylus split electrodes 249 may be shaped like different segments of a cone, such as a right split electrode 249a, a top split electrode 249b, a left split electrode (not shown), and a bottom split electrode (not shown), so as to permit signal conduit 244 to convey the tip signal to stylus tip electrode 242 in a manner that does not impact the axial symmetry of the split fields. In these embodiments, the split fields generated by stylus split electrodes 249 may be axially symmetric. Stylus split electrodes 249 may be shaped like different segments of a cone extending about and along the longitudinal axis of the stylus so as to permit signal conduit 244 to convey any device stimulation signal received by stylus tip electrode 242 in a manner that does not impact the axial symmetry of the split fields or any device stimulation signals received by stylus split electrodes 249.

Signal conduit 244 may include at least one via that may define an electrical connection therethrough. In some cases, the via may be formed prior to forming stylus split electrodes 249. The electrical connection of signal conduit 244 may electrically couple a trace disposed within signal conduit 244 to each stylus split electrode 249. In many cases, the trace may be shielded. As a result of the shielding, signal conduit 244 can convey a shielded split signal to each split electrode 249 or a shielded device stimulation signal from each stylus split electrodes 249.

Stylus split electrodes 249 can be formed from any number of suitable electrically conductive materials. In some examples, stylus split electrodes 249 may be formed from metal. In other cases, stylus split electrodes 249 may be formed from a deposited electrically conductive material, such as a metal-oxide or a metal powder.

Because stylus split electrodes 249 may be separated from the tip of stylus 200 along the stylus longitudinal axis, the angular position of stylus 200 (e.g., rotated from the tip) may affect the distance between input surface 110a and stylus split electrodes 249. For example, if stylus 200 touches input surface 110a at a very acute angle (e.g., the stylus lying substantially flat on the input surface), stylus split electrodes 249 may be a small distance from the input surface. Conversely, if stylus 200 is normal to input surface 110a (e.g., ninety degree angle), stylus split electrodes 249 may be positioned a large distance from input surface 110a. In this manner, stylus split electrodes 249 may traverse an arc above input surface 110a when the polar angle of stylus 200 changes, and/or the apex of the arc may occur when stylus 200 is normal to input surface 110a. Moreover, because stylus split electrodes 249 may be separated from one another about the stylus longitudinal axis, the barrel roll rotation orientation of stylus 200 (e.g., rotated about the stylus longitudinal axis) with respect to an axis of device 100 (e.g., an axis of surface 110a) may affect the distance between input surface 110a and different stylus split electrodes 249. For example, in one barrel roll rotation orientation, a left stylus split electrode 249 may be closer than a right stylus split electrode 249 to a left edge of input surface 110a, while in another barrel roll rotation orientation, a right stylus split electrode 249 may be closer than a left stylus split electrode 249 to the left edge of input surface 110a. In this manner, different stylus split electrodes 249 traverse about the stylus longitudinal axis above input surface 110a when the barrel roll rotation orientation of stylus 200 changes. This may enable detection of rotation of a stylus about its own longitudinal axis, which may enable calligraphy or any other suitable variable width stylus effect to be carried out by a non-variable width stylus of user input system 1. As the position of stylus 200 above device 100 changes, the mutual capacitance between each of the electrodes and the stylus electrodes can be determined. The capacitance for each of the pairs of electrodes can be determined by driving the electrodes of device 100 with a simulation voltage waveform, holding the electrodes of stylus 200 at a virtual ground, and measuring the current to those virtual grounds. By using a varying stimulation voltage waveform, the ratio of the current at the receiver to the voltage at the transmitting electrode can be accomplished by multiplying the received current waveform by the known shape of a particular transmitting electrode voltage as a function of time, and then integrating. If the driven time function for each transmitting electrode is orthogonal over a time period to that from other electrodes, these time periods can be simultaneous. After the pairwise mutual capacitances have been determined, the three-dimensional position of stylus 200 relative to device 100 can be determined. An example way of doing this may be to have a separate time interval for each of the transmitting electrodes, applying a sinusoidally varying voltage at a particular frequency for each of them, holding each of the receiving electrodes at the stylus at a virtual ground during those intervals, demodulating the current using one of the transmitted frequencies, and taking the ratio of the AC amplitude of those currents and voltages from the known amplitude of the transmitter and the demodulated amplitude at the receivers. The relative phase of the AC may also be used to estimate the relative distance along the transmitting electrodes or the receive electrodes. In some embodiments, several different frequencies may be simultaneously generated from different transmitting electrodes (e.g., chosen to be orthogonal over the demodulation interval). In other embodiments, a single frequency can be transmitted by multiple electrodes from device 100, and phase may be flipped from 0° to 180 differently for each of the electrodes, in a time sequence which may be orthogonal after demodulating and flipping the receive current instantaneous measurement by a corresponding demodulating frequency and phase flipping time sequence. In this manner, many electrodes can be driven at substantially the same frequency and may result in as set of orthogonal functions of time that can be used to estimate the capacitance between many pairs of electrodes between stylus 200 and device 100. In some embodiments, bandwidth can be saved and/or the number of correlations can be reduced by using sets of orthogonal function for driving nearby electrodes (and subsequently demodulating the resulting signals) and using sets of distinguishable, but not necessarily orthogonal functions for more distant electrodes. For example, a first group of four adjacent electrodes can be driven using a first set of orthogonal codes and a second group of four adjacent electrodes can be driven with a second set of orthogonal codes, but the first set of orthogonal codes may be distinguishable, but not necessarily orthogonal to the second set of orthogonal codes when the first group and second group are sufficiently separated. In some embodiments, the stylus electrodes can be driven with the voltage sequences and the device electrodes may have the resultant current measured with an analog front end ("AFE" also referred to herein as "AFE circuit"). In some embodiments, the device electrodes may each be driven with one of a time orthogonal set of voltage waveforms, and the stylus electrodes may be measured with an AFE, the current measured, demodulated, and flipped correspondingly, and, therefore, the mutual capacitance may be estimated. Once the set of values are available from the transmit intervals, the three dimensional position of stylus 200 relative to device 100 may be decoded, such as by the following operations. First, an electromagnetic model of the device, the device electrodes, the device dielectric layers, and the stylus, the stylus electrodes, the stylus dielectrics, and the surrounding space may be created with the position of the stylus varied, for example, in X, Y, Z, θ, and φ. The resulting pairs of coupling between the device electrodes and each of the stylus electrodes as a function of those positions may be produced. In some embodiments, the model may be run with the stylus electrodes at ground, and the current estimated while the voltages on the device electrodes are driven, and, in other embodiments, the device may be modeled with its electrodes at a virtual ground and the current into each of them may be modeled as the stylus electrodes are modeled as driven with the corresponding time sequence. In many embodiments, this process may be simplified by using materials for the dielectrics that are substantially electromagnetically linear at the frequencies to be used. Second, a physical stimulation of the electrodes corresponding to those in the model may be carried out, with the receive electrodes at the voltages corresponding to the conditions of the model, and the currents measured. The output of the model for various values of X, Y, Z, θ, and φ may be compared to physical measured values, and the difference between the modeled values and the measured values may be minimized, resulting in an estimate for X, Y, Z, θ, and φ. Additionally or alternatively, all three spatial angles (e.g., roll, pitch and azimuthal relative to the device) can be estimated using split electrodes, as discussed below.

As may be appreciated, the foregoing generalized description references stylus coordination engine 240 of stylus 200 as it relates to the generation of a tip field, a ring field, and/or split fields by the stylus electrodes that can be detected by device coordination engine 140 of electronic device 100 when the stylus electrodes are configured to act as field generator electrodes (e.g., as stylus transmit electrodes to propagate stylus stimulation signals for detection by device electrodes of touch sensor subassembly 110b) and/or as it relates to the receipt of device stimulation signals from device coordination engine 140 and drive device electrodes of electronic device 100 as may be detected by the stylus electrodes when the stylus electrodes are configured to act as field receiver electrodes (e.g., as stylus receive electrodes to sense device stimulation signals propagated by device electrodes of touch sensor subassembly 110b). As noted above, when the stylus electrodes are configured to act as stylus transmit electrodes, device coordination engine 140 of electronic device 100 can be configured to detect the tip field, the ring field, and/or the split fields and, correspondingly, the tip field intersection area, the ring field intersection area, and/or the split field intersection areas. Electronic device 100 thereafter may compare the relative positions of the tip field intersection area, the ring field intersection area, and/or the split field intersection areas in order to estimate the location of the stylus, the angular position of the stylus, and/or the barrel roll rotation orientation of the stylus. In this manner, coordination engine 240 and device coordination engine 140 may cooperate to determine, with high accuracy, the location, angular position, and/or barrel roll rotation orientation of stylus 200 relative to the plane of input surface 110a of electronic device 100 when the stylus electrodes are configured to act as field generator electrodes. Additionally or alternatively, when the stylus electrodes are configured to act as stylus receive electrodes, device coordination engine 140 of electronic device 100 can be configured to generate certain device stimulation signals (e.g., at various frequencies and/or phases) that can be selectively applied to drive regions of sensor layer subassembly 110b of touch screen I/O interface 111a and that may then be detected by the stylus electrodes as field receiver electrodes and then communicated back to device 100 over a different communication mechanism (e.g., wirelessly as data 56) to compare the device stimulation signals as detected by the different stylus electrodes to estimate the location of the stylus, the angular position of the stylus, and/or the barrel roll rotation orientation of the stylus. In some examples, the device stimulation signals can include orthogonal modulation sequences modulating a sinusoidal carrier, a unique pseudorandom code emitted by different transmitters, or a pseudorandom code emitted by different transmitters with different time delays. In this manner, coordination engine 240 and device coordination engine 140 may cooperate to determine, with high accuracy, the location, angular position, and/or barrel roll rotation orientation of stylus 200 relative to input surface 110a of electronic device 100 when the stylus electrodes are configured to act as field receiver electrodes.

In many examples, the cooperation of coordination engines 140 and 240, in generating certain device stimulation signals at various frequencies and/or phases and/or amplitudes that can be selectively applied to drive regions of sensor layer subassembly 110b of touch screen I/O interface 111a and that may be detected (e.g., as capacitive coupling interface data 51) by the stylus electrodes as field receiver electrodes and then communicated from stylus 200 to device 100 (e.g., as wired/wireless communication interface data 56) such that comparison of the device stimulation signals as detected by the different stylus electrodes may be used to estimate the location of the stylus, the angular position of the stylus, and/or the barrel roll orientation of stylus 200 with respect to input surface 110a of touch screen I/O interface 111a of device 100, may permit user input system 1 to operate effectively despite I/O interface 111a utilizing often noisy on-cell technology. Because signal-to-noise ratio may be significantly better at the stylus than at the device, device stimulation signals may be sensed by the stylus such that absolute amplitude of signals sensed (e.g., as compared to amplitude of signals propagated) may be used to determine a Z-height or hover height of the stylus above input surface 110a as compared to if the stylus is actually touching/on input surface 110a. Data communicated back to the device from stylus along with stylus-sensed device stimulation signal data may include data uniquely identifying one stylus over another stylus, so that two or more styli or accessories (e.g., 200-200d) may be used simultaneously on input surface 110a of I/O interface 111a while also being independently located thereon. Barrel roll rotation orientation may be enabled due to such cooperation. As a particular example, barrel roll may be enabled by the non-axial symmetric placement of the electrodes about the barrel of stylus 200. The coupling of those electrodes to the device electrodes may vary with the barrel roll orientation of the stylus, and therefore, may enable an estimate, as in the above procedure. If the stylus electrodes were all individually axially symmetric, then an electromagnetic model would be degenerate in the θ variable, and no estimate of barrel roll would be possible. A transmitter stylus with a non-axially symmetric set of electrodes may also be configured to estimate barrel roll. There may be other ways of estimating barrel roll using other sensors, such as internal sensors, gyros, and accelerometers. Moreover, a need to pair a particular stylus with a particular device may be obviated by such cooperation. For example, stylus pairing may be accomplished without user intervention. The wireless link may allow an inventory of nearby styli, and the receiver architecture may allow the position of each stylus to be individually estimated, including whether the stylus is hovering near or on the surface of the user device. This may be more difficult with the transmitter at the stylus and receiving at the device, because each stylus may need to transmit a unique pattern or frequency whether or not they are in contact with the device (e.g., because it may not yet be known whether that stylus is in contact with the surface). In some embodiments, pairing, validating a communications channel, and establishing a unique identifier for each nearby stylus may be done over UWB. The unique position of a particular stylus on or near the surface may be accomplished by estimating the capacitive mutual coupling to each of its receive electrodes, and associated with its unique identifier along with that data. All of this may be accomplished for any number of styli without a need for user intervention. In some embodiments, user feedback may be a part of the process, for example, if it is desired that only authorized styli be allowed to transfer data to the device (e.g., to "draw" on the device). For example, a particular process may include (1) cataloging nearby objects that might interact with the touch device, each with a unique ID, (2) identifying a nearby stylus or object that may use the fine location mechanism (e.g., as described herein), (3) sensing the presence of a capacitive surface transmitting a pattern (e.g., as described herein), (4) transmitting spatially a pattern on the touch surface, and receiving the same using AFE's at the stylus, and/or (5) maintaining a list of identified local objects, their position as may be determined by UWB, and their fine position as may be determined by the receipt of the unique pattern as may be received capacitively from the surface. Certain UWB communications may be further described by U.S. Pat. No. 10,567,034, which is hereby incorporated by reference herein in its entirety.

Stylus coordination engine 240 can also estimate a magnitude of force applied by the tip of stylus 200 to input surface 110a. One example method of detecting a magnitude of force applied by stylus 200 to input surface 110a is described below; however, it may be appreciated that this is merely one example and that other embodiments can detect the force applied by stylus 200 in another implementation-specific and suitable manner.

As noted above with respect to other embodiments, the tip of stylus 200 can be movable with respect to a body of stylus 200, generally along the stylus longitudinal axis (e.g., longitudinal axis 120). More particularly, stylus tip electrode 242, stylus ring electrode 248, stylus split electrodes 249, and/or signal conduit 244 may be configured to at least partially shift, translate, withdraw, or otherwise change position along an axial direction with respect to the housing of stylus 200 in response to a force applied by the tip of stylus 200 to input surface 110a.

Signal conduit 244 can couple the tip of stylus 200 to force-sensitive structure 246 of stylus coordination engine 240. In this manner, when the tip of stylus 200 touches input surface 110a (or any other surface), and applies a force, the tip of stylus 200 may experience a reaction force which, in turn, may be transferred via signal conduit 244 (e.g., a rigid conduit) to force-sensitive structure 246.

In these embodiments, force-sensitive structure 246 may also include a sensor that exhibits an electrically-measurable property that may change as a function of the magnitude of force applied to the force-sensitive structure. In one example, the sensor may be sensitive to strain and may be coupled to a rear cantilevered leg of force-sensitive structure 246. In this manner, the strain sensor may be physically separated from both of stylus tip electrode 242 and stylus ring electrode 248 by a distance that may reduce any parasitic coupling, electromagnetic interference, or any other interference between the strain sensor and stylus tip electrode 242 and stylus ring electrode 248.

In one embodiment, the strain sensor may operate as a resistive sensor formed from a material that may exhibit a change in electrical resistance (e.g., conductance) in response to a dimensional change such as compression, tension, or force. The strain sensor can be a compliant material that exhibits at least one electrical property that is variable in response to deformation, deflection, or shearing of the electrode. The strain sensor may be formed from a piezoelectric, piezoresistive, resistive, or other strain-sensitive materials.

Force-sensitive structure 246 may be configured to deflect relative to a frame of the body of the stylus in response to a force applied by the tip of the stylus. As a result of the deflection, the electrically-measurable property of the sensor can change. Thus, by measuring the electrical property of the sensor, a force estimate can be obtained by stylus coordination engine 240. The force estimate may be an estimation of the magnitude of the reaction force acting on stylus 200. Once a force estimate is obtained, stylus coordination engine 240 may communicate the force estimate to electronic device 100 as a vector or scalar quantity using any suitable encoded or not-encoded format (e.g., as any suitable data 56).

As noted above, user input system 1 may be configured to locate stylus 200 and to estimate angular position and/or other characteristics of stylus 200 based on the cooperation between coordination engines 140 and 240 (e.g., through device stimulation signals as data 51 that may be sensed by stylus receive electrodes and/or through stylus transmit electrode signals as data 51 that may be sensed by device receive electrodes). In many embodiments, other information can be exchanged between electronic device 100 and stylus 200 through any other communication channel (e.g., as additional data 51 and/or as data 56 communicated wirelessly), such as, but not limited to: applied force magnitude; battery capacity of stylus 200; stylus setting information; user identity information; stylus identity information; scan plan information, and so on.

As one example, such information can be conveyed from stylus 200 to electronic device 100 by modulating said information as a digital or analog data signal over any or some or all stylus transmit electrode signals (e.g., tip electrode field signal, ring electrode field signal, split electrode field signals). In other cases, however, a separate communication technique can be used (e.g., as data 56 between wireless or other suitable communication channels between device 100 and stylus 200). In many examples, these additional operations and functions of the stylus may be performed, monitored, and/or coordinated by a processing unit and a wireless interface, such as processing unit 220 and wireless interface 256.

A simplified example system diagram of processing unit 220 and wireless interface 256 of stylus 200 may be shown in FIG. 2D. Processing unit 220 may be configured to facilitate communication between stylus coordination engine 240, power subsystem 230, wireless interface 256, and/or power connector 236. These operations and purposes of processing unit 220 are merely examples; different embodiments may task processing unit 220 differently.

Processing unit 220 can include a processor 228, a memory 222, a sensor 224, and one or more signal generators 226. Processor 228 may be configured to control or coordinate some or all of the operations of processing unit 220 by communicating, either directly or indirectly, with substantially all of the components of processing unit 220 and/or other subsystems of stylus 200. For example, a system bus or signal line or other communication mechanism can facilitate communication between processor 228 and various components of processing unit 220 or, more generally, other subsystems of stylus 200.

Processor 228 can be implemented as any electronic device capable of processing, receiving, or transmitting data or instructions. Processor 228 may be configured to access memory 222, which may have instructions stored therein that may be configured to cause processor 228 to perform, coordinate, or monitor one or more of the operations or functions of processing unit 220 and/or stylus 200.

In many embodiments, one or more components of processor 228 can include or can be communicably coupled to circuitry and/or logic components, such analog circuitry, digital circuitry, and memory 222. The circuitry can facilitate some or all of the operations of processor 228 including, but not limited to: communicating with and/or transacting data with other subsystems of stylus 200; generating parameters used to generate the tip signal and the ring signal and/or the split signals; conveying the tip signal and the ring signal and the split signals to stylus coordination engine 240; measuring and/or obtaining the output of one or more analog or digital sensors, such as a strain sensor or accelerometer; receiving device stimulation signals from stylus coordination engine 24 as sensed by the stylus electrodes (e.g., tip electrode, ring electrode, and/or split electrodes); conveying any raw and/or processed sensed device stimulation signals for transmission to device 100; receiving scan plan data and/or any other suitable data from device 100; and so on.

In some cases, processor 228 and memory 222 may be implemented in the same integrated circuit (which may be a surface-mounted integrated circuit), although this is not required of all embodiments.

Instructions stored in memory 222 may be configured to control or coordinate the operation of a separate processor, an analog or digital circuit, a volatile or non-volatile memory module, a display, a speaker, a microphone, a rotational input device, a button or other physical input device, a biometric authentication sensor and/or system, a force or touch input/output component, a communication module (such as the wireless interface 256), and/or a haptic or tactile feedback device of stylus 200. For simplicity of illustration and to reduce duplication of elements between figures, many of these (and other) components are omitted from one or more of the simplified system diagrams depicted in FIGS. 2B-2E but have been described with respect to FIG. 1. It may be understood that many of these elements and components may be included either entirely or partially within the housing of stylus 200 and may be integrated in an appropriate and implementation-specific manner into many embodiments described herein.

Memory 222 can also store electronic data that can be used by stylus 200 or the processor 228. For example, memory 222 can store electrical data or content such as, but not limited to: media files; documents and applications; device settings and preferences; timing and control signals or data for various modules or subsystems of stylus 200; data structures or databases, files, parameters, or configurations related to the tip signal and/or the ring signal and/or the split signals; scan plan data; and so on.

Memory 222 can be configured as any type of memory. By way of example, memory 222 can be implemented as random access memory, read-only memory, flash memory, removable memory, or other types of storage elements, or combinations of such devices.

Processor 228 may be configured to obtain data from one or more sensors, collectively labeled as sensor 224, which can be positioned substantially anywhere on processing unit 220 or, more generally, anywhere within a housing of stylus 200. For example, one sensor of sensor 224 may be the sensor coupled to force-sensitive structure 246 of FIG. 2C.

In some embodiments, sensor 224 may be configured to detect environmental conditions and/or other aspects of the operating environment of stylus 200. For example, an environmental sensor may be an ambient light sensor, proximity sensor, temperature sensor, barometric pressure sensor, moisture sensor, and the like. In other cases, the sensors may be used to compute an ambient temperature, air pressure, and/or water ingress into stylus 200. Such data may be used by processor 228 to adjust or update the operation of stylus 200 and/or may communicate such data to electronic device 100 to adjust or update the operation thereof.

In still further embodiments, sensor 224 may be configured to detect motion characteristics of stylus 200. For example, a motion sensor may include an accelerometer, a gyroscope, a global positioning sensor, a tilt sensor, and so on for detecting movement and acceleration of stylus 200. Such data may be used to adjust or update the operation of stylus 200 and/or may communicate such data to electronic device 100 to adjust or update the operation thereof. In some embodiments, one or more ultra-wide band devices (e.g., beacons), which are optionally in communication with the device, near the stylus 200 could be utilized by the device to position the stylus 200 to within a small distance (e.g., within 0.5 cm, 1 cm, etc.) of the display of the device.

In still further embodiments, sensor 224 may be configured to biological characteristics of the user manipulating stylus 200. An example biosensor can detect various health metrics, including skin temperature, heart rate, respiration rate, blood oxygenation level, blood volume estimates, blood pressure, or a combination thereof. Processor 228 can use such data to adjust or update the operation of stylus 200 and/or may communicate such data to electronic device 100 to adjust or update the operation thereof. In some embodiments, stylus 200 may be designed as a wearable device, taking the form of a ring or a thimble for use on a finger or fingertip, which may enable more precise interactions with device 100 than a mutual cap finger sensor might allow. In some embodiments, stylus 200 may be a wearable in the form of a glove, partial glove, or finger cot.

Stylus 200 may also include one or more utility sensors that may be used to estimate, quantify, or estimate a property of an object nearby or otherwise external to stylus 200. Example utility sensors include magnetic field sensors, electric field sensors, color meters, acoustic impedance sensors, pH level sensor, material detection sensor, and so on. Processor 228 can use such data to adjust or update the operation of stylus 200 and/or may communicate such data to electronic device 100 to adjust or update the operation thereof.

In many cases, processor 228 can sample (or receive samples of) external data, motion data, power data, environmental data, utility data, and/or other data, and track the progress thereof over a defined or undefined period of time. The cumulative tracked data, the rate of change of the tracked data, the average of the tracked data, the maximum of the tracked data, the minimum of the tracked data, the standard deviation of the tracked data, and so on, can all be used to adjust or update the operation of stylus 200 and/or may communicate such data to electronic device 100 to adjust or update the operation thereof.

Wireless interface 256 can be communicably coupled to the processor 228 and may include one or more wireless interface(s) that are adapted to facilitate communication between processor 228 and a separate electronic device, such as electronic device 100 (e.g., as data 56). In general, wireless interface 256 may be configured to transmit and receive data and/or signals that may be interpreted by instructions executed by processor 228.

Wireless interface 256 can include radio frequency interfaces, microwave frequency interfaces, cellular interfaces, fiber optic interfaces, acoustic interfaces, ultra-wideband interfaces, Bluetooth interfaces, infrared interfaces, magnetic interfaces, electric field interfaces, Universal Serial Bus interfaces, Wi-Fi interfaces, Near-Field Communication interfaces, TCP/IP interfaces, network communications interfaces, or any other wireless communication interfaces. In many embodiments, wireless interface 256 may be a low-power communication module, such as a low-power Bluetooth interface. Wireless interface 256 may be a two-way communication interface or a one-way communication interface.

In one embodiment, processor 228 may utilize wireless interface 256 to convey information about stylus 200 to electronic device 100, substantially in real-time. For example, such information can be, but is not limited to: real-time, or substantially real-time, force estimations that may be made by coordination engine 240 and/or processor 228 as a result of measuring the sensor of force-sensitive structure 246; real-time, or substantially real-time, angular position estimations made by processor 228 after obtaining data from an accelerometer or gyroscope within stylus 200; real-time, or substantially real-time, location and/or angular position and/or orientation estimation(s) (e.g., location, polar angle, azimuthal angle, barrel roll rotation orientation, etc.) that may be made by coordination engine 240 and/or processor 228 after obtaining and processing stylus-sensed device stimulation signal data from any, some, or all of the stylus electrodes (e.g., tip electrode, ring electrode, split electrodes, etc.); and so on.

Processor 228 can also be in communication with one or more signal generators 226, which may be configured to generate any suitable stylus stimulation signals (e.g., stylus electrode transmit signals (e.g., tip signal, ring signal, split signals)) that may be conveyed by stylus coordination engine 240 to the appropriate stylus electrode(s) (e.g., stylus tip electrode 242, stylus ring electrode 248, stylus split electrodes 249, etc.). In other examples, one or more signal generators 226 may be configured to generate, store, access, and/or modify parameters of such stylus electrode transmit signals that may be conveyed to stylus coordination engine 240. Stylus coordination engine 240 can receive these parameters and, in response, can generate corresponding stylus electrode transmit signals (e.g., tip signal, ring signal, split signals).

In some examples, one or more signal generators 226 can include stylus or user identifying information within one or some or all of the stylus electrode transmit signals. For example, a signal generator 226 can include information that identifies a particular stylus to a particular electronic device. In these embodiments, more than one stylus (each having a different identity) can be used with the same electronic device 100. In some cases, multiple styli can be associated with different functions and/or operations of electronic device 100. In one example, a series of individually-identifiable styli can be used to perform separate tasks within a graphical illustration program operating on the electronic device.

In other examples, a signal generator 226 can include authentication information within one or some or all of the stylus electrode transmit signals. In these cases, a particular user of a particular stylus can be identified to an electronic device. For example, a stylus may include one or more bioauthentication sensors, such as fingerprint sensors, useful to establish the identity of a user manipulating the stylus. In this embodiment, a signal generator 226 can encode authentication information (e.g., public keys, security certificates, and so on) into one or some or all of the stylus electrode transmit signals. Thereafter, the electronic device can decode and/or demodulate the received stylus electrode transmit signal(s) in order to obtain the authentication information provided. The electronic device may, thereafter, estimate whether the obtained authentication information is associated with a user identity known or knowable to the electronic device. A known user may be granted authority to operate certain features of the electronic device or to access certain information available to or accessible by the electronic device.

As with the specific embodiments depicted in FIGS. 1A-1D, the foregoing description of the embodiments depicted in FIGS. 2-2D, and various alternatives and variations, are presented, generally, for purposes of explanation, and to facilitate a thorough understanding of general operation and function of an input system such as described herein. However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the operational characteristics of the user input system depicted in FIGS. 2-2D, including the operation of the electronic device and the operation of the stylus, can be implemented in a number of suitable and implementation-specific ways.

As shown in FIG. 2E, stylus 200 may be positioned along and just above sensor layer subassembly 110b (e.g., separated by input surface 110a (not shown)) at any suitable location, hover distance, polar angle, azimuthal angle, barrel roll rotation orientation (also referred to as yaw, pitch and roll), and/or the like with respect to an array of device electrodes of sensor layer subassembly 110b, where the array may include as any suitable number of row device electrodes 172 (e.g., row device electrodes X1-XN) and/or any suitable number of column device electrodes 173 (e.g., column device electrodes Y1-YN). In some embodiments, the device electrodes may be in a substantially alternating pattern on a row or column, or both. Stylus 200 may include any suitable number of stylus electrodes, including stylus tip electrode 242, stylus ring electrode 248, and stylus split electrodes 249 (e.g., electrodes 249a, 249b, etc.). Additionally or alternatively, stylus 200 may include an environmental sensing electrode near the opposite tip, which may be operative to sample noise with respect to infinity, or device and user potential bounce with respect to each other, or with respect to far away potentials. Each stylus electrode may be provided with its own analog front-end circuitry 255, which optionally includes an analog front-end controller ("AFEC") configured to operate a corresponding AFE, and/or its own analog to digital converter ("ADC") 257 (e.g., for any suitable conditioning (e.g., analog signal conditioning, digital signal conversion) of any suitable stylus-sensed device stimulation signals (e.g., receive signals sensed by the stylus electrodes due to device stimulation signals)), each of which may be a portion of processor 202/220 of stylus 200, and/or each stylus electrode and/or the stylus generally may be provided with one or more digital demodulators 253 (e.g., one for each frequency to be sensed by an associated stylus electrode) and/or one or more digital signal processors 259 that may be used for any suitable processing of any suitable stylus-sensed device stimulation signals, where each digital demodulator and/or each digital signal processor may be a portion of processor 202/220 of stylus 200. It should be understood that, in some embodiments, the stylus electrodes may be configured to share a single AFE and/or a single ADC of the processor 202/220. For example, the stylus 200 may be alternatively configured, where the receiver channels formed by the electrodes and coupled sensing circuitry are multiplexed, such that the single AFE and/or the single ADC (among other components) can receive the stimulation signals from the device (e.g., touch sensor panel) sensed by the stylus electrodes. Moreover, as shown, in some embodiments, any suitable wireless communications component(s) 206/256 may be provided by stylus 200 for communicating any suitable data 56 with communications component(s) 106/156 of device 100 (not shown in FIG. 2E).

Figure 3:
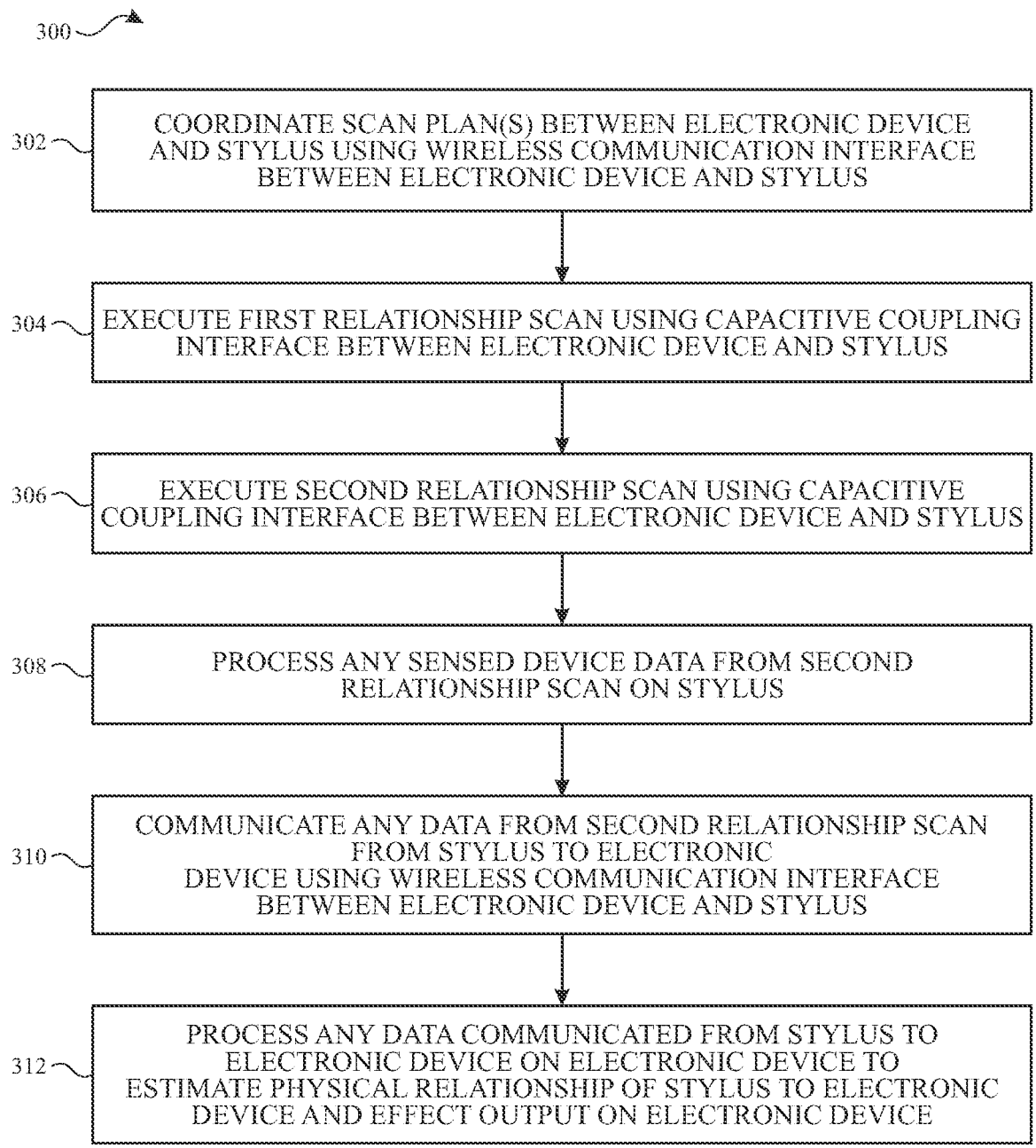
FIG. 3 is a flowchart of an illustrative process for determining a position of a stylus with receive architecture.

FIG. 3 is a flowchart of an illustrative process 300 for determining a physical relationship (e.g., location, polar angle, azimuthal angle, rotation orientation, etc.) of a stylus with capacitive receive architecture with respect to an input component of an electronic device (e.g., physical relationship of stylus 200 with stylus receive electrode(s) operative to sense device stimulation signals with respect to input component 110a of electronic device 100). Process 300 may begin at operation 302, where one or more scan plans may be coordinated between the electronic device and the stylus using any suitable wireless communication interface(s) between the electronic device and the stylus. For example, a scan plan 143 of electronic device 100 may be communicated to (e.g., as data 56) or otherwise made accessible to stylus 200 as scan plan 243, such as via any suitable wireless communication interface (e.g., Bluetooth, ultra-wideband, etc.) between device 100 and stylus 200. Alternatively, scan plan 243 may be provided on stylus 200 during manufacture of the stylus (e.g., as firmware) or may be loaded wirelessly on to the stylus via a remote server or loaded via any direct or wired connection from device 100 in any suitable manner. Each scan plan may define a sequence of scan events to be performed by a user input system including the stylus and device (e.g., frequency(ies), phase(s), timing(s) or frame boundaries (e.g., beginning and end time(s)) (e.g., that may be used during a particular quadrature scan)), and/or the like of transmits and/or receipts to be performed by the device and/or the stylus, and/or clock synchronization information of the device and/or the stylus, a correlation calculation spread code (e.g., that may be related to a particular spread code used during a particular multi-stim scan); and/or the like.

At operation 304, process 300 may include executing a first relationship scan using a capacitive coupling interface between the electronic device and the stylus (e.g., by driving/sensing capacitive coupling interface data 51 via device electrodes of electronic device 100 (e.g., row electrodes (e.g., first electrodes) and/or column electrodes (e.g., second electrodes) of touch sensor layer subassembly 110*b*) and stylus electrodes of stylus 200 (e.g., tip electrode 242, ring electrode 248, and/or split electrodes 249) (e.g., signal(s) received by or adjusted by or made available by one of the interfaces with respect to the other interface (e.g., a capacitive sensing or capacitance sensing communication interface between one or more stylus electrodes and one or more touch sensor device electrodes))). The first relationship scan of operation 304 may be any suitable first scan (e.g., according to any coordinated scan plan of operation 302), including, but not limited to, a coarse positioning scan (e.g., by transmitting a stylus stimulation signal (e.g., analog 40 volt signal) from stylus tip electrode 242 of stylus 200 that may be sensed by an array of touch sensor device electrodes of device 100 or by transmitting device stimulation signals by an array of touch sensor device electrodes of device 100 that may be sensed by any stylus electrode(s) of stylus 200) for estimating a coarse location of the stylus with respect to an input surface of the device, a multi-stim scan (e.g., by transmitting device stimulation signals from an array of touch sensor device electrodes of device 100 according to a spread code that may be sensed by one or more stylus electrodes (e.g., tip, ring, and/or split stylus electrode(s)) for estimating any physical relationship(s) (e.g., coarse) between the stylus and an input surface of the device, a quadrature scan (e.g., by transmitting device stimulation signals from an array of touch sensor device electrodes of device 100 according to a particular quadrature modulation scheme that may be sensed by one or more stylus electrodes (e.g., tip, ring, and/or split stylus electrode(s)) for estimating any physical relationship(s) (e.g., fine) between the stylus and an input surface of the device, and/or the like.

At operation 306, process 300 may include executing a second relationship scan using a capacitive coupling interface between the electronic device and the stylus (e.g., by driving/sensing capacitive coupling interface data 51 via device electrodes of electronic device 100 (e.g., row and/or column electrodes of touch sensor layer subassembly 110*b*) and stylus electrodes of stylus 200 (e.g., tip electrode 242, ring electrode 248, and/or split electrodes 249) (e.g., signal(s) received by or adjusted by or made available by one of the interfaces with respect to the other interface (e.g., a capacitive sensing or capacitance sensing communication interface between one or more stylus electrodes and one or more touch sensor device electrodes))). The second relationship scan of operation 306 may be any suitable second scan (e.g., according to any coordinated scan plan of operation 302), including, but not limited to, a multi-stim scan (e.g., by transmitting device stimulation signals from an array of touch sensor device electrodes of device 100 according to a spread code that may be sensed by one or more stylus electrodes (e.g., tip, ring, and/or split stylus electrode(s)) for estimating any physical relationship(s) (e.g., coarse) between the stylus and an input surface of the device, a quadrature scan (e.g., by transmitting device stimulation signals from an array of touch sensor device electrodes of device 100 according to a particular quadrature modulation scheme that may be sensed by one or more stylus electrodes (e.g., tip, ring, and/or split stylus electrode(s)) for estimating any physical relationship(s) (e.g., fine) between the stylus and an input surface of the device, and/or the like. In some embodiments, the first relationship scan at operation 304 may be a coarse positioning scan involving sensing device stimulation signals at one or more stylus electrodes or sensing stylus stimulation signals at one or more device electrodes for estimating a coarse location of the stylus with respect to the input surface of the device, while the second relationship scan at operation 306 may be a multi-stim scan involving sensing device stimulation signals at one or more stylus electrodes or a quadrature scan involving sensing device stimulation signals at one or more stylus electrodes for estimating any physical relationship(s) between the stylus and an input surface of the device (e.g., in response to the results of the coarse location first scan, which may enable a more efficient/effective second scan). In other embodiments, the first relationship scan at operation 304 may be one of a multi-stim scan involving sensing device stimulation signals at one or more stylus electrodes or a quadrature scan involving sensing device stimulation signals at one or more stylus electrodes for estimating any physical relationship(s) between the stylus and an input surface of the device, while the second relationship scan at operation 306 may be the other one of a multi-stim scan involving sensing device stimulation signals at one or more stylus electrodes or a quadrature scan involving sensing device stimulation signals at one or more stylus electrodes for further estimating any physical relationship(s) between the stylus and an input surface of the device (e.g., in response to the results of the first scan, which may enable a more efficient/effective second scan). In yet other embodiments, only a second relationship scan may be executed at operation 306 and no first relationship scan may be executed at operation 304. In some embodiments, separate scans may be transmitted on rows and columns, and, in other embodiments, scans may simultaneously transmit on rows and columns with frequency or encoding to distinguish them. In some embodiments, scans may be limited to a portion of the electrodes of the device, which may be calculated to be likely positions of the stylus (e.g., for power efficiency or other reasons). In some embodiments, a multi-stim scan using a mutually orthogonal set of functions of time may be followed by a frequency quadrature scan of alternating frequencies and reversing phases. In some embodiments, a multi-stim scan using a set of mutually orthogonal codes (e.g., a Hadamard code) may be used to stimulate rows, and analog front ends may be used both at the electrodes of the columns of the device and analog front ends of the stylus, and the combined data may be used in a model to estimate both finger positions and stylus positions, including variation of the potential difference between the device and the stylus (e.g., due to the driving of the body of the user potential relative to the device potential). Therefore, the scan of operation 306 may use stylus capacitive receive architecture of the capacitive coupling interface between the stylus and the device, as device stimulation signals may be sensed by one or more stylus electrodes configured as receive electrodes.

At operation 308, process 300 may include processing any device stimulation signals as sensed at operation 306 by any stylus electrode(s) using any suitable data, including any scan plan data as coordinated at operation 302 (e.g., any stylus-sensed device stimulation signals during a multi-stim scan or a quadrature scan of the relationship scan of operation 306 may be processed in any suitable manner by the stylus at operation 308 using any suitable information available to the stylus, including scan plan information of operation 302). At operation 310, process 300 may include communicating any data associated with the second relationship scan from the stylus to the electronic device using any suitable wireless communication interface(s) between the electronic device and the stylus (e.g., a Bluetooth or ultra-wideband communication interface (e.g., distinct and different interface than the capacitive coupling interface used at operation 306)). Then, at operation 312, process 300 may include processing on the electronic device any data communicated from the stylus to the device at operation 310 in order to estimate any physical relationship(s) of the stylus with respect to the electronic device (e.g., location, angle, rotation orientation, etc.) and then to effect any output of the electronic device based on the estimate(s) (e.g., adjust a user interface being displayed by display 112a of I/O interface 111a, etc.). For example, any suitable raw data from the second relationship scan of operation 306 (e.g., any device stimulation signals as sensed by any stylus electrode(s) during a quadrature scan or a multi-stim scan of the relationship scan of operation 306 (e.g., raw (digital) data indicative of voltage(s) sensed at the stylus electrode(s) during each time interval of the scan) may be communicated to the device at operation 310 without first being processed in any meaningful way by the stylus at operation 308 (e.g., such that all processing of such sensed data in order to estimate any physical relationship(s) of the stylus with respect to the electronic device may be carried out by the electronic device at operation 312 after receiving such sensed data at operation 310). As another example, any suitable raw data from the second relationship scan of operation 306 (e.g., any device stimulation signals as sensed by any stylus electrode(s) during a quadrature scan or a multi-stim scan of the relationship scan of operation 306 (e.g., raw data indicative of voltage(s) sensed at the stylus electrode(s) during each time interval of the scan) may first be at least partially processed by the stylus at operation 308 before such processed data may be communicated to the electronic device at operation 310 (e.g., such that at least some of the processing of such raw sensed data in order to estimate any physical relationship(s) of the stylus with respect to the electronic device may be carried out by the stylus rather than all of such processing being carried out by the electronic device at operation 312 after receiving such sensed data at operation 310). In some embodiments, the processing at the stylus can include processing at some or all of the stylus electrodes including analog filtering, analog-to-digital conversion, and/or correlation with several functions of time, corresponding to multiplying the received time sequence data by several series of values and then integrating each of the series. The output of the integrators can be optionally transmitted via the wireless interface for further processing on the device. In some such embodiments, the device processing can include comparing the provided correlations to the pattern of data transmitted by the electrodes on the device to determine a coarse position, using a finger position calculated from a mutual capacitance scan, improving the estimate of the electrostatic coupling between each of the transmitter electrodes and each of stylus electrodes (e.g., using the finger position calculated from the mutual capacitance scan); and determining the stylus x, y, and z coordinates, and three dimensional angular position (or a subset of angular orientation, such as azimuth angle). In some embodiments, as described herein, the determination of the position and/or orientation (e.g., x, y and z coordinates and one or more orientation angles) can be performed independent of the mutual capacitance scan (and/or without improvement of the estimate of electrostatic coupling between the transmitter electrodes and the stylus electrodes). The processing of raw stylus-sensed device stimulation signals by the stylus at operation 308 (e.g., what type(s) of processing are to be carried out, if any) may vary based on any suitable factors that may be considered in advance or on the fly for determining the tradeoffs, including, but not limited to, the type of scan carried out at operation 306, the type of scan plan information accessible to the stylus (e.g., as made available at operation 302), the type of component architecture available to the stylus (e.g., whether or not the stylus is equipped with one or more digital demodulators 253 and/or one or more digital signal processors 259), the amount of power (e.g., processing power) available to the stylus for use at operation 308, the data rate of the wireless communication interface available for use at operation 310, and/or the like. Generally, at what point during process 300 the sensed information from the ADCs of the stylus providing the stylus-sensed device stimulation signals via one or more stylus electrodes may be reduced via processing to position and orientation information can be determined arbitrarily. In some embodiments, the stylus may operate in a first (e.g., relatively lower power) mode in which the stylus processes the sensed coupled currents through the one or more stylus electrodes. If the sensed coupled currents exceed a threshold, the stylus can transition to operate in a second (e.g., relatively higher power) mode in which the stylus activates more stylus analog front end circuits and/or processes data from more analog front end circuits, processes using different correlation integrators, and/or transmits data collections via the wireless interfaces at a higher data rate. If raw data may be communicated from the stylus to the device, it may use larger data packets per frame for the wireless communication interface used at operation 310 between the electronic device and the stylus. However, if the stylus carries out processing for the entire calculation resulting in an X, Y, Z, azimuthal, pitch (e.g., tilt), and roll rotation orientation at operation 308, it may use very little download data for each frame for the wireless communication interface used at operation 310 between the electronic device and the stylus, but may require more information be accessible at the stylus (e.g., scan plan information (e.g., at operation 302)) and/or processing power at the stylus, as well as the mutual cap sensed position of the user's fingers for compensation of the dynamic change of difference potential between the device and the stylus (e.g., due to the user contact pattern with the driven electrodes of the device). For example, if a multi-stim scan is utilized at operation 306 and if a correlation calculation spread code associated with the scan is made available to the stylus (e.g., at operation 302) and the stylus has adequate power and circuitry, then the stylus may run correlation calculations at operation 308 on the raw data sensed by the stylus electrode(s) at operation 306 prior to communicating the calculation results at operation 310, otherwise the raw data may be communicated at operation 310. As another example, if a quadrature scan is utilized at operation 306 and if a scan plan associated with the scan is made available to the stylus (e.g., at operation 302) and the stylus has adequate power and circuitry (e.g., digital demodulator(s) and/or digital signal processor(s)), then the stylus may process at operation 308 the raw data sensed by the stylus electrode(s) at operation 306 prior to communicating the processed results at operation 310, otherwise the raw data may be communicated at operation 310, where the processing may include determining a ratio of the amplitude and phase of the device stimulation signals received by a stylus electrode and/or the in-phase and quadrature ("I&Q") components and phase angle of the device stimulation signals received by a stylus electrode (e.g., for each stylus electrode, the sensed device stimulation signal may be demodulated at each one of the two or four or however many frequencies are used in the device stimulation (e.g., corresponding to the two-frequency or four-frequency quadrature scans)). In addition to communicating at operation 310 any raw data sensed by the stylus electrode(s) at operation 306 and/or any data processed at operation 308, operation 310 may also include communicating any other suitable data from the stylus to the electronic device, including, but not limited to, stylus detected force information (e.g., from force-sensitive structure 246), any other stylus-sensed information (e.g., thermal, biometric, motion, etc. (e.g., from stylus sensor 224)), stylus identification information, buttons pressed, grip sensors, barrel pressure, and/or the like, any of which may be received by the electronic device and processed by the electronic device at operation 312 for effecting output of the electronic device. As just one particular example, for a quadrature scan at operation 306 with two frequencies for row device electrodes and two frequencies for column device electrodes to be received by two stylus electrodes (e.g., tip electrode and ring electrode) for enabling calculation at operation 308 of the in-phase and quadrature ("I&Q") components may enable communication at operation 310, for each frame, 8 bits of data per each one of the 16 items of data (e.g., 2 frequencies ×2 device electrode types ×2 stylus electrodes ×2 component calculations) along with a serial number or other unique stylus identification and along with any suitable identification of the detected force.

In some embodiments, sensor data measured at the stylus or information shared by the device can change the operation of the stylus (e.g., the type of the sensing used for detection of the stylus). In some embodiments, the stylus can be configured to operate in a receive mode in which the stylus uses sensing circuitry (e.g., AFEs) to measure charge from the stimulation generated by the device at the tip, ring, and/or split ring electrodes. In some embodiments, the stylus can be configured to operate in a transmit mode in which the stylus uses drive circuitry to stimulate the tip, ring, and/or split ring electrodes (e.g., using one or more tones). In some embodiments, the stylus may be operable in different power states (e.g., a relative lower power state and a relatively higher power state). In a low power state, the stylus can monitor one or more sensors, such as the accelerometer or other inertial sensor, and may evaluate the one or more sensors for some threshold period of time (e.g., 50 ms, 100 ms, 200 ms, 500 ms, 1 s, 2 s, etc.) before transitioning the stylus into a higher power state. In some embodiments, the stylus may operate in a low power state, in which the stylus functions as a beacon, responding to interrogation requests over UWB, for example. The beacon/tag may be responsive to commands to change the stylus to a higher power state where the stylus is transmitting from the tip and ring electrodes or receiving changing currents on the tip and ring electrodes, for example. For example, in this higher power mode the stylus may send data collections more frequently to the UWB transponder on the device. In some embodiments, when the stylus evaluates the one or more sensors for the threshold period of time to transition into a higher power mode, the stylus transmits data collections to the device (e.g., via UWB), and when the device provides appropriate commands, the stylus may transmit signals quasi-electrostatically from the tip and ring electrodes, receives and correlates changing currents on the tip and ring electrodes, activates sensors, exchange identifying codes, and/or the like. In some embodiments, data exchanged between the stylus and the device may be encrypted.

It is understood that the operations shown in process 300 of FIG. 3 are only illustrative and that existing operations may be modified or omitted, additional operations may be added, and the order of certain operations may be altered.

Figure 4:
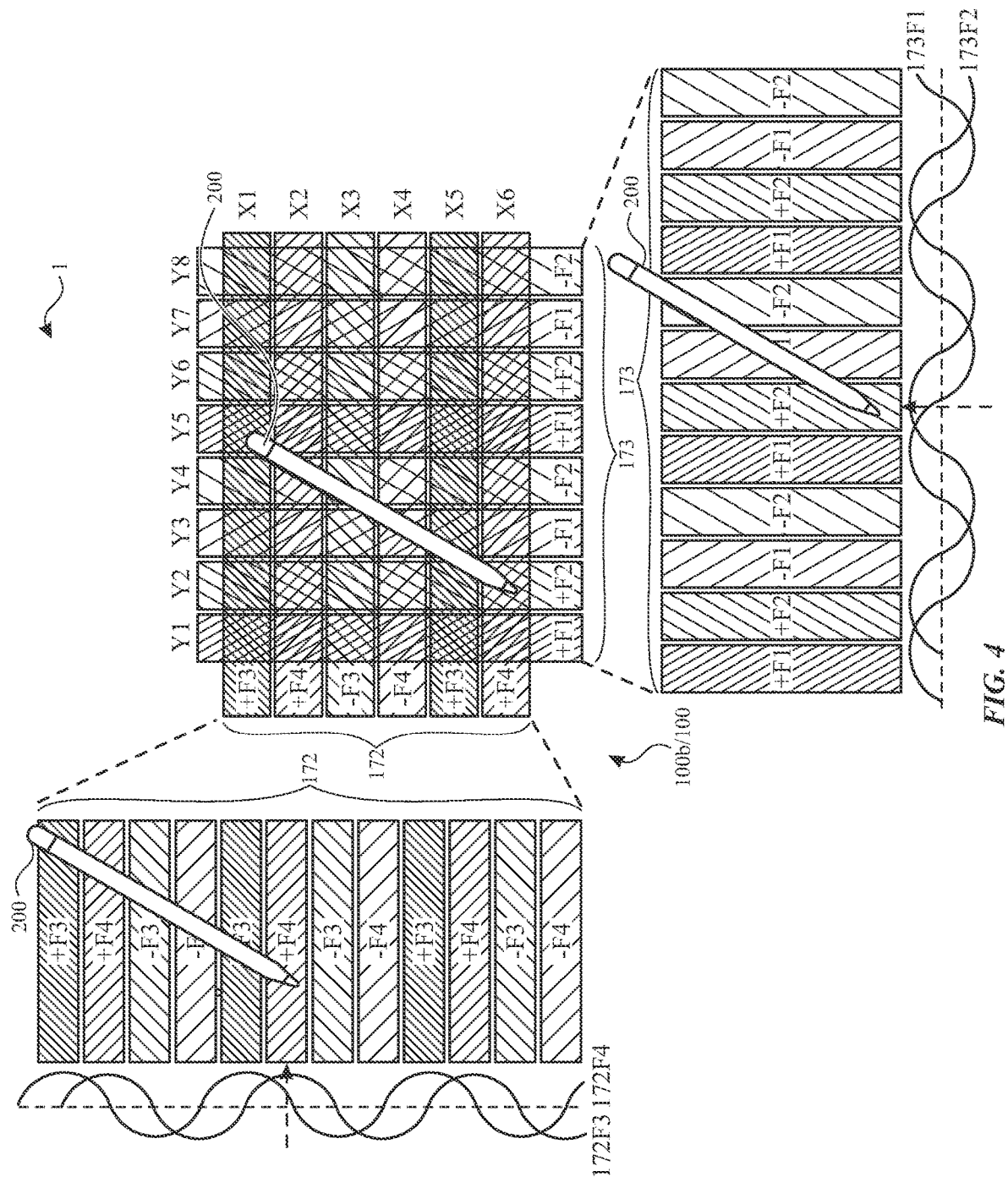
FIG. 4 is a perspective and schematic view of the stylus of FIGS. 1-1D and 2B-2E interacting with the electronic device of FIGS. 1-2A and 2E while executing a quadrature scan.

FIG. 4 is a perspective and schematic view of stylus 200 interacting with sensor layer subassembly 110*b* of electronic device 100 while executing an exemplary quadrature scan. As shown in FIG. 4, stylus 200 may be positioned along and just above sensor layer subassembly 110*b* (e.g., separated by input surface 110*a* (not shown)) at any suitable location, hover distance, polar angle, azimuthal angle, barrel roll rotation orientation, and/or the like with respect to an array of device electrodes of sensor layer subassembly 110*b*, where the array may include as any suitable number of row device electrodes 172 (e.g., row device electrodes X1-XN) and/or any suitable number of column device electrodes 173 (e.g., column device electrodes Y1-YN). As shown, in one example, two different frequencies (F1 and F2) may be transmitted (e.g., as illustrated by respective plots 173F1 and 173F2) on every other column device electrode 173 with an alternating phase at every other column device electrode 173, such that device electrodes Y1-YN of column device electrodes 173 may respectively transmit a device stimulation signal (e.g., a continuous sine wave or any suitable periodic/smooth/undulating or even trapezoidal, step sinusoidal, etc.) at a frequency and phase according to the following: +F1, +F2, −F1, −F2, +F1, +F2, −F1, −F2, +F1, +F2, −F1, −F2, +F1, +F2, . . . . Similarly, as shown, in one example, two different frequencies (F3 and F4) may be transmitted (e.g., as illustrated by respective plots 172F3 and 172F4) on every other row device electrode 172 with an alternating phase at every other row device electrode 172, such that device electrodes X1-XN of row device electrodes 172 may respectively transmit a device stimulation signal (e.g., a continuous sine wave or any suitable periodic/smooth/undulating or even trapezoidal, step sinusoidal, etc.) at a frequency and phase according to the following: +F3, +F4, −F3, −F4, +F3, +F4, −F3, −F4, +F3, +F4, −F3, −F4, +F3, +F4, . . . . Frequencies F3 and F4 may be distinct from F1 and F2 so that the column and row device stimulation signals may be propagated and sensed simultaneously, or they may be propagated at alternating times. In such embodiments, every four column traces and every four row traces may be identical, but the scan could be configured to use more than two frequencies for the rows and for the columns, such as 6 or 8 or 16 frequencies for the rows and another such a set for the columns. In some examples the quadrature scan could be configured to use two frequencies for the rows in a first scan operation and the same two frequencies for the columns in a second scan operation. Processing of the stylus-sensed device stimulation signals may include determining a ratio of the amplitude and phase of the device stimulation signals received by a stylus electrode and/or the in-phase and quadrature ("I&Q") components and phase angle of the device stimulation signals received by a stylus electrode (e.g., for each stylus electrode, the sensed device stimulation signal may be demodulated at each one of the two or four or however many frequencies are used in the device stimulation). For example, processing a ratio of the received amplitude and phase may result in a high Cramer-Rao bound estimation for the spatial position modulo 4 touch pixels (e.g., information indicative of the tip of the stylus being at column Y2 but closer to Y1 than Y3 by some amount and at row X6 but closer to X7 than X5). In some embodiments, the device stimulation signals may be unsigned, and only the relative amplitude at each of the frequencies may be processed, but this may utilize mod 2 instead of mod 4, so information at crossovers may not be as clear as when the device stimulation signals are signed+ and − (e.g., it may be more effective to know phase of transmitted information and decode it as a signed frequency tone (e.g., in order to determine whether phase of transmitted tone was + or − (0 or 180)). Such a quadrature scan may enable very precise physical relationship detection between the stylus and device with respect to a subset of row electrodes and column electrodes (e.g., such quadrature scanning may be spatially periodic), but benefits from a prior coarse scan to identify the particular subset being analyzed by the quadrature scan (e.g., at operation 304 prior to a quadrature scan at operation 306). Because signal-to-noise ratio may be significantly better at the stylus than at the device, device stimulation signals may be sensed by the stylus (e.g., by tip electrode and/or by split electrodes of stylus 200) such that absolute amplitude of signals (e.g., one or more maximum intensities of receive signals) sensed may be used to determine a Z-height or hover height of the stylus above input surface 110a as compared to if the stylus is actually touching/on input surface 110a (e.g., through comparing absolute magnitude of F1 and/or F2 as may be sensed by one or more stylus electrodes with transmitted magnitude of F1 and/or F2). Such quadrature scanning may have a (e.g., relatively) high processing gain and a (e.g., relatively) low noise bandwidth.

Figure 5:
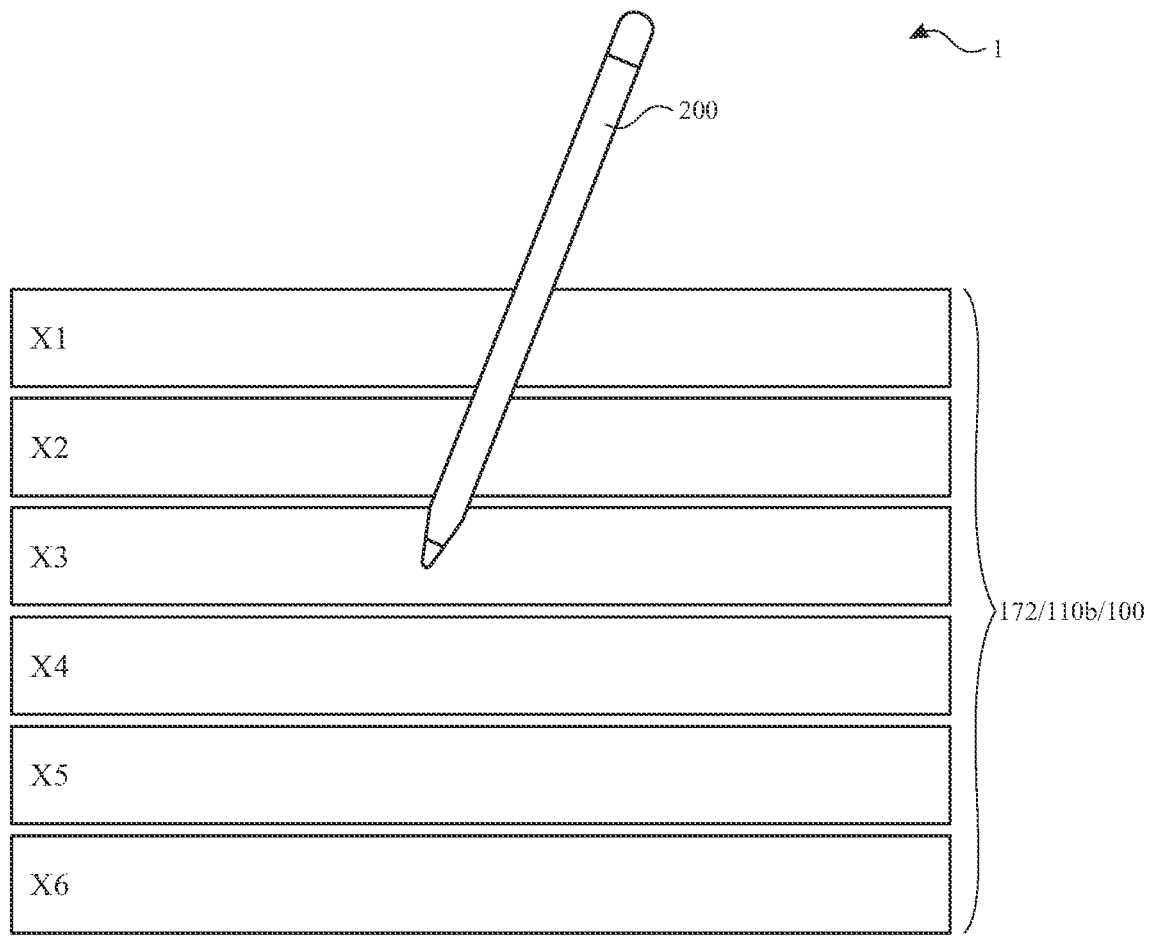
FIG. 5 is a perspective and schematic view of the stylus of FIGS. 1-1D and 2B-2E interacting with the electronic device of FIGS. 1-2A and 2E while executing a multi-stimulation scan.

FIG. 5 is a perspective and schematic view of the stylus of FIGS. 1-1D and 2B-2E interacting with the electronic device of FIGS. 1-2A and 2E while executing a multi-stim scan. As shown in FIG. 5, stylus 200 may be positioned along and just above sensor layer subassembly 110b (e.g., separated by input surface 110a (not shown)) at any suitable location, hover distance, polar angle, azimuthal angle, barrel roll rotation orientation, and/or the like with respect to an array of device electrodes of sensor layer subassembly 110b, where the array may include as any suitable number of row device electrodes 172 (e.g., row device electrodes X1-XN) and/or any suitable number of column device electrodes 173 (e.g., column device electrodes Y1-YN) (not shown). As shown, in one example, the multi-stimulation scan may use a spread code that may include an orthogonal matrix (e.g., matrix 180 (e.g., a Hadamard matrix or any other suitable unique digital code)) for defining the device stimulation signals (e.g., different device electrodes may be stimulated simultaneously with respective different stimulation signals according to the spread code) and then may be utilized with a correlation calculation spread code (e.g., at the stylus and/or at the device) to detect a location of a stylus electrode with respect to the touch sensor electrode array based on the device stimulation signals as sensed by the stylus. As shown, row device electrodes 172 X1-N may transmit a device stimulation signal at some frequency (e.g., frequency F1) according to the phase indicated by matrix 180 in each of N time slots T1-TN. The matrix may be chosen for reduced correlation between its rows. A signal sensed by a particular stylus receive electrode may then be processed with a correlation with the columns of the matrix, and the correlation may be used to estimate which device electrodes the stylus is proximate to. As an example, if the highest correlation is processed to be: +1−1−1−1+1−1−1+1−1+1+1+1, then the stylus may be estimated to be over device row electrode X3, and the ratio of the correlation between electrode X3 and electrode X4 can be used to estimate the position with more spatial resolution. Simultaneous codes could be run at different frequencies on the x and y axis (e.g., row (first) electrodes and column (second) electrodes), to enable simultaneous x and y position estimation, as an additional example. Orthogonal codes over frequency or additional phases are also possible in one or both spatial directions.

The processes described with respect to FIGS. 1-5 (e.g., any control applications and/or algorithms), as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 and/or memory 204 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. In some embodiments, the stylus can include with a rewritable memory for its firmware (e.g., flash memory), and the stylus can enable a process to program its semi-permanent memory over an interface. In some embodiments, such rewritable firmware may include scan plans, new operating modes and mode-switching commands, sequencer microcode, sensor synthesis steps, communications parameters and types, and the like.

As mentioned, electronic device 100 may drive a display (e.g., display 112a) with graphical data to display a graphical user interface ("GUI"). The GUI may be configured to receive touch input via input component(s) 110a and/or 110b. Embodied as a touch screen (e.g., with display 112a as I/O component 111a), I/O component 111a may display the GUI. Alternatively, the GUI may be displayed on a display (e.g., display 112a) separate from touch input component 110. The GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual UI, and the like. A user may perform gestures (e.g., user fingers and/or with stylus 200) at one or more particular locations on input component(s) 110a and/or 110b, which may be associated with the graphical elements of the GUI. In other embodiments, the user may perform gestures at one or more locations that are independent of the locations of graphical elements of the GUI. Gestures performed on input component(s) 110*a* and/or 110*b* may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on input component(s) 110*a* and/or 110*b* in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen.

Feedback may be provided to the user via bus 114 in response to or based on the touch or near touches on a touch input component 110. Feedback may be transmitted optically, mechanically, electrically, via olfactory, acoustically, or the like or any combination thereof and in a variable or non-variable manner.

Circuitry may be disposed on a printed circuit board ("PCB") or a flexible printed circuit ("FPC"). In some embodiments, the circuitry may include discrete circuit elements coupled together (e.g., coupled together with solder) without a PCB or FPC. Although this disclosure describes and illustrates particular circuitry that includes particular circuit elements coupled in particular configurations, this disclosure contemplates any suitable circuitry and/or circuits that include any suitable circuit elements coupled in any suitable configurations.

Therefore, according to the above, some embodiments of the disclosure are directed to a stylus. The stylus can comprise: a plurality of electrodes; a plurality of sensing circuits coupled to the plurality of electrodes, the plurality of sensing circuits configured to sense receive signals on the plurality of electrodes in response to stimulation signals from a touch sensor panel of an electronic device in communication with the stylus; and a processor coupled to the plurality of sensing circuits, the processor configured to: correlate the receive signals sensed by the plurality of electrodes with a first set of codes to generate correlation data; and transmit data (e.g., including the correlation data or generated using the correlation data) to the electronic device in communication with the stylus.

Additionally or alternatively, in some embodiments, the electronic device may be a desktop computer, a laptop computer, a tablet computer, or a smartphone.

Additionally or alternatively, in some embodiments, the plurality of electrodes can include: a first electrode disposed a first distance from at a tip of the stylus; and a plurality of segmented electrodes disposed a second distance greater than the first distance from the tip.

Additionally or alternatively, in some embodiments, a first sensing circuit of the plurality of sensing circuits can be coupled to the first electrode. Additionally or alternatively, in some embodiments, a second sensing circuit of the plurality of sensing circuits can be coupled to a first segmented electrode of the plurality of segmented electrodes. Additionally or alternatively, in some embodiments, a third sensing circuit of the plurality of sensing circuits can be coupled to a second segmented electrode of the plurality of segmented electrodes.

Additionally or alternatively, in some embodiments, each of the plurality of sensing circuits may comprise an analog front-end amplifier and an analog-to-digital converter (ADC).

Additionally or alternatively, in some embodiments, the stylus can further comprise an energy source configured to power the stylus and memory configured to store the first set of codes.

Additionally or alternatively, in some embodiments, the stylus may be in communication with the electronic device via wireless communication circuitry.

Additionally or alternatively, in some embodiments, the wireless communication circuitry can comprise an ultra-wideband communication interface or a Bluetooth communication interface.

Additionally or alternatively, in some embodiments, the stylus can further comprise an electromagnetic coil. Additionally or alternatively, in some embodiments, the wireless communication circuitry can comprise an RFID protocol communication interface via the electromagnetic coil, and the electromagnetic coil can be configured to power the stylus.

Additionally or alternatively, in some embodiments, the plurality of sensing circuits can comprise one or more demodulator circuits associated with the plurality of electrodes, the one or more demodulator circuits configured to sense one or more frequencies of the receive signals sensed by the plurality of electrodes.

Additionally or alternatively, in some embodiments, the first set of codes may include a correlation calculation spread code. Additionally or alternatively, in some embodiments, the receive signals sensed by the plurality of electrodes may include a temporal pattern of phases. Additionally or alternatively, in some embodiments, the correlation between the correlation calculation spread code and the temporal pattern of phases may indicate a proximity of the stylus to one or more respective touch electrodes of the touch sensor panel of the electronic device.

Additionally or alternatively, in some embodiments, the first set of codes may include pseudo noise codes. Additionally or alternatively, in some embodiments, the receive signals sensed by the plurality of electrodes may include a time delay. Additionally or alternatively, in some embodiments, the correlation between the pseudo noise codes and the time delay may indicate a proximity of the stylus to one or more respective touch electrodes of the touch sensor panel of the electronic device.

Additionally or alternatively, in some embodiments, the data including the correlation data or generated using the correlation data is transmitted to the electronic device in communication with the stylus for estimating a location, a hover distance, a polar angle, an azimuthal angle, or a rotation orientation of the stylus with respect to the touch sensor panel.

Additionally or alternatively, in some embodiments, the plurality of electrodes may include: a first electrode disposed a first distance from a tip of the stylus; and a second electrode coaxially aligned with and disposed a second distance greater than the first distance from the tip.

Some embodiments of the disclosure are directed to a method for determining a location and an orientation of a stylus with respect to a touch sensor panel of an electronic device. The method can comprise: sensing, via a plurality of electrodes of an input device, a plurality of receive signals in response to a plurality of stimulation signals transmitted from a touch sensor panel of an electronic device; correlating, at the input device, the plurality of receive signals sensed via the plurality of electrodes with a first set of codes to generate correlation data; and transmitting, using communication circuitry of the input device, data including the correlation data or generated using the correlation data to the electronic device.

Additionally or alternatively, in some embodiments, the input device may be a stylus. Additionally or alternatively, in some embodiments, the electronic device may be a desktop computer, a laptop computer, a tablet computer, or a smartphone.

Additionally or alternatively, in some embodiments, sensing, via the plurality of electrodes of the input device, the plurality of receive signals can comprise: sensing a first receive signal from a first electrode of the plurality of electrodes using a first sensing circuit; sensing a second receive signal from a second electrode of the plurality of electrodes using a second sensing circuit; and sensing a third receive signal from a third electrode of the plurality of electrodes using a third sensing circuit.

Additionally or alternatively, in some embodiments, the method can further comprise: converting the plurality of receive signals into a plurality of digital receive signals using one or more analog-to-digital converters; and demodulating the plurality of digital receive signals using one or more demodulator circuits at one or more frequencies.

Additionally or alternatively, in some embodiments, the method can further comprise: converting the plurality of receive signals into a plurality of digital receive signals using one or more analog-to-digital converters; and demodulating the plurality of digital receive signals using one or more correlators with pseudorandom codes. Additionally or alternatively, in some embodiments, the method can further comprise: converting the plurality of receive signals into a plurality of digital receive signals using one or more analog-to-digital converters; and demodulating the plurality of digital receive signals using one or more continuously operating correlators. Additionally or alternatively, in some embodiments, the first set of codes may be orthogonal. Additionally or alternatively, in some embodiments, the first set of codes may be substantially orthogonal or nondegenerate. Additionally or alternatively, in some embodiments, the first set of codes may be orthogonal with a group of touch electrodes, but distinguishable, without necessarily being orthogonal between groups separated by a threshold distance.

Additionally or alternatively, in some embodiments, the first set of codes may include a correlation calculation spread code. Additionally or alternatively, in some embodiments, the plurality of stimulation signals received by the plurality of electrodes may include a temporal pattern of phases. Additionally or alternatively, in some embodiments, the correlation between the correlation calculation spread code and the temporal pattern of phases may indicate a proximity of the stylus to one or more respective touch electrodes of a plurality of touch electrodes of the touch sensor panel.

Additionally or alternatively, in some embodiments, the method can further comprise estimating a location, a polar angle, an azimuthal angle, or a rotation orientation (e.g., yaw, pitch and/or roll) of the input device with respect to the touch sensor panel of the electronic device.

Some embodiments of the disclosure are directed to an electronic device. The electronic device can comprise: a plurality of touch electrodes; communication circuitry configured to receive data communicated from a peripheral device; and a processor coupled to the plurality of touch electrodes and the communication circuitry, the processor configured to stimulate the plurality of touch electrodes with a plurality of stimulation signals. Additionally or alternatively, in some embodiments, the plurality of stimulation signals can include a first stimulation signal with a first frequency and a first phase and a second stimulation signal with the first frequency and a second phase. Additionally or alternatively, in some embodiments, the processor can be configured to estimate a location and an orientation of the peripheral device with respect to a surface of the electronic device using the data communicated from the peripheral device. Additionally or alternatively, in some embodiments, the data communicated from the peripheral device may be based on the plurality of stimulation signals as sensed by the peripheral device.

Additionally or alternatively, in some embodiments, estimating the location of the peripheral device with respect to the surface of the electronic device can comprise estimating a three-dimensional coordinate including a two-dimensional coordinate of the surface of the electronic device and a distance of the peripheral device from the surface of the electronic device.

Additionally or alternatively, in some embodiments, the plurality of touch electrodes can comprise a plurality of first touch electrodes arranged along a first axis and a plurality of second touch electrodes arranged along a second axis that is perpendicular to the first axis. Additionally or alternatively, in some embodiments, the plurality of stimulation signals may include a third stimulation signal with a second frequency and the first phase, and a fourth stimulation signal with the second frequency and the second phase. Additionally or alternatively, in some embodiments, the first frequency may be different than the second frequency and the first phase may be different than the second phase. Additionally or alternatively, in some embodiments, stimulating the plurality of touch electrodes with the plurality of stimulation signals can comprise: stimulating the plurality of first touch electrodes with the first stimulation signal, the second stimulation signal, the third stimulation signal and the fourth stimulation signal in a first pattern along the first axis at a first time; and stimulating the plurality of second touch electrodes with the first stimulation signal, the second stimulation signal, the third stimulation signal and the fourth stimulation signal in a second pattern along the second axis at a second time after the first time.

Additionally or alternatively, in some embodiments, the plurality of touch electrodes can comprise a plurality of first touch electrodes arranged along a first axis and a plurality of second touch electrodes arranged along a second axis that is perpendicular to the first axis. Additionally or alternatively, in some embodiments, stimulating the plurality of touch electrodes with the plurality of stimulation signals can comprise stimulating the plurality of first touch electrodes according to a spread code using the first stimulation signal and the second stimulation signal.

Additionally or alternatively, in some embodiments, the plurality of touch electrodes can comprise a plurality of first touch electrodes arranged along a first axis and a plurality of second touch electrodes arranged along a second axis that is perpendicular to the first axis. Additionally or alternatively, in some embodiments, the plurality of stimulation signals may include a third stimulation signal with a second frequency and the first phase, a fourth stimulation signal with the second frequency and the second phase, a fifth stimulation signal with a third frequency and the first phase, a sixth stimulation signal with a fourth frequency and the second phase, a seventh stimulation signal with the third frequency and the first phase, and an eighth stimulation signal with the fourth frequency and the first phase. Additionally or alternatively, in some embodiments, the first frequency may be different than the second frequency and the first phase may be different than the second phase. Additionally or alternatively, in some embodiments, stimulating the plurality of touch electrodes with the plurality of stimulation signals can comprise: stimulating the plurality of first touch electrodes with the first stimulation signal, the second stimulation signal, the third stimulation signal and the fourth stimulation signal in a first pattern along the first axis at a first time; and stimulating the plurality of second touch electrodes with the fifth stimulation signal, the sixth stimulation signal, the seventh stimulation signal and the eighth stimulation signal in a second pattern along the second axis at the first time.

Additionally or alternatively, in some embodiments, estimating the location of the peripheral device with respect to the surface of the electronic device can comprise: estimating a ground reference of the peripheral device; and estimating a three-dimensional coordinate including a two-dimensional coordinate corresponding to a location on the surface of the electronic device, and a distance of the peripheral device from the surface of the electronic device.

Additionally or alternatively, in some embodiments, the processor may be further configured to: measure electrostatic coupling of a user in contact with the plurality of touch electrodes; and remove an induced ground reference modulation associated with the peripheral device using the ground reference of the peripheral device. Additionally or alternatively, in some embodiments, the induced ground reference modulation may be due to the electrostatic coupling of the user (e.g., caused by the electrostatic coupling).

Additionally or alternatively, in some embodiments, the data may be required to be communicated to the communication circuitry from the peripheral device within a threshold period of time (e.g., 1 ms, 5 ms, 10 ms, etc.).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A stylus comprising:
a plurality of electrodes;
a plurality of sensing circuits coupled to the plurality of electrodes, the plurality of sensing circuits configured to sense receive signals on the plurality of electrodes in response to stimulation signals from a touch sensor panel of an electronic device in communication with the stylus; and
a processor coupled to the plurality of sensing circuits, the processor configured to:
correlate the receive signals sensed by the plurality of electrodes with a first set of codes to generate correlation data; and
transmit data including the correlation data or generated using the correlation data to the electronic device in communication with the stylus;
wherein:
the first set of codes includes a correlation calculation spread code;
the receive signals sensed by the plurality of electrodes include a temporal pattern of phases; and
the correlation between the correlation calculation spread code and the temporal pattern of phases indicates a proximity of the stylus to one or more respective touch electrodes of the touch sensor panel of the electronic device.

2. The stylus of claim 1, wherein the plurality of electrodes includes:
a first electrode disposed a first distance from at a tip of the stylus; and
a plurality of segmented electrodes disposed a second distance greater than the first distance from the tip.

3. The stylus of claim 2, wherein:
a first sensing circuit of the plurality of sensing circuits is coupled to the first electrode;
a second sensing circuit of the plurality of sensing circuits is coupled to a first segmented electrode of the plurality of segmented electrodes; and
a third sensing circuit of the plurality of sensing circuits is coupled to a second segmented electrode of the plurality of segmented electrodes.

4. The stylus of claim 1, wherein each of the plurality of sensing circuits comprises an analog front-end amplifier and an analog-to-digital converter (ADC).

5. The stylus of claim 1, further comprising:
an energy source configured to power the stylus; and
memory configured to store the first set of codes.

6. The stylus of claim 1, wherein the stylus is in communication with the electronic device via wireless communication circuitry.

7. The stylus of claim 6, wherein the wireless communication circuitry comprises an ultra-wideband communication interface or a Bluetooth communication interface.

8. The stylus of claim 6, further comprising:
an electromagnetic coil;
wherein:
the wireless communication circuitry comprises an RFID protocol communication interface via the electromagnetic coil, and
the electromagnetic coil is configured to power the stylus.

9. The stylus of claim 1, wherein the plurality of sensing circuits comprises:
one or more demodulator circuits associated with the plurality of electrodes, the one or more demodulator circuits configured to sense one or more frequencies of the receive signals sensed by the plurality of electrodes.

10. The stylus of claim 1, wherein the data including the correlation data or generated using the correlation data is transmitted to the electronic device in communication with the stylus for estimating a location, a hover distance, a polar angle, an azimuthal angle, or a rotation orientation of the stylus with respect to the touch sensor panel.

11. A method comprising:
sensing, via a plurality of electrodes of an input device, a plurality of receive signals in response to a plurality of stimulation signals transmitted from a touch sensor panel of an electronic device;

correlating, at the input device, the plurality of receive signals sensed via the plurality of electrodes with a first set of codes to generate correlation data; and transmitting, using communication circuitry of the input device, data including the correlation data or generated using the correlation data to the electronic device;

wherein:

the first set of codes includes a correlation calculation spread code;

the plurality of stimulation signals received by the plurality of electrodes includes a temporal pattern of phases; and the correlation between the correlation calculation spread code and the temporal pattern of phases indicates a proximity of the input device to one or more respective touch electrodes of a plurality of touch electrodes of the touch sensor panel.

12. The method of claim 11, wherein sensing, via the plurality of electrodes of the input device, the plurality of receive signals comprises:

sensing a first receive signal from a first electrode of the plurality of electrodes using a first sensing circuit;

sensing a second receive signal from a second electrode of the plurality of electrodes using a second sensing circuit; and sensing a third receive signal from a third electrode of the plurality of electrodes using a third sensing circuit.

13. The method of claim 11, further comprising:

converting the plurality of receive signals into a plurality of digital receive signals using one or more analog-to-digital converters; and demodulating the plurality of digital receive signals using one or more demodulator circuits at one or more frequencies.

14. A stylus comprising:

a plurality of electrodes;

a plurality of sensing circuits coupled to the plurality of electrodes, the plurality of sensing circuits configured to sense receive signals on the plurality of electrodes in response to stimulation signals from a touch sensor panel of an electronic device in communication with the stylus; and a processor coupled to the plurality of sensing circuits, the processor configured to:

correlate the receive signals sensed by the plurality of electrodes with a first set of codes to generate correlation data; and transmit data including the correlation data to the electronic device in communication with the stylus.

15. The method of claim 11, wherein the plurality of electrodes includes:

a first electrode disposed a first distance from at a tip of the input device; and a plurality of segmented electrodes disposed a second distance greater than the first distance from the tip.

16. The method of claim 11, wherein the input device further comprises:

an energy source configured to power the input device; and memory configured to store the first set of codes.

17. The method of claim 11, wherein the input device is in communication with the electronic device via wireless communication circuitry.

18. The method of claim 17, wherein the wireless communication circuitry comprises an ultra-wideband communication interface or a Bluetooth communication interface.

19. The method of claim 11, wherein the data including the correlation data or generated using the correlation data is transmitted to the electronic device in communication with the input device for estimating a location, a hover distance, a polar angle, an azimuthal angle, or a rotation orientation of the input device with respect to the touch sensor panel.

20. The stylus of claim 14, wherein the data including the correlation data is transmitted to the electronic device in communication with the stylus for estimating a location, a hover distance, a polar angle, an azimuthal angle, or a rotation orientation of the stylus with respect to the touch sensor panel.

* * * * *